United States Patent
Degioanni

(10) Patent No.: US 9,246,773 B2
(45) Date of Patent: Jan. 26, 2016

(54) SYSTEM, METHOD, AND GRAPHICAL USER INTERFACE FOR APPLICATION TOPOLOGY MAPPING IN HOSTED COMPUTING ENVIRONMENTS

(71) Applicant: Draios Inc., Davis, CA (US)

(72) Inventor: Loris Degioanni, Davis, CA (US)

(73) Assignee: DRAIOS INC., Davis, CA (US)

( * ) Notice: Subject to any disclaimer, the term of this patent is extended or adjusted under 35 U.S.C. 154(b) by 0 days.

(21) Appl. No.: 14/527,741

(22) Filed: Oct. 29, 2014

(65) Prior Publication Data

US 2015/0052441 A1 Feb. 19, 2015

Related U.S. Application Data

(63) Continuation-in-part of application No. 13/953,970, filed on Jul. 30, 2013.

(51) Int. Cl.
| | |
|---|---|
| *H04L 12/24* | (2006.01) |
| *G06F 3/0481* | (2013.01) |
| *H04L 12/26* | (2006.01) |
| *G06F 11/34* | (2006.01) |
| *G06F 11/30* | (2006.01) |
| *G06F 11/32* | (2006.01) |

(52) U.S. Cl.
CPC .............. *H04L 41/22* (2013.01); *G06F 3/0481* (2013.01); *G06F 11/3006* (2013.01); *G06F 11/3065* (2013.01); *G06F 11/323* (2013.01); *G06F 11/3495* (2013.01); *H04L 43/045* (2013.01); *G06F 2201/87* (2013.01)

(58) Field of Classification Search
CPC ... H04L 43/045; H04L 12/26; G06F 11/3495; G06F 2201/87; G06F 11/3065; G06F 11/323; G06F 11/3006
See application file for complete search history.

(56) References Cited

U.S. PATENT DOCUMENTS

| | | |
|---|---|---|
| 7,382,371 B1 | 6/2008 | Ciabarra |
| 2005/0022185 A1* | 1/2005 | Romero ............... G06F 11/3409 718/100 |
| 2005/0107985 A1 | 5/2005 | Agrawal et al. |

(Continued)

FOREIGN PATENT DOCUMENTS

WO WO 2011/088256 A2 7/2011

OTHER PUBLICATIONS

"Rap Genius responds to Heroku's call for 'respect' amid allegations of fraud" available: http://venturebeat.com/2013/03/0Z/rap-genius-responds, retrieved Jul. 30, 2013, dated Mar. 2013 (8 pages).

(Continued)

*Primary Examiner* — Ebrahim Golabbakhsh
(74) *Attorney, Agent, or Firm* — Hickman Palermo Becker Bingham LLP; Dominic Tsang

(57) ABSTRACT

Systems, methods, and graphical user interfaces for application topology mapping in hosted computing environments. In one embodiment, for example, a computer graphical user interface comprises an application topology map of an application deployed on a plurality of a hosts in a hosted computing environment, the application topology map comprising a plurality of nodes and edges there between, the plurality of nodes representing a plurality of identified application components of the application, the edges representing identified logical dependencies between the plurality of application components.

16 Claims, 60 Drawing Sheets

(56) References Cited

U.S. PATENT DOCUMENTS

| | | | |
|---|---|---|---|
| 2006/0085166 A1* | 4/2006 | Ochi | G06F 11/3495 702/186 |
| 2006/0277307 A1 | 12/2006 | Bernardin et al. | |
| 2008/0295095 A1* | 11/2008 | Watanabe | G06F 11/0712 718/1 |
| 2008/0301763 A1* | 12/2008 | Sasaki | G06F 3/065 726/1 |
| 2009/0144420 A1* | 6/2009 | Attanasio | H04L 41/046 709/224 |
| 2011/0099561 A1 | 4/2011 | Karakkattillathu | |
| 2011/0302569 A1 | 12/2011 | Kunze et al. | |
| 2012/0278482 A1 | 11/2012 | Alon et al. | |
| 2012/0303805 A1 | 11/2012 | Simpson et al. | |
| 2012/0324290 A1 | 12/2012 | Chen et al. | |
| 2013/0014107 A1 | 1/2013 | Kirchhofer | |
| 2013/0205020 A1 | 8/2013 | Broda et al. | |
| 2015/0039745 A1 | 2/2015 | Degioanni | |

OTHER PUBLICATIONS

"AppDynamics" available: http://www.appdynamics.com, retrieved Jul. 30, 2013, dated 2013 (5 pages).

"AppFirst" available: http://www.appfirst.com/sigreferral=mainCTA&plan=p), retrieved Jul. 30, 2013, copyright 2012-2013 (3 pages).

"Application performance management" available: http//en.wikipedia.org/wiki/Application_performance_management, retrieved Jul. 30, 2013, dated Jul. 2013 (5 pages).

"Berkeley Packet Filter", available: http://en.\wikipedia.org/wiki/Berkeley_Packet_Filter, retrieved Jul. 30, 2013, dated Jul. 2013 (2 pages).

"BlueStripe Software —Transaction and Application Monitoring" available:http://bluestripe.com, retrieved Jul. 30, 2013, copyright 2009-2013 (2 pages).

"Capacity management", available: http://en.\wikipedia.org/wiki/Network_performance_management, retrieved Jul. 30, 2013, dated Jun. 2013 (4 pages).

"Catch Application Problems Before Your Customers Do!" available: http//optier.com, retrieved Jul. 30, 2013, dated Jul. 2013 (3 pages).

"CloudWeaver®" available: http://lyatiss.com, retrieved Jul. 30, 2013, copyright 2013 (1 page).

"A web & mobile Developer's Best Friend for better performing apps" copyright 2008-2013 (6 pages).

"pcap" available: http//en.wikipedia.org/wiki/Libpcap, retrieved Jul. 30, 2013, dated Jun. 2013 (4 pages).

Wireshark available: http://en.wikipedia.org/wiki/Wireshark, retrieved Jul. 30, 2013, dated Jul. 2013 (4 pages).

"Riverbed Technology" available: http://en.wikipedia.org/wiki/Riverbed_Technology, retrieved Jul. 30, 2013, dated Jul. 2013 (6 pages).

"strace" available: http://en.wikipedia.org/wiki/Strace, retrieved Jul. 30, 2013, dated Jun. 2013 (3 pages).

"tcpdump" available: http://en.wikipedia.org/wiki/Tcpdump, retrieved Jul. 30, 2013, dated May 2013 (3 pages).

"The Leading Cloud Operations Optimization Service" available: http://www.new\em.com, retrieved Jul. 30, 2013, copyright 2010-2013 (2 pages).

Are you . . . Managing modern applications? available: http://boundary.com, retrieved Jul. 30, 2013, copyright 2010-2013 (2 pages).

Current Claims in application No. PCT/US2014/035040, dated Sep. 2014, 8 pages.

International Searching Authority, "Search Report" in application No. PCT/US2014/035040, dated Sep. 18, 2014, 11 pages.

Scalyr Blog available: http://blog.scalyr.com/2012/10/16/a-systematic-look-at-ec2-10, retrieved Jul. 30, 2013, dated Oct. 2012 (27 pages).

"LTTng" available: http://en.wikipedia.org/wiki/LTTng, retrieved Jul. 30, 2013, dated Apr. 2013 (2 pages).

* cited by examiner

SYSTEM, METHOD, AND GRAPHICAL USER INTERFACE FOR APPLICATION TOPOLOGY MAPPING IN HOSTED COMPUTING ENVIRONMENTS

PRIORITY CLAIM

This application claims the benefit as a continuation-in-part of application Ser. No. 13/953,970, entitled "Performance And Security Management Of Applications Deployed In Hosted Computing Environments", filed Jul. 30, 2013, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The disclosed embodiments relate generally to hosted computing environments and, more particularly, to managing performance and security of applications deployed in hosted computing environments and the computing infrastructure that supports such applications.

BACKGROUND

Historically, users of information technology (IT) management solutions have been divided into two separate categories: software developers and network/system administrators. This was largely the result of relatively static computer hardware infrastructure dedicated to executing particular software applications. In these environments, software developers focused primarily on developing application functionality. Administration of hardware infrastructure on which applications were deployed was delegated to network/system administrators.

The software industry has, in response, developed a number of management solutions to meet the needs of these two types of users, including Application Performance Management (APM) solutions for software developers and Network Performance Management (NPM) solutions for network/system administrators.

Generally, APM solutions focus on providing metrics that measure the quality of service that users of an application experience when using the application. For example, existing APM solutions provide metrics that measure response time of transactions of interest. Unfortunately, many existing APM solutions require bytecode instrumentation of the application to provide metrics. While bytecode instrumentation can be effective in identifying issues with the application software itself, bytecode instrumentation often provides only indirect visibility into the computing infrastructure that supports the application. Such supporting computing infrastructure includes, for example, CPU, memory, network, and data storage resources underlying the execution of the application software. In addition, a given bytecode instrumentation technique often works only with specific a programming language. For example, a particular bytecode instrumentation technique may be available for application components programmed in the JAVA programming language. However, an application may be composed of components developed in other programming languages such as, for example, C/C++ or other programming languages. A performance and security management solution that requires multiple different bytecode instrumentation techniques for application components programmed in different programming languages is less than ideal because of the added overhead to the developer and/or system administrator in developing and managing each of the different techniques.

APM solutions are distinct from, but often used in conjunction with, NPM solutions. Typically, NPM solutions operate by capturing and analyzing network communications between networked application components. Consequently, while NPM solutions can provide visibility at the network communication layer, they do not provide much, if any, visibility into applications themselves or the supporting system infrastructure.

Recent changes in the way applications are built and deployed present new challenges to which existing APM and NPM solutions are not well suited. Existing solutions were designed on the assumption that applications were relatively static, developed with a small number of well-known and understood tools, platforms, and languages, required relatively few upgrades, and operated in a dedicated enterprise computing environment. These assumptions break down for applications deployed in "hosted" computing environments.

In hosted computing environments, computing resources are centralized, for example, in a data center or other hosting facility. Hosted computing environments may be generally categorized into one of two categories: public and private. In private hosted computing environments, enterprise applications of differing criticality share the same computing infrastructure. In public hosting environments, applications of different organizations or companies share the same infrastructure.

In some hosted computing environments, applications can be rapidly developed and deployed without requiring services of network/system administrator to provision computing infrastructure. Such hosted computing environments have precipitated the introduction of a new type of user of application and network/system management solutions: the developer and operations person (or just "devop" for short). The devop often has the combined responsibilities of previously separate positions, including software development, quality assurance, and IT operations responsibilities.

With some hosted computing solutions, applications can be put into production and changed rapidly at a fast pace. Continued improvements in price and performance of commodity computing hardware along with the emergence of low cost reliable open source software platforms result in deploying many of these applications in scaled out, distributed hosted environments, often spanning multiple data centers, and private and public hosted computing environments. Often these applications execute on virtualized infrastructure in dynamic and shared environments—either in private hosted environments where multiple applications of the same enterprise share infrastructure or in public hosted environments where applications of multiple customers share infrastructure.

At the same time as the rise of hosted computing solutions for deploying applications, there has been a proliferation in tools, platforms, and programming languages for developing applications. Today, many applications are no longer developed with a small handful of technologies such as HTML and Java. Instead, in addition to these technologies, a number of a wide variety of newer, diverse technologies are being used for application development (e.g., Ruby on Rails, PHP, Ajax, JavaScript, Python, and many others). As a result, a management solution that focuses on a specific tool, platform, or programming language is inadequate for many of today's applications. While some hosted computing solutions provide the capability to automatically provision computing resources as needed to allow for dynamic scalability, for example, during traffic bursts, it is still largely the responsibility of the devop to ensure the performance of applications is adequate (e.g., meets a minimum quality of service level).

Overall, existing APM and NPM solutions are inadequate for the hosted computing environment because they provide only limited visibility into computing infrastructure in hosted computing environments that supports an application or operate only with specific tools, platform, or programming languages. Devops, application developers, system administrators, and others would appreciate a management solution providing an end-to-end view of their applications and a top-to-bottom view of their application stack including the supporting infrastructure in order to be able to assure service quality in hosted computing environments. There is a need to support a variety of tools, platforms, and programming languages and for a solution that is easy to deploy and use.

SUMMARY

The above deficiencies and other problems associated with existing solutions for managing performance and security of applications deployed in hosted computing environments and the supporting computing infrastructure are reduced or eliminated by the disclosed systems, methods, and graphical user interfaces. In one embodiment, for example, a system for application topology mapping of an application deployed on a plurality of hosts in a hosted computed environment comprises a plurality of agents installed on the plurality of hosts. The plurality of agents are configured for capturing system events from operating systems on the hosts that result from a plurality of application components of the application executing on the plurality of hosts. The system further comprises one or more computers having at least a processor and memory and including a collection and analysis engine. The collection and analysis engine is configured to obtain the system events captured by the agents executing on the hosts. The collection and analysis engine is also configured to identify captured system events that pertain to the application components, and to compute, from the identified captured system events that pertain to the application components, performance metric values reflecting computing performance of the application components over a period of time. The system further comprises one or more computers having at least a processor and memory and including a presentation system. The presentation system is configured to present an application topology map and the performance metric values in a graphical user interface. The application topology map comprises a plurality of nodes and edges there between. The plurality of nodes represent the plurality of application components. The edges represent logical dependencies between the application components.

In another embodiment, for example, a method for application topology mapping of an application delayed on a plurality of hosts in a hosted computing environment comprises the step of a plurality of agents installed on the plurality of hosts capturing system events from operating systems on the hosts, the system events resulting from a plurality of application components of the application executing on the plurality of hosts. The method further includes the step of one or more computers having at least a processor and memory and including a collection and analysis engine obtaining system events captured by the agents, identifying captured system events that pertain to the application components, and computing, from the identified captured system events that pertain to the application components, performance metric values reflecting computing performance of the application components over a period of time. The method further comprises the step of one or more computers having at least a processor and memory and including a presentation system displaying an application topology map and the performance metric values in a graphical user interface. The application topology map comprises a plurality of nodes and edges there between. The plurality of nodes represent the plurality of application components. The edges represent logical dependencies between the application components.

In another embodiment, for example, a computer graphical user interface comprises an application topology map of an application deployed on a plurality of a hosts in a hosted computing environment. The application topology map comprises a plurality of nodes and edges there between. The plurality of nodes represent a plurality of identified application components of the application. The edges represent identified logical dependencies between the plurality of application components.

Thus, a system, method, and graphical user interface are provided that address the needs of devops, application developers, system administrators, and others in managing applications and supporting computing infrastructure deployed in hosted computing environments. Such system and method may complement or replace conventional systems and methods for application and infrastructure performance and security management.

DETAILED DESCRIPTION OF EMBODIMENTS

Figure 1:
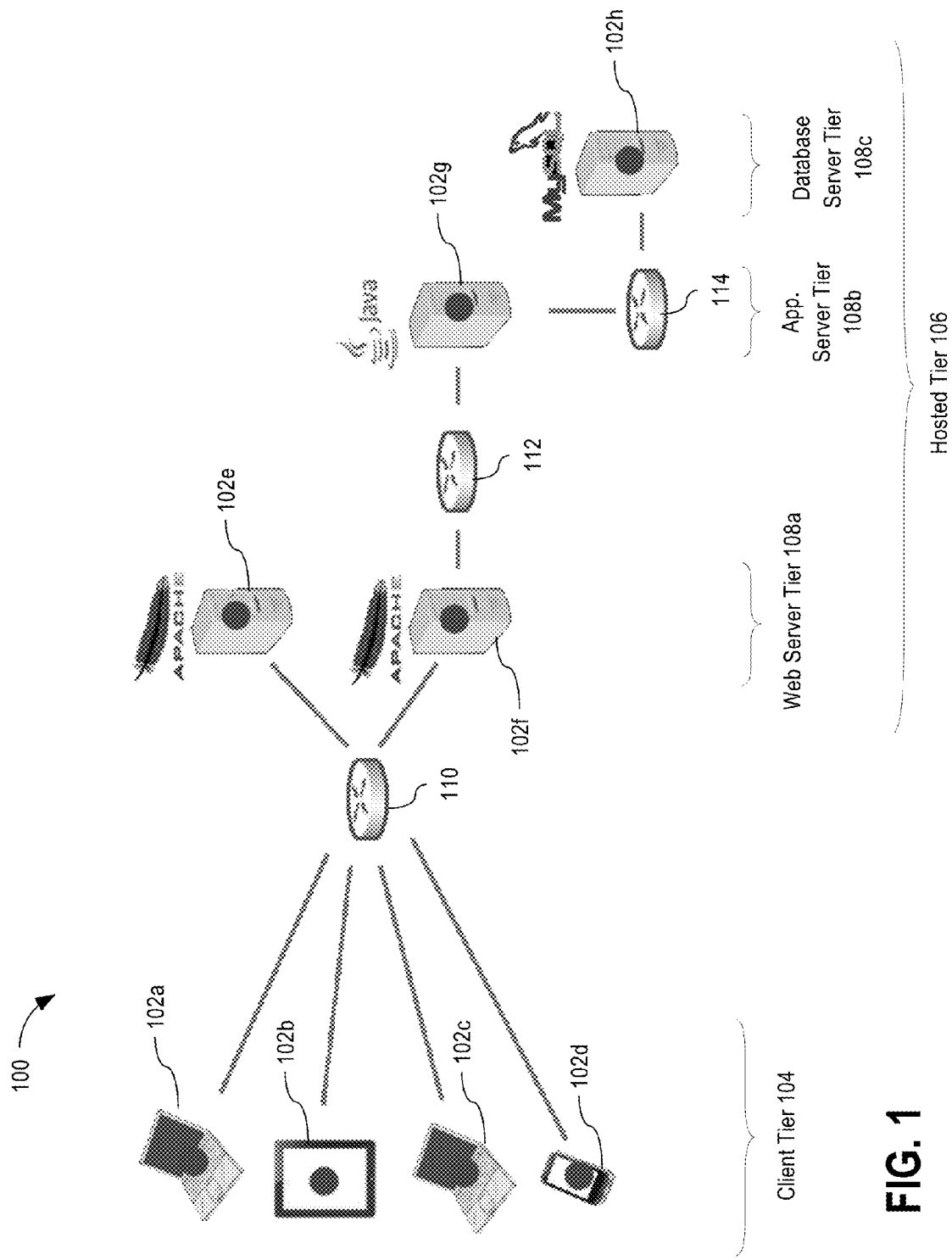
FIG. 1 illustrates an example hosted computing environment delivering an application, in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Overview

In some embodiments, software agents (hereinafter "OS agent") executing inside and/or outside the operating systems of hosts in a hosted computing environment collect system events from the perspective of the operating systems and operate in conjunction with a collection and analysis engine (hereinafter "CAS engine") to provide the ability to manage the performance and security of the computing infrastructure that delivers an application deployed in the hosted computing environment. More particularly, the operating systems of the hosts are instrumented with the OS agent. The OS agents are configured logically underneath processes executing on the operating systems (e.g., web server processes), capturing the processes' (and threads' thereof) interaction with the operating systems including but not limited to, CPU scheduling events, processing life-cycle and management events, inter-process communication events, memory allocation and management events, disk I/O events, and network I/O events. By instrumenting the operating systems with the OS agent, all of the processes' interaction with the operating systems may be captured for analysis. Some or all of the hosts that are part of the application infrastructure, including clients and servers, can be configured with the OS agent for capturing system events.

Events captured by OS agents are collected and analyzed by the CAS engine. The CAS engine can be located in a private hosted computing environment or in a public hosted computing environment. Further, a portion of the CAS engine can operate in the OS agents. The CAS engine processes the system events collected by the OS agents. Results of processing are presented to users through a graphical user interface termed a "presentation system" herein. Through the presentation system, users can perform several tasks including viewing application performance metrics in real-time, historical performance trends, and alerts. The presentation system also provides interactive features allowing users to drill down into system event details and discover root causes of application performance problems.

In some embodiments, the presentation system presents a "transaction segmentation view" of an application transaction that allows a user to identify which computing resources were used to process the application transaction and how much time was spent using particular computing resources to process the application transaction. In this context, an "application transaction" starts when a client request (e.g., a HTTP request) is received at a server and ends when the server returns the fully body of a response (e.g., a HTTP response) to the request. The application transaction may span multiple server tiers of the application infrastructure (e.g., a web server tier, application server tier, and database tier).

In some embodiments, the transaction segmentation view allows a viewer to identify which computing resources were used to process an application transaction and how much work was performed by particular computing resources processing the application transaction across all of the server tiers. For example, the transaction segmentation view may indicate the portion or percentage of the entire application transaction time spent performing network I/O across all server tiers and the portion of percentage of the entire application transaction time spent performing file I/O across all of the server tiers. The transaction segmentation view also allows a user to identify in which server tiers application transaction processing occurred. For example, the transaction segmentation view can indicate how much CPU processing for a transaction in terms of percentage was performed in the web server tier and how much was performed in the database server tier.

In some embodiments, the CAS engine builds indexes on system events captured by the OS agent and on results of processing the events. The indexes are used for querying for specific events that match a specified set of criteria. Results of querying are useful for tracing the sequence of steps involving in a hacker penetration of the application or a virus attack or other security breach and for tracking user activity.

These and other embodiments are explained in greater detail below.

Example Hosted Computing Environment

In an embodiment, the performance and security management solution is implemented in a hosted computing environment that hosts an application. The application is typically divided into two general tiers: a client tier and a hosted tier. The client tier and the hosted tier are typically connected by the Internet but may be connected by another type of a network (e.g., a WAN or a LAN).

The hosted tier is typically further divided into one or more server tiers. For example, the hosted tier may have a web server tier for receiving and responding to requests from client devices in the client tier and implementing presentation functionality of the application, an application server tier implementing business logic functionality of the application, and a database server tier for persistently storing application data.

Each server tier of the hosted tier typically includes one or more "hosts". Each host has an executing operating system (e.g., WINDOWS, UNIX, etc.) and software implementing or supporting the application (e.g., web servers, application servers, database servers) executing on top of the operating system. A "host" may be defined as a computing platform for executing an operating system and operating system managed processes thereon. The host may be a physical computing platform (e.g., computing system 3300 of FIG. 33) or a virtual computing platform (e.g., a virtual machine). In some instances, a host is a virtualized host (e.g., a virtual machine instance) that virtualizes hardware in software. In the context of virtualization, a host is sometimes referred to as a guest machine, or just guest, and the operating system of the host referred to as a guest operating system.

FIG. 1 is a schematic diagram illustrating an example hosted computing environment 100 for delivering an application, in accordance with some embodiments. The application can be virtually any client-server application in which clients make network requests of servers and the servers generate and return responses to the requests to the clients. For example, the application can be a web-based application in which the clients are web browsers or mobile applications that make HTTP requests of web servers and the web servers, possibly in conjunction with one or more other servers, generate and return HTTP responses to the clients.

HTTP is the acronym for "HyperText Transfer Protocol", which is the underlying communication protocol used by the World Wide Web on the Internet. HTTP defines how messages are formatted and transmitted, and what actions Web servers and browsers should take in response to various commands. Further description of HTTP is available in RFC 2616: Hypertext Transfer Protocol—HTTP/1.1, the disclosure of which is hereby incorporated by reference. RFC 2616 is available from the W3, and is currently available via the Internet at /Protocols/ in the w3.org domain. In this description, the term HTTP is meant to include, but not require, all cryptographically secured variants such as the Secure-HyperText Transfer Protocol (HTTPS).

Environment 100 includes a number of hosts 102a-102h (generally, "host 102"). Each host 102 corresponds to a physical computing device (e.g., a server computer, a desktop computer, a laptop computer, a tablet computer, a mobile phone) or a virtualized computing device (e.g., a virtual machine instance) that executes on a physical computing device. Each host 102 is configured with an operating system. Different hosts 102 may be configured with different operating systems. The operating system a host 102 is configured with can be a conventional operating system such as an open-source operating system or a proprietary operating system. For example, the operating system can be a MICROSOFT WINDOWS, UNIX, IOS, ANDROID, OS X based operating system or variant thereof.

Environment 100 is divided into a number of tiers. At the highest level, environment 100 is divided into client tier 104 and hosted tier 106. Client tier 104 includes client hosts 102a-102d (generally, "client host 102"). Client tier 104 may have more or less client hosts than is shown in environment 100. Hosted tier 106 includes server hosts 102e-102h (generally, "server host 102"). Hosted tier 106 may have more or less server hosts than is shown in environment 100.

Hosted tier 106 is further divided into a number of server tiers 108a-108c (generally, "server tier 108"). Web server tier 108a includes web server hosts 102e and 102f (generally, "web server host 102"). Web server tier 108a may have more or less web server hosts than is shown in environment 100. Application server tier 108b includes application server host 102g. Application server tier 108b may have more or less application server hosts than is shown in environment 100. Database server tier 108c includes database server host 102h. Database server tier 108c may have more or less database server hosts than is shown in environment 100.

In this example, web server hosts 102 execute Apache web server software, application server host 102g executes Java-based application server software, and database server host 102h runs MySQL database server software. However, in other embodiments the server hosts 102 may execute different software and server hosts 102 are not limited to any particular software or any particular web server, application server, or database server software.

Client hosts 102 in client tier 102 are connected to web server hosts 102 in web server tier 108a via network 110. Network 110 may include the public internetworks popularly termed the Internet. However, network 110 need not involve the Internet. For example, network 110 may be a Local Area Network (LAN). Web server hosts 102 and application server host 102g are connected by network 112. Typically, network 112 will not include the Internet and will instead be a LAN or other dedicated network. Similarly, network 114 connecting application server host 102g and database server host 102h will not include the Internet and will instead be a LAN or other dedicated network. Although separate networks in environment 100, network 112 and network 114 may be the same network.

Hosted tier 106 can operate in a private hosted computing environment, a public hosted computing environment, or other distributed computing environment over a network. In a private hosted computing environment, a pool of computing resources (e.g., virtual machines, network, and storage) is operated for a single company or organization. In a public hosted computing environment, a pool of computing resources is shared among multiple customers of a hosting provider. Some existing performance management tools and solutions are inadequate with regard to the visibility they provide to users as to why an application is performing poorly. For example, a system administrator or application developer may receive general complaints from users that the application is responding slowly but may not be able to easily determine from these tools and solutions whether the application is CPU-bound, memory-bound, or I/O bound.

System Architecture

In accordance with some embodiments, the performance and security management solution involves instrumenting hosts at the operating system layer with an OS agent. The OS agent captures system events as they occur on the hosts from the perspective of the operating system. In this description, a "system event" includes any information collected from an operating system that reflects a process' or a thread's interaction or absence of interaction with the operating system at a particular point in time or within or over a particular period of time and includes any information that reflects the results of processing such information collected from the operating system. For example, capturing a system event by the OS agent may include intercepting system calls from an application component to an operating system as described herein, maintaining system state information as described herein, and/or associating additional contextual information with a captured system event as described herein.

In an embodiment, the OS agent is implemented in software (or one or more sets of computer-executable instructions). The OS agent can execute inside and/or outside the operating system. When executing inside the operating system, the OS agent is installed as a kernel module, kernel extension, or other kernel plugin and executes as part of the operating system. When executing outside the operating system, the OS agent executes as one or more processes on the operating system in conjunction with the other processes that execute on the operating system such as, for example, web server processes, database server processes, or any other processes that the operating system manages the execution of. Executing inside the operating system allows the OS agent to intercept system calls from application processes that execute on the operating system for the purpose of capturing system events pertaining to those application processes. Executing outside the operating system allows the OS agent to capture system events from log files and virtual file systems. For example, executing outside the operating system allows the OS agent to capture system events from the Windows Event Log on MICROSOFT WINDOWS operating systems and from the /proc virtual file system on LINUX operating systems. As mentioned, for any given host and operating system, the OS agent may execute only inside the operating system, only outside the operating system, or both inside and outside the operating system.

In some embodiments, the OS agent intercepts system calls from the application layer on the hosts to the operating system layer and records information collected from intercepted system calls as system events. In general, a system call is processed by the operating system in a kernel or other processor privileged mode. Typically, a system call is accomplished by the operating system by changing or switching a processor execution mode from a less-privileged user mode to a more-privileged kernel mode. When the OS agent intercepts a system call, it does so in a transparent manner from the perspective of the application layer. That is, the result of a system call does not depend on whether the system call is intercepted by the OS agent or not. In this sense, the system call interception technique is not obtrusive from the perspective of the application layer.

In some embodiments, once intercepted by the OS agent, relevant information about the system calls is recorded as system events in local memory of the host. The system calls may correspond to disk I/O operations, network I/O operations, memory allocation and management operations, process and thread creation and control operations, inter process communication operations, file and directory operations, among other operations or services the operating system layer provides to the application layer via a system call interface. The OS agent may also intercept CPU process and thread scheduling events which also can be recorded as system events.

By instrumenting the operating system on the hosts with the OS agent, relevant interaction with the operating system by application components (e.g., web servers, application servers, and database servers) can be captured for performance and security analysis. Further, instrumenting the operating system with the OS agent allows the OA agent to be application component agnostic. That is, the OS agent is not limited to capturing system events for only a predetermined set of application components or application components programmed in a particular programming language. Instead, the OS agent can capture system events for any type of application component that executes as a process on the instrumented operating system.

The combination of a program (e.g., an application program) being executed on an operating system and associated bookkeeping information used by the operating system is referred to herein as a "process". When a program is executed, the operating system typically creates a new process for each instance of the program being executed. The process is like an envelope for the program which identifies the program with a process number (e.g., a process identifier or "ID") and associates other bookkeeping information to the process. Many operating systems, including UNIX and Windows, are capable of executing many processes (or tasks) at the same time and are called multi-tasking operating systems.

Figure 33:
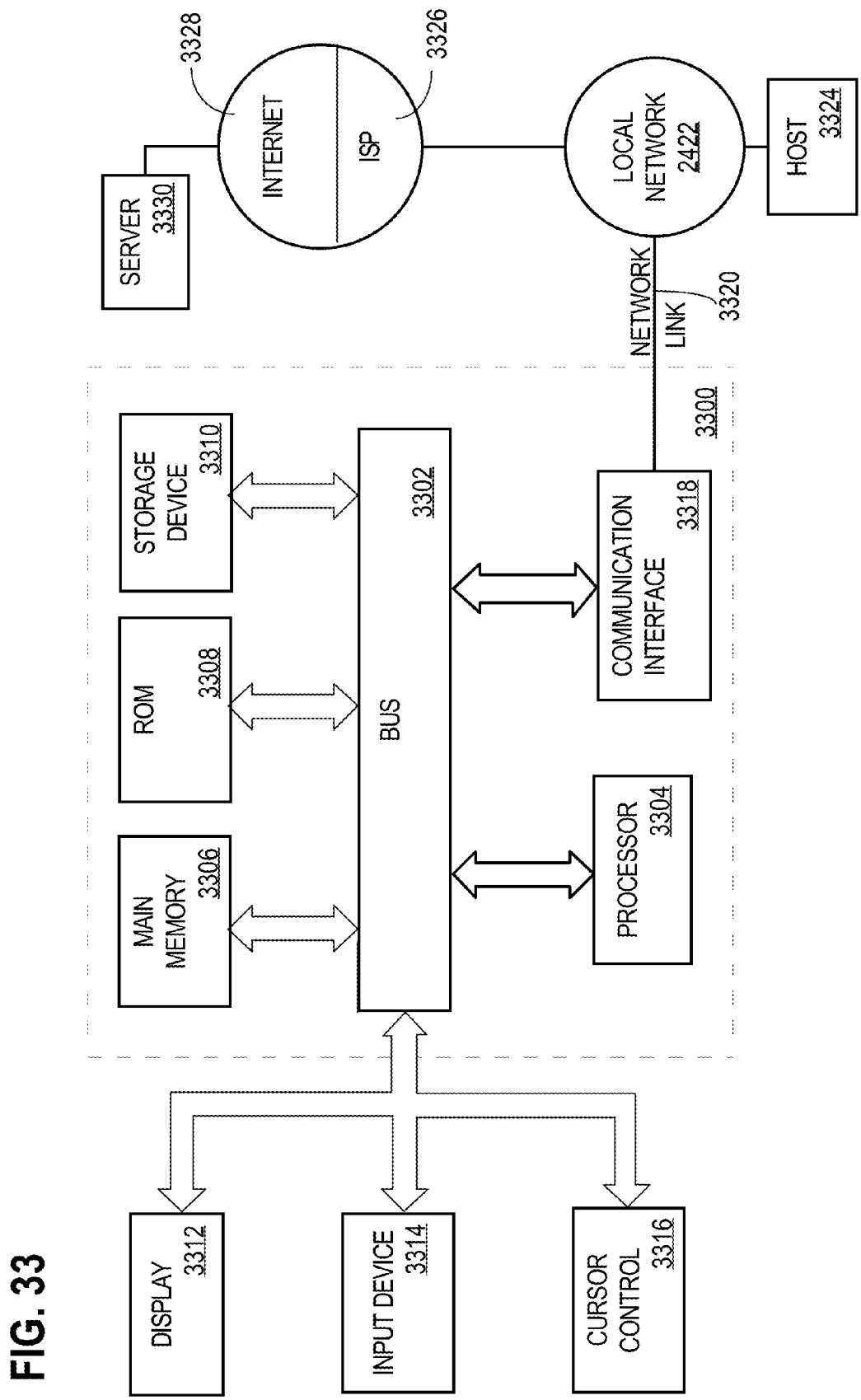
FIG. 33 is a block diagram that illustrates a computer system with which some embodiments of the present invention can be implemented.

In this description, the terms "software" and "program" is meant to include firmware, applications, and/or sets of instructions stored in memory, for example memory 3306 and/or storage device 3310 of system 3300 of FIG. 33, which can be executed by one or more processors, for example processor 3304 of system 3300.

In some embodiments, multiple software aspects may be implemented as sub-parts of a larger program while remaining distinct software aspects. In some embodiments, multiple software aspects can be implemented as separate programs. Finally, any combination of separate programs that together implement a software aspect described herein is within the scope of the disclosure.

In some embodiments, the software programs, when installed to operate on one or more computing devices, define one or more specific machine implementations that execute and perform the operations of the software programs. A software program (also known as a program, software application (or just application), script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program can correspond to a file in a file system. A program can be stored in a portion of a file that holds other programs or data (e.g., one or more scripts stored in a markup language document), in a single file dedicated to the program in question, or multiple coordinate files (e.g., files that store one or more modules, sub-programs, or portions of code). A computer program can be deployed to execute on one computer or on multiple computers that are located at one site or distributed across multiple sites and interconnected by a communication network.

In some embodiments, system events captured and recorded by the OS agents are provided to a collection and analysis engine ("CAS engine") for further analysis and processing. For example, the OS agent may send system events to the CAS engine in one or more network messages. The processing performed by the CAS engine may be performed to provide a number of different useful functions including, for example, resource and application mapping, charting, reporting, trending, alerting, base-lining, event decoding and display, application troubleshooting and drill-down, and capacity planning.

In addition or alternatively, the OS agents can process system events locally and send the results of the processing to the CAS engine. For example, the OS agent can compute an average disk I/O for an application level process for a period of time based on a number of system events captured and send the average disk I/O calculation result to the CAS engine instead of or in addition to the raw system events.

In accordance with some embodiments, the results of processing collected system events are presented to users (e.g., application developers and system administrators) through a presentation system. Through the presentation system, the user can perform several tasks including monitoring infrastructure performance and dependencies in real-time, monitoring application-related performance metrics, viewing historical trends of performance metrics, examining alerts, interacting with collected system events and results of processing system events including drilling down into event details and discovering root causes of application problems.

Figure 2:
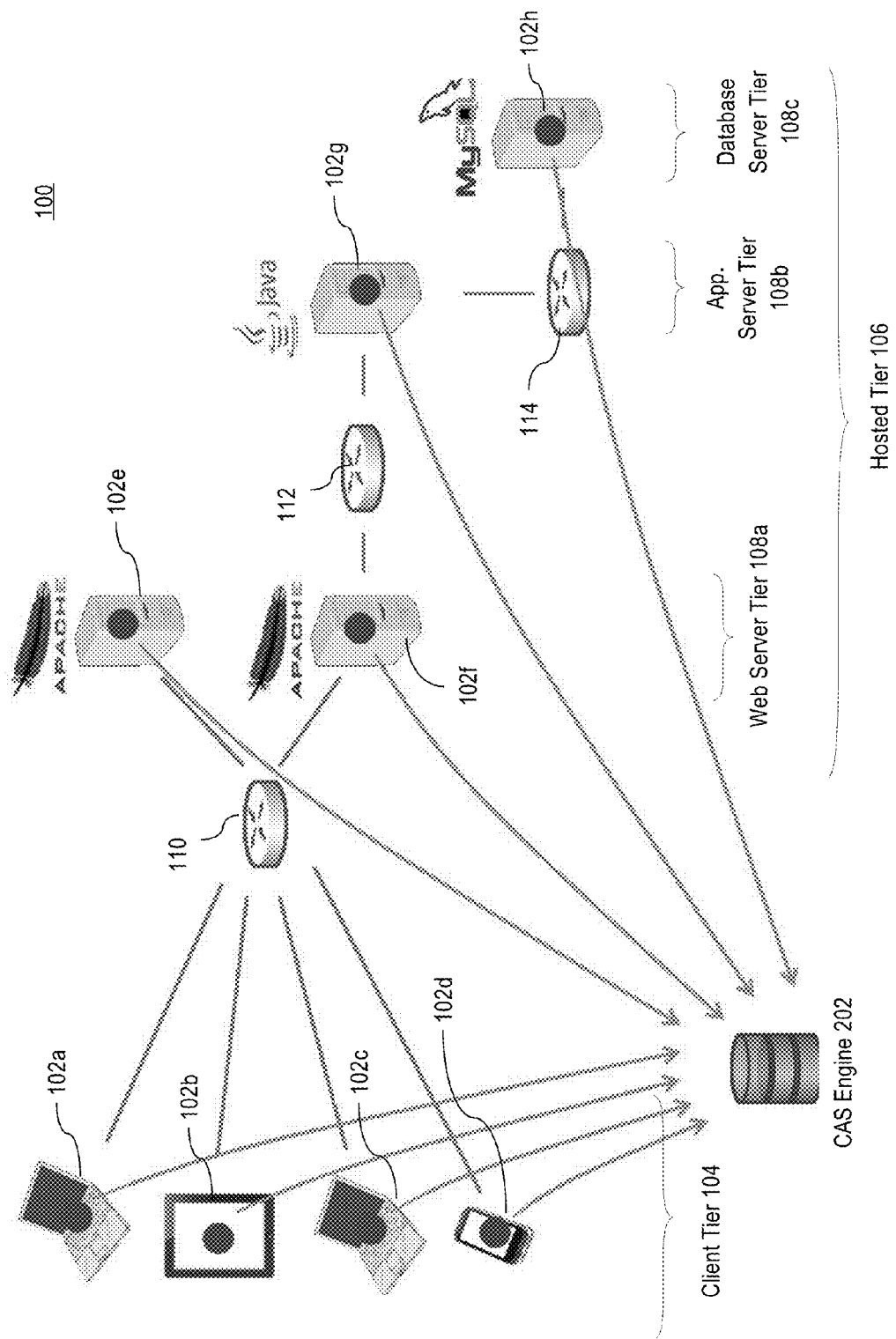
FIG. 2 illustrates the example hosted computing environment of FIG. 1 with the addition of a collection and analysis engine and hosts configured with a software agent, in accordance with some embodiments.

FIG. 2 is a schematic diagram illustrating environment 100 of FIG. 1 but with the addition of collection and analysis system 202 (or "CAS engine 202"), in accordance with some embodiments. Hosts 102a through 102h are each configured with the OS agent. However, not all hosts need be configured with the OS agent. For example, only hosts in the hosted tier may be configured and hosts in the client tier not configured with the OS agent. For example, hosts 102a-102d in client tier 104 may not be configured with the OS agent but hosts 102e-102h in the hosted tier 106 may be configured with the OS agent.

In this example, OS agents on hosts 102a through 102h capture and record system events from application components executing on the hosts 102. The captured and recorded system events and/or results of processing the captured and recorded system events are sent to CAS engine 202.

In some embodiments, CAS engine 202 provides a HTTP or HTTPS interface to hosts 102 thereby allowing hosts 102 to function as HTTP clients connecting to CAS engine 202 functioning as an HTTP server. By doing so, reconfiguration of network firewalls in environment 100 to allow network communication between the OS agents and the CAS engine 202 may be avoided in many circumstances.

CAS engine 202 can be implemented in software executing on one or more computing devices. CAS engine 202 may be operated in the same data center facility or hosting facility as hosts 102 of hosted tier 106. Alternatively, CAS engine 202 may be located in different data center facility or hosting facility. For example, CAS engine 202 may be located in a private data center or a data center or hosting facility other than the data center facility or hosting facility in which hosted tier 106 is located.

In some embodiments, system events captured an OS agent are recorded in a local buffer on the host. As mentioned, the system events can be sent to CAS engine 202 as captured and recorded. Alternatively, some or all of the captured and recorded system events can be processed locally by the OS agent and the results of the processing sent to CAS engine 202. In addition, the OS agent may perform system event filtering. That is, the OS agent may not process or send to CAS engine 202 certain captured system events specified by system event filtering criteria. The filtering criteria may be pre-determined. For example, the filtering criteria may be based on user input indicating performance metrics the user is currently interested in. Accordingly, the OS agent may filter out system events that are not needed by CAS engine 202 to produce the interesting performance metrics.

After system events have been collected and processed, CAS engine 202 can perform a number of functions on the collected and processed data. In particular, the results of processing can be presented to a user through a presentation system. Through the presentation system, the user can perform a number of tasks such as view performance metrics in real-time, looking at historical metric trends, monitoring alerts generating by CAS engine, and interacting with collected and processed data to spot application performance and security issues including drill-down into system event details and discovering root causes of performance and security issues.

Figure 3:
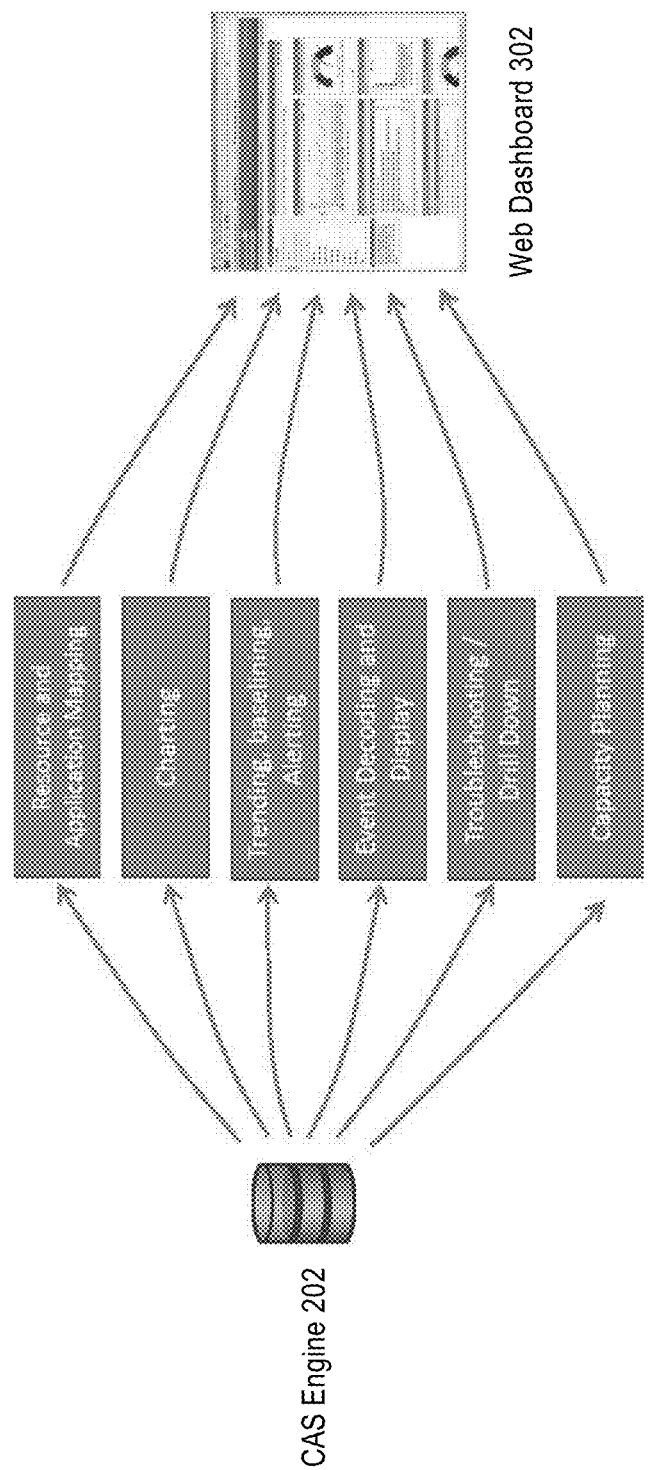
FIG. 3 illustrates some of the functions that may be performed by the collection and analysis engine in conjunction with a presentation system, in accordance with some embodiments.

FIG. 3 illustrates some of the functions that may be performed by CAS engine 202 based on collected and processed system events, in accordance with some embodiments. The functions include, but are not limited to, resource and application mapping, charting, trending, base-lining, alerting, event decoding and display, troubleshooting and drill-down, and capacity planning. As shown, the results of processing may be presented to users in a presentation system 302.

In some embodiments, interaction with the presentation system 302 may be made by a user using conventional web browser software such as EXPOLORER, SAFARI, CHOME, or the like. Alternatively, presentation system 302 may be implemented as a dedicated software program installed on a user's computing device.

Operating System Instrumentation

Historically, capturing application performance and security data has been accomplished by collecting data at the network layer or by instrumenting application bytecode. These approaches are deficient for capturing performance and security data in hosted computing environments. In particular, instrumenting the network layer by capturing network packets that span network ports or by collecting summaries of network flows provides visibility only into the network layer. Instrumenting application bytecode typically only works with certain tools, platforms, and languages (e.g., JAVA).

In contrast to instrumenting only the network layer and/or application bytecode, the performance and security management solution of some embodiments of the present invention involves instrumenting the operating system of hosts in the hosted computing environment. Operating system instrumentation allows the OS agent to sit logically underneath the application components, capturing their interaction with the operating system. For example, operating system instrumentation may be accomplished with an operating system kernel component, for example, a kernel module or kernel driver, installed into the operating system. The kernel component may leverage existing instrumentation frameworks such as tracepoints, kernel markers, ftrace, ktrace, etc. In addition or alternatively, operating system instrumentation may be accomplished with a user level process that leverages an existing kernel event collection framework such as, for example, Event Tracing for MICROSOFT WINDOWS.

Through operating system instrumentation, system events generated by application components (e.g., web servers, application servers, database servers, etc.) executing as processes on the operating system are captured. System events include, but are not limited to, process and thread scheduling events, process and tread creation and management events, inter-process communication events, memory allocation and management events, disk and file system I/O events, and network I/O events.

CPU scheduling events include, but are not limited to, when a process or thread is running and becomes blocked, is running and becomes preempted, and is blocked and becomes runnable.

A process is an address space of a host with one or more threads executing within that address space, and associated system resources for those threads. Some of the associated system resources may be shared among all of the threads within a process. For example, all of the threads may share a process identifier (process ID), a parent process identifier (parent process ID), current working directory, and other system resources.

A thread is a single flow of control within a process. Each thread may have its own identifier (thread ID) and required system resources to support a flow of control. Process and thread creation and management events include, but are not limited, to when a process or thread is created or destroyed (killed).

Inter-process communication events include, but are not limited to, a process opening an inter-process communication channel (e.g., a socket, a message queue, a pipe, etc.) with another process on the same host, a process reading data from an inter-process communication channel, and a process writing data from an inter-process communication channel. Inter-process communication is a functionality enhancement provided by the operating system to provide a high-performance, deterministic inter-process communication facility for intra-host communication.

Memory allocation and management events include, but are not limited to, a process or thread allocating space in volatile memory and a process or thread de-allocating previous allocated space in volatile memory.

Disk and file system I/O events include, but are not limited to, a process or thread creating a new file or directory, a process or thread opening an existing file or directory, a process or thread reading data from an open file or directory, a process or thread writing data to an open file or directory, and a process or thread closing an open file or directory. A file is an object that can be written to, or read from, or both. A file may have certain attributes, including access permissions and type. A directory is a file that contains directories entries in which no two of the directories entries have the same name. A directory entry is an object that associates a filename with a file. Multiple directories entries can associate names with the same file.

Network I/O events include, but are not limited to, a process creating a new file descriptor (e.g., a socket) used as a local communications endpoint for process-to-process communication, a process establishing a network connection (e.g., a TCP connection) using such a file, a process reading data from such a file, a process writing data to such as file, and a process closing such a file. The file may be associated with local address information and remote address information. The local address information and the remote address information may each an address family identifier and addressing information specific to that address family. For example, if the address family is Internet Protocol Version 4 or Version 6, then the local and remote address information may specify a location network address, a local network port, a remote network address, and a remote network port.

Figure 4:
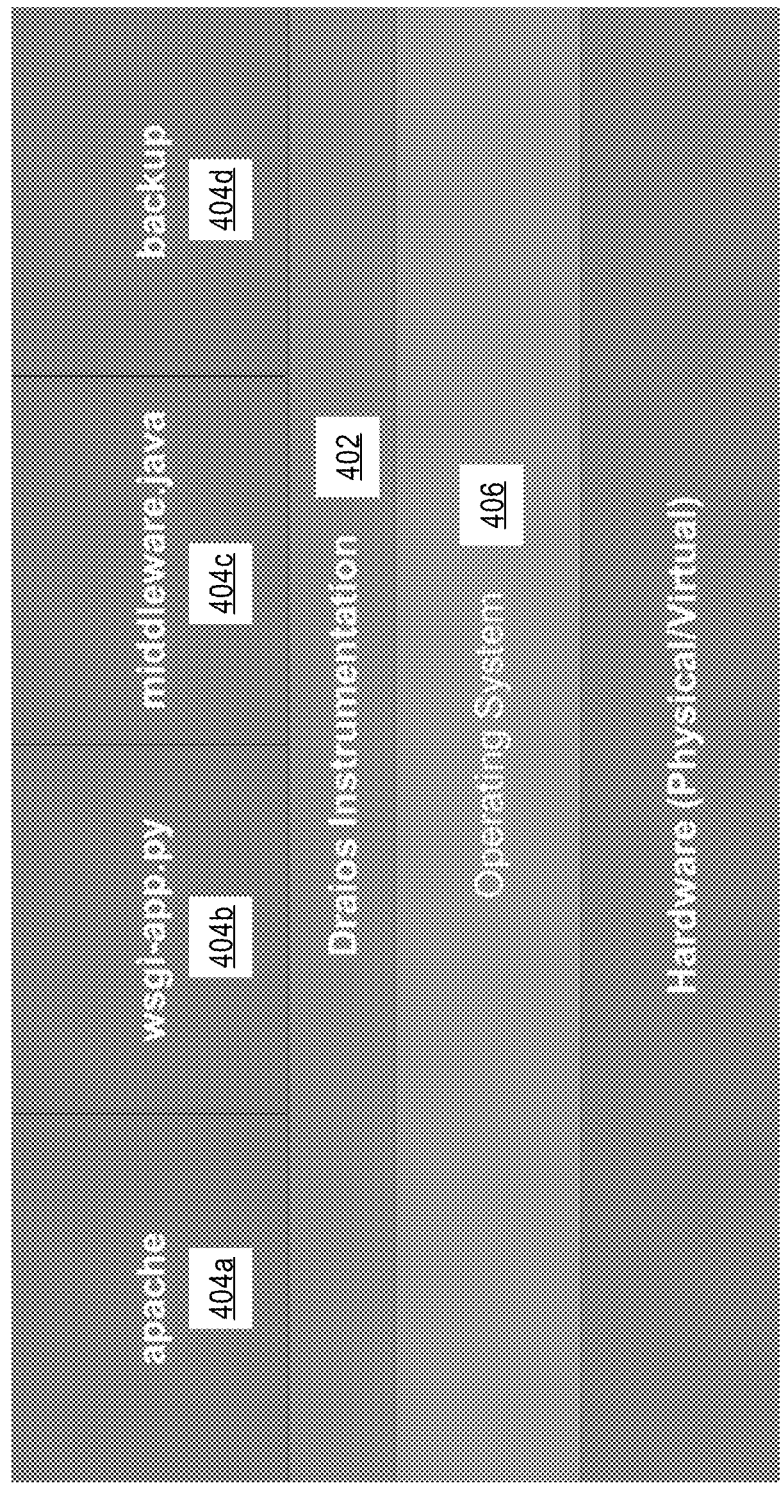
FIG. 4 illustrates where on a host operating system instrumentation can be situated, in accordance with some embodiments.

FIG. 4 illustrates where on a host the operating system instrumentation of the OS agent may be situated, in accordance with some embodiments. In particular, the operating system instrumentation 402 may be logically configured underneath the application components 404a through 404d, capturing their interaction with the operating system 406. In some embodiments, the operating system instrumentation resides inside the operating system, for example, as a loadable kernel module, a kernel extension, or a kernel-mode driver.

In some embodiments, in addition to or instead of residing inside the operating system, the operating system instrumentation of the OS agent resides outside the operating system as a user-level process that captures and records system events through an operating system provided interface such as, for example, operating system event logs and the proc file system on Unix-like operating systems. In both cases, whether residing inside or outside the operating system, the operating system instrumentation captures system events from the perspective of the operating system.

Figure 5:
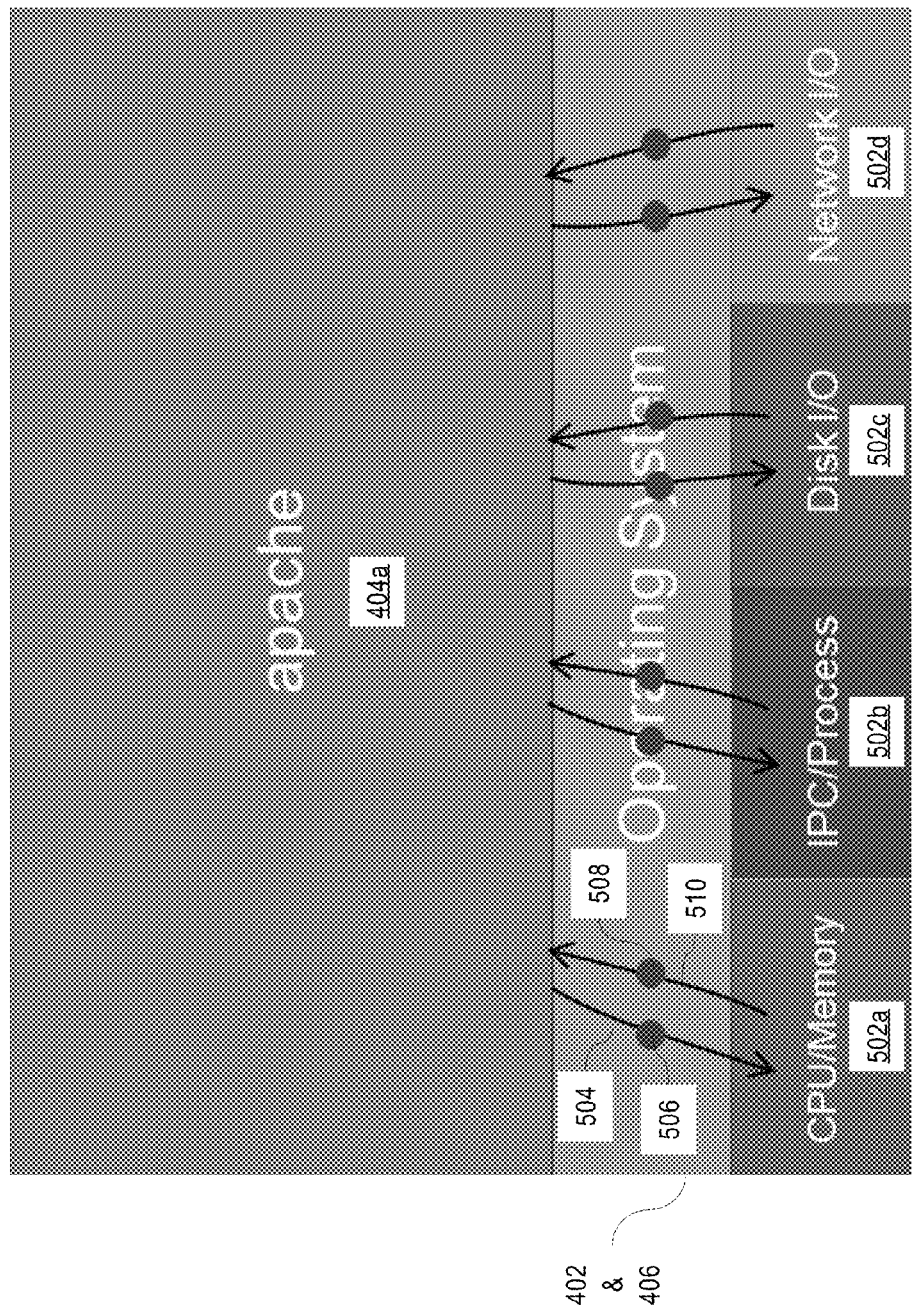
FIG. 5 illustrates operating system instrumentation for an application component, in accordance with some embodiments.

FIG. 5 illustrates the operating system instrumentation for application component 404a, in accordance with some embodiments. In this example, the application component is the Apache web server. As shown in FIG. 5, the operating system instrumentation 402 captures different system event types 502 including CPU scheduling and memory allocation and management events 502a, inter-process communication and process and thread creation and management events 502b, disk and file system input/output events 502c, and network input/output events 502d.

In some embodiments, a captured system event corresponds to a system call from an application component to the operating system. For example, in FIG. 5, application component 404a makes system call 504 to operating system 406 possibly passing input parameter values 506. For example, system call 504 may be a request to allocate volatile memory space to application component 404a in which the amount of memory requested is passed as input parameter value 506. System call 504 is processed by operating system 406 and results returned to application component 404a as return value 510. For example, operating system 406 may allocate a block of volatile memory and return, as return value 510, a handle to or address of the block of memory to application component 404a. Some system calls 504 may also provide output parameter values 508 as a result operating system 406 processing.

Operating system instrumentation by the OS agent can capture a wide variety of information about a system call as an system event including, but not limited to:
 the name of the system call,
 the time of the system call,
 the process ID and/or thread ID of the application component that made the system call,
 any parameter values input to the system call by the application component,
 any parameter values output from the system call by the operating system,
 any return value of the system call, and/or
 the time needed by the operating system to complete the system call.

For example, where system call 504 is a request to allocate volatile memory, operating system instrumentation 402 can capture the requested amount of memory passed as input parameter value 506 to system call 504. Operating system instrumentation 402 can also capture return value 510 returned from the call 504 to allocate memory. Operating system instrumentation 402 may perform similar capturing for other types of system calls.

As discussed, system events captured by operating system instrumentation can be completely processed on the local host, partially processed on the local host, or completely processed by the CAS engine. If completely processed on the local host, then only summary information is sent to the CAS engine. If partially processed on the local host, some system events are sent in raw form to the CAS engine and some system events are processed locally to create summaries that are sent to the CAS engine in lieu of or in addition to sending the system events that are summarized. If completely processed by the CAS engine, then no summation of system events occurs at the local host. The particular processing strategies that are used may vary in different embodiments. For example, system events captured by operating system instrumentation may be partially processed on the local host if sending the system events in raw form to the CAS engine would fill or saturate available network bandwidth to the CAS engine.

System State Information

In some embodiments, the OS agent and the CAS engine collectively maintain a set of system state information that is updated as system events are collected. The state information may be maintained in volatile computer memory for fast updating. The set of state information provides a full picture of the recent state of the distributed system that delivers an application, including the recent state of application components. By doing so, a rich, detailed, real-time picture of a thread, a process, a file, a directory, an operating system volume, or a complete distributed application can be provided to a user through the presentation system.

In some embodiments, the set of state information includes one or more event lists and one or more process state tables. An OS agent on a host may maintain an event list storing recently captured and recorded system events on the host. In addition, the CAS engine may maintain an event list that aggregates system events received from multiple OS agents.

In some embodiments, each row of a process state table corresponds to a process executing on a host. An OS agent on a host may maintain a process state table for processes executing on the host. In addition, the CAS engine may maintain a process state table that aggregates processes executing on multiple hosts.

In some embodiments, each row of a process state table may be associated with additional state tables that provide additional system state information pertinent to the corresponding process. Such additional state tables may include, for example, state tables for file descriptors, network communication endpoints (e.g., sockets), and inter-process communication channels (e.g., named pipes) that the corresponding process currently has open.

Figure 6:
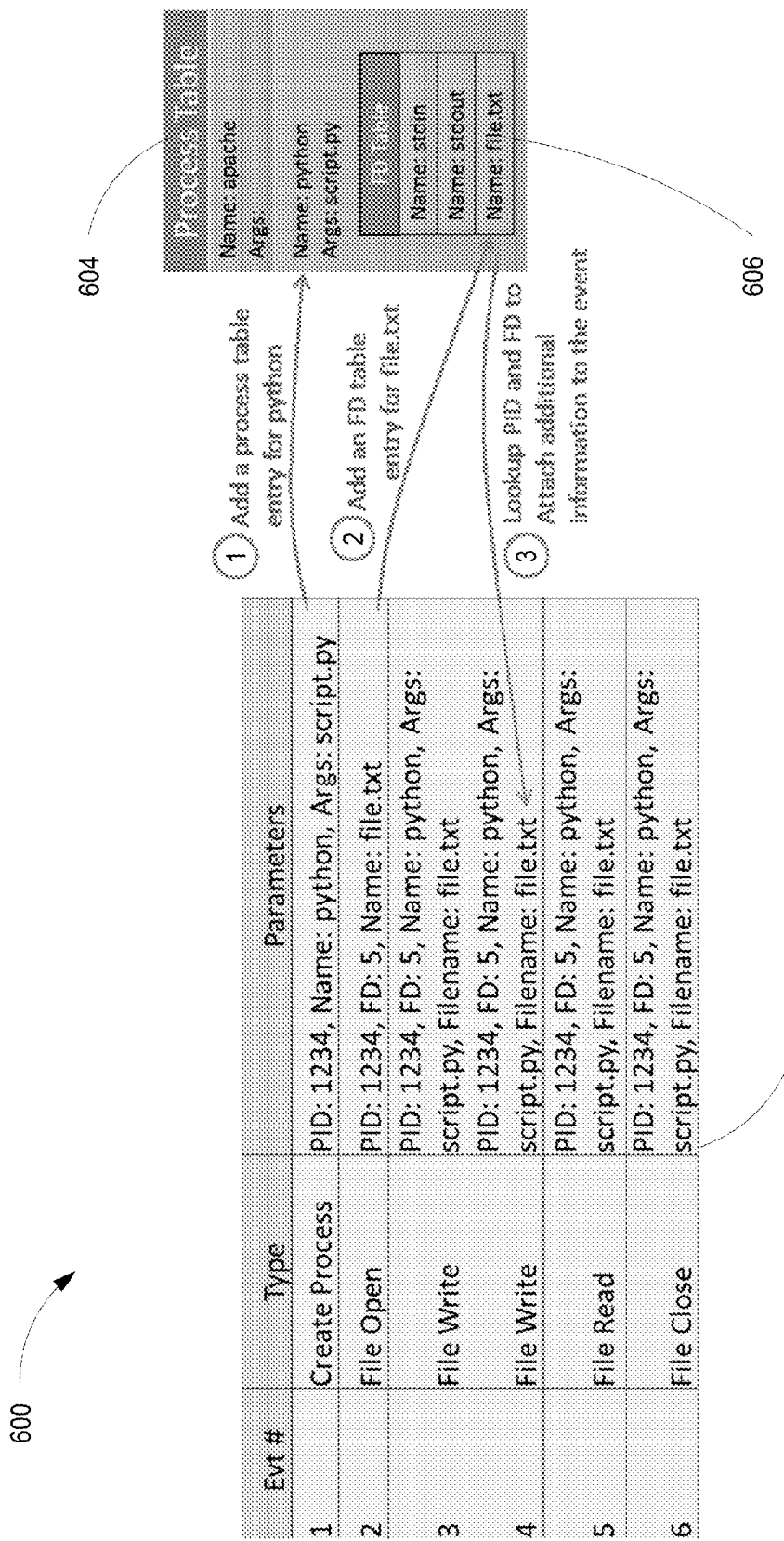
FIG. 6 illustrates a set of system state information, in accordance with some embodiments.

In some embodiments, a process state table and/or associated state tables are queried as a system event is captured so that additional contextual information that is not available from the captured system event itself can be associated with the captured event as part of the maintained system state information. For example, FIG. 6 illustrates a set of system state tables including process state table 604 and per-process file descriptor state table 606, in accordance with some embodiments. In this example, there is also an event list 602. More or less system state tables may be maintained in other embodiments.

Each item in event list 602 represents a system event captured by operating system instrumentation. For example, event #1 corresponds to an event to create a new python process that was passed the argument "script.py". The new process was assigned the process ID 1234 by the operating system.

As system events are captured, event list 602, process state table 604 and file descriptor state table 606 are updated. For example, as a result of capturing event #1, a new row is added to the process table 604 for the new python process. The row added to the process state table 604 may be associated with additional information about the new python process such as, for example, the process name, process identifier, process arguments, and current working directory. At event #2, the python process opens a file named "file.txt" which is assigned file descriptor identifier 5 by the operating system. As a result of capturing event #2, a new row is added to file descriptor state table 606 for the python process. The row added to the file descriptor state table 606 may be associated with additional information about the opened file such as the file name and the file descriptor identifier.

System state tables 600 may be queried for relevant contextual information to associate with a captured system event where such contextual information is not available from the captured system event itself. For example, for system event #1, pertinent contextual information about the corresponding system event may be available from captured system event itself. For example, the process name "python", the process argument "script.py", and the process identifier 1234 may be captured from the create process system call. In contrast, for system event #4, the contextual information available from the captured system event itself may include the process identifier 1234 and the file descriptor identifier 5 but not the process name "python", the process argument: "script.py", or the file name of file descriptor identifier 5: "file.txt". Using the process identifier and the file descriptor identifier captured as part of system event #4, process table 604 and file descriptor table 606 may be queried to collect additional contextual information such as the process name "python" from process table 604, the process argument: "script.py" from process table 604, and the file name of file descriptor identifier 5: "file.txt" from file descriptor table 606. This additional contextual information is recorded as part of system event #4 in event list 602.

In some embodiments, additional contextual information to associate with a captured system event is obtained from an operating system interface in addition to or instead of querying state tables. For example, additional contextual information to associate with a captured system event may be obtained from the proc file system interface on UNIX-like operating systems. Using an operating system interface such as for example the proc file system is useful to obtain additional contextual information about system events relating to processes, files, or other operating system resources that are already executing or already open when the OS agent is started on a host. In this case, the OS agent may not have captured system events associated with the creation of an already executing process or the opening of an existing file. Thus, the OS agent may not be able to query state tables to obtain additional contextual information relating to the already executing process and already opened files. Instead, the OS agent may query an operating system interface such as for example the proc file system on some UNIX-like operating systems to obtain the additional contextual information. For example, consider a file named "file.txt" having file descriptor 7 that is opened on a host before the OS agent is started on that host. After the OS agent is started, the OS agent may capture a system event pertaining to a write of some number of bytes to file descriptor 7. Since the OS agent was not executing when file "file.txt" was opened, the OS agent may not have information about the file name "file.txt" associated with file descriptor 7 when the OS agent captures the write of the bytes to file descriptor 7. However, the OS agent may capture the file descriptor identifier 7 as part of the write system call. In this case, the OS agent may query or invoke an operating system interface such as for example the proc file system on some UNIX-like operating systems to obtain the file name "file.txt" associated with file descriptor 7. In this way, additional contextual information obtained from an operating system interface can be associated with a captured system event.

By associating captured system events with additional contextual information, higher-level context surrounding captured events is created. Further, relevant performance metrics built on the higher-level context can be presented in the presentation system. For example, associating captured system events with additional context information allows a set of system events to be associated with application components involved in processing a particular application transaction. For example, each system event can be associated with a process through the process identifier associated with the system event. Where system events are captured from multiple hosts, a unique host identifier assigned by the OS agent on a host to system events captured on that host can be used to disambiguate between the multiple hosts. The application component can be determined from the name of a process when it is created. For example, the process name "httpd" may indicate a web server application component. Each system event may then be associated with an application component through a process identifier and/or host identifier associated with the system event.

Performance Management of Application Transactions

The infrastructure performance management approach based on instrumenting the operating systems of hosts, in addition to or instead of instrumenting the application stack or the network layer, enables embodiments to accurately manage the performance of the infrastructure that delivers an application.

A typical application involves a number of clients that submit HyperText Transfer Protocol (HTTP) and/or Secure-HyperText Transfer Protocol (HTTPS) requests to one or more web servers hosted in a hosted computing environment. The web servers in turn, as part of processing the HTTP & HTTPS requests, may interact with one or more other servers such as one or more application servers and/or one or more database servers.

Different client requests may generate different types of load on the server infrastructure supporting an application. For example, some client requests may transit all server tiers, some client requests may be CPU-bound, some client requests may require servers to perform a high amount of file and/or network I/O, and some client requests may generate heavy load on database servers. For a given request or set of requests, it would be useful to an application developer and others to acquire insight into which particular server resources are being used and how much of these resources are being used to process client requests.

In accordance with some embodiments, the system events collected and processed by the OS agent and the CAS engine are used to attribute resource usage to "application transactions". An application transaction starts when a request (e.g., a HTTP or HTTPS request) is received from a client process by a server process (e.g., a web server process) and ends when the full body of the corresponding response (e.g., a HTTP or HTTPS response) is sent by the server process to the client process.

Figure 7:
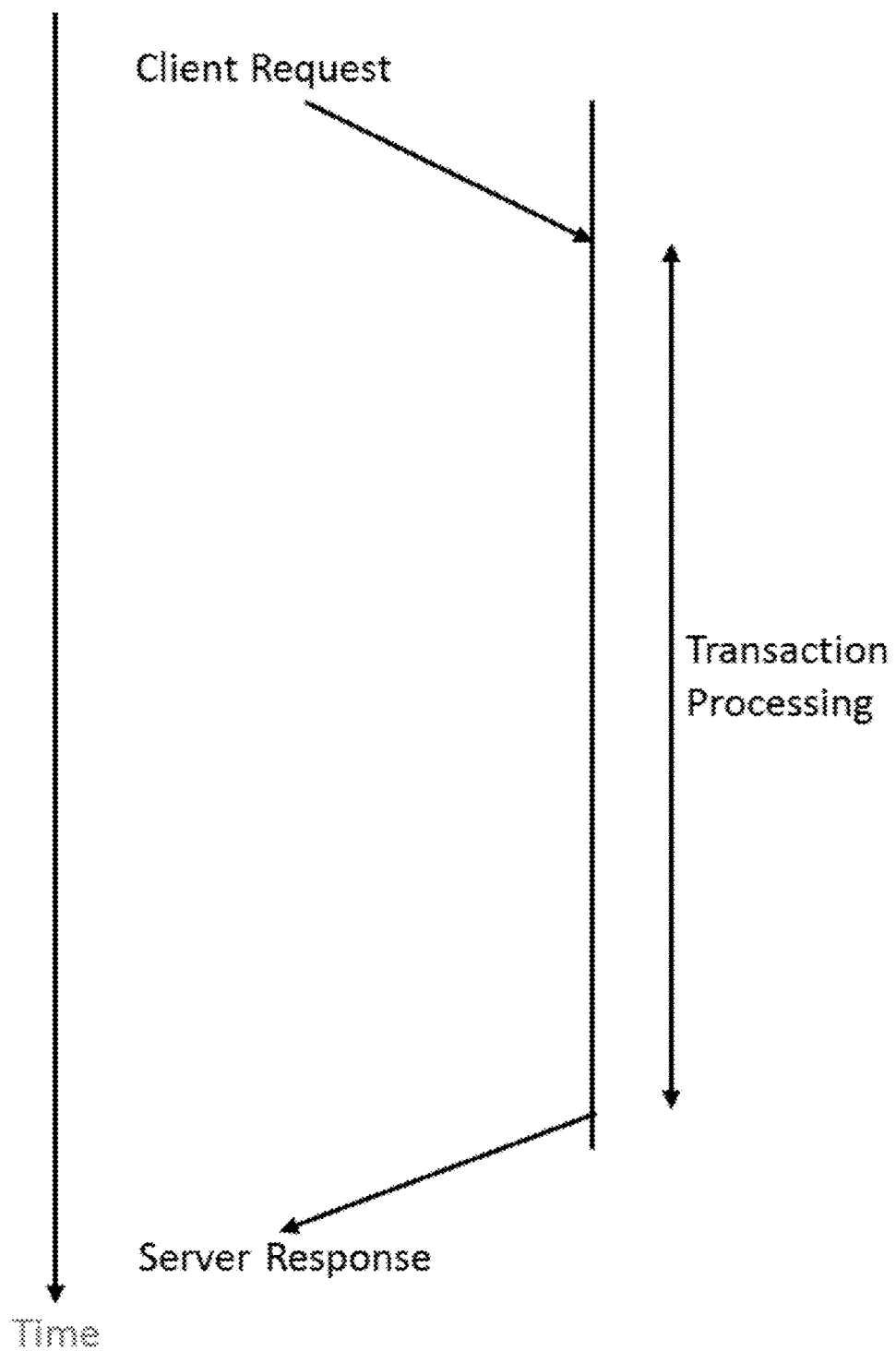
FIG. 7 illustrates an application transaction on a timeline, in accordance with some embodiments.

For example, FIG. 7 illustrates a typical application transaction on a timeline. Time increases from top to bottom of FIG. 7. A client request is sent by a client process in a client tier at a first time. At a later second time, the client request is received by a server process in a hosted tier. Some time is spent processing the client request in the hosted tier including possibly by multiple server tiers. A complete server response is sent back to the client process by the server process after processing of the client request is complete. The client process may begin receiving the server response before the complete server response has been sent by the server process. For example, the server response may involve the server process streaming content to the client process. Alternatively, the client process may not begin receiving the server response until after the complete response has been sent by the server process.

Application Transaction Segmentation

Some existing performance management solutions provide performance metrics on transaction processing time often referred to in these solutions as "response time" or "service response time". Such a performance metric is typically calculated by subtracting client request arrival time at the server process from the time the server process completes sending of the server response. However, such performance metrics provide only limited visibility into hosted tier performance. In particular, such performance metrics may indicate that a particular application took an unexpectedly long time to process but not why it took so long to process the transaction.

In accordance with some embodiments, the performance management solution uses system events captured by OS agents and results of processing thereof to segment an application by activity or resource class. In addition, performance metrics indicating the segmentation are presented in the presentation system in addition to or instead of conventional response time performance metrics.

Figure 8:
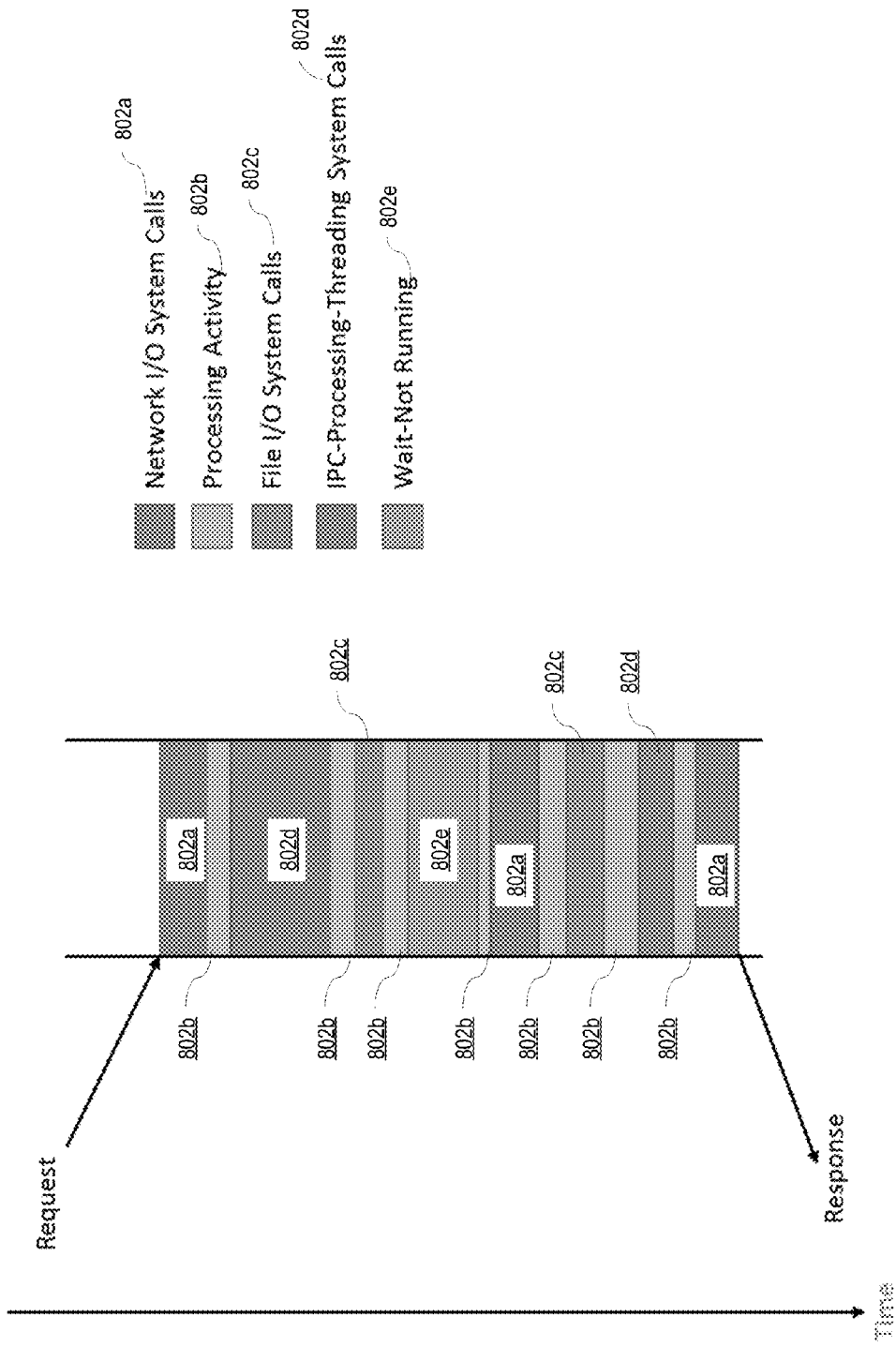
FIG. 8 illustrates segmentation of an application transaction by activity or resource class, in accordance with some embodiments.

FIG. 8 illustrates segmentation of an application transaction by activity or resource classes. In this example, there are five resource classes 802*a* through 802*e* that are determined based on the type of system calls made by an application component processing the transaction. In this example, after the client request arrives, the process spends some time in a network I/O call 802*a*, for example, reading the client request data from a network communication endpoint (e.g., a socket).

Next, the process performs some processing activity 802*b* which may be defined as time between systems calls for the process.

Next, the process spends some time in inter-process communication processing and/or threading system calls 802*d* as so on until finally the process spends some more time in a network I/O call 802*a*, for example, writing the server response data to the network communication endpoint.

By segmenting an application transaction by activity or resource classes, it makes it possible to tell not only how much time was spent processing a particular application transaction, but also which server resources (e.g., disk, memory, network, CPU, etc.) the particular application transaction used. For example, by segmenting an application transaction by activity or resource classes based on the system events captured by the OS agents and results of processing the captured system events by the CAS engine, the presentation system can indicate for the transaction, among other information, which files the transaction accessed, the time spent doing network I/O, the time spent doing disk I/O, the amount of bytes read from and written to disk, the aggregated disk I/O latency, the disk I/O latency per disk volume, directory, or file, etc. Aggregated performance metrics may also be presented such as total disk I/O by Uniform Resource Indicator (URI), disk I/O latency by file, CPU processing time by client network address, files accessed by a particular database query, etc.

Figure 9:
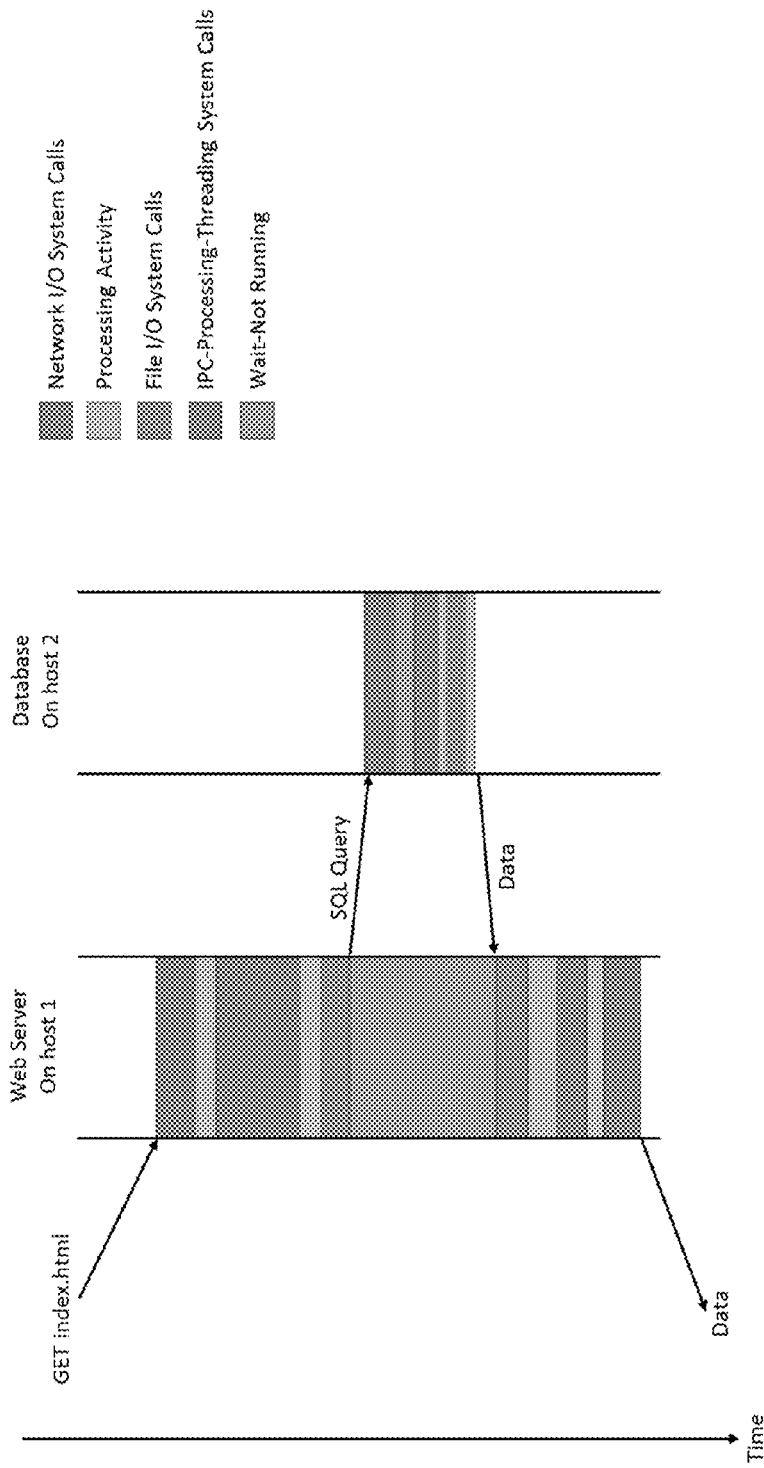
FIG. 9 illustrates segmentation of a multi-tier application transaction by activity or resource class, in accordance with some embodiments.

An application transaction that spans multiple server tiers can also be segmented. In particular, segmentation can attribute which portions of transaction processing are attributable to which tiers. For example, FIG. 9 illustrates segmentation of a multi-tier transaction by activity or resource classes. Here, part of the resource usage of the transaction is attributed to a web server process on host 1 and another part of the transaction is attributed to a database server process on host 2.

The attribution of transaction processing by the web server process on host 1 and transaction processing by the database server process on host 2 to the same application transaction is possible because of contextual information associated with system events captured from the web server process on host 1 and the database server process on host 2. In particular, system events captured from the web server process on host 1 relating to network I/O system calls for sending the SQL query to the database server process on host 2 and for receiving data from the database server process in response to sending the SQL query can be associated with network communication endpoint information available from the captured system event data itself.

For example, a captured system event from the web server process pertaining to establishing a network connection (e.g., a TCP connection) to the database process may specify a local network address, a local network port, a peer network address, and a peer network port pertaining to the connection. This contextual information can also be associated with subsequently captured system events from the web server process by querying system state tables and/or operating system interfaces as described above.

Similarly, a captured system event from the database process pertaining to accepting the network connection from the web server process may also specify a local address, a local network port, a peer network address, and a peer network port pertaining to the connection. This contextual information can also be associated with subsequently captured system events from the database server process by querying system state tables and/or operating system interface as described above. The network communication endpoint information associated with the system events captured from the web server process and the database server process can be compared to each other to determine that applications events all pertain to the same network connection.

Presentation System

As mentioned, captured system events and results of processing system events are presented to a user by a presentation system. The presentation system may include one or more server computers configured with web server software for serving web pages for display in the user's web browser at his or her computing device. The web server software may operate on the same severs as the CAS engine or on different server computers. In either configuration, the web server software of the presentation system is operatively coupled to the CAS engine. Generally, it is the function of the CAS engine to produce and store performance metric values based on captured system events for presentation by the presentation system. The function of the presentation system is to respond to user interface interaction and retrieve requested performance metric values from the CAS engine and present the performance metric values to the user in a useful way.

Application Component Map

In some embodiments, the presentation system presents an application component map to the user. The application component map includes a number of nodes. Each node represents an application component. The nodes are connected by edges. The edges represent directional network communication flow. In some embodiments, the direction of the edge depends which of the two application components represented by the nodes connected by the edge is determined to be the network client and which is determined to be the network server. In some embodiments, the client/server determination is made based on analysis of system events captured from the application components indicating which application component established a network connection with the other application. The direction of the edge is then drawn in the application component map from the node that represents the client application component to the node that represents the server application component.

Figure 10:
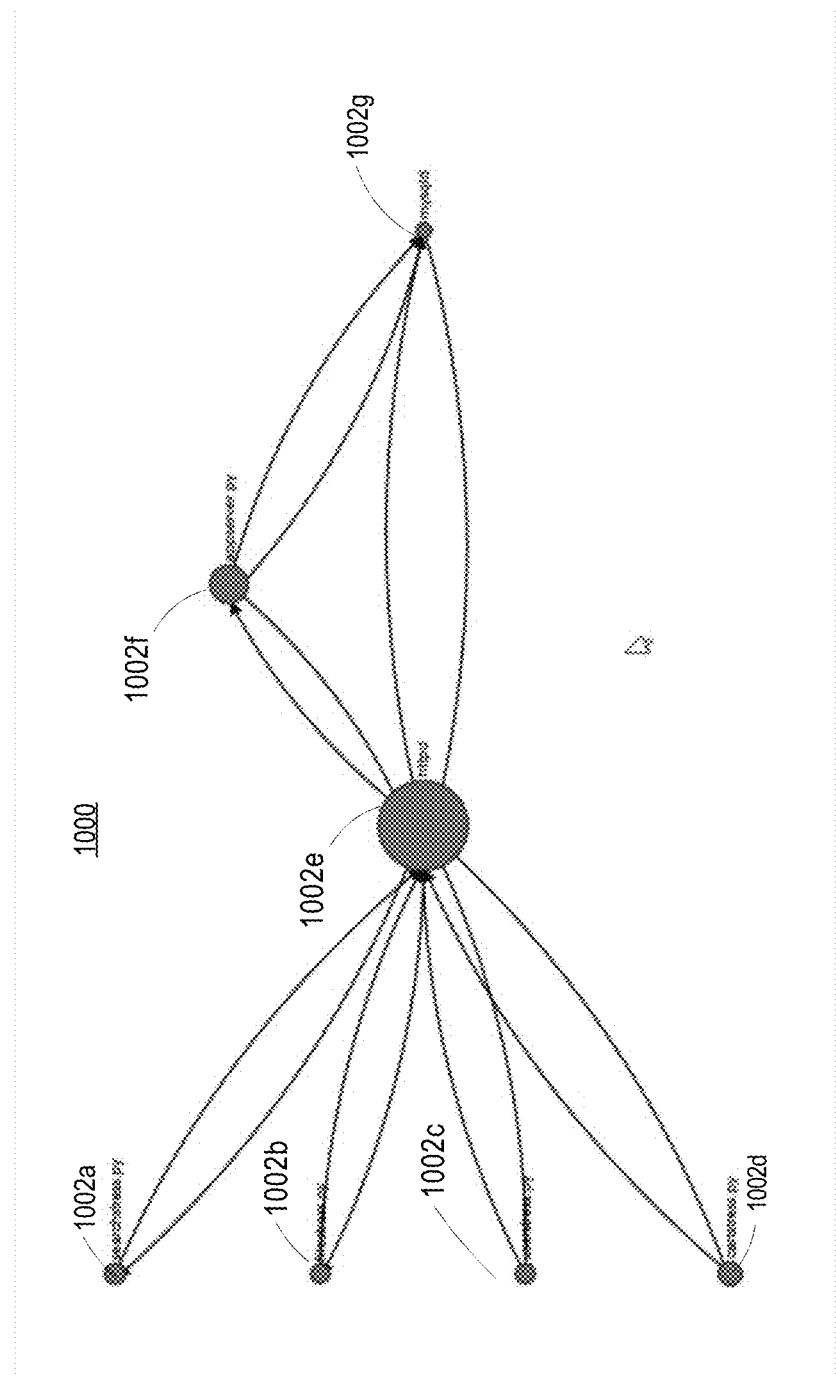
FIGS. 10-12 illustrate application component maps displayed by a presentation system, in accordance with some embodiments.

In some embodiments, the visual size of a node in the map represents a proportional amount of time the corresponding application component spent performing a particular type of activity over the course of processing one or more application transactions. For example, FIG. 10 illustrates application component map 1000 that may be presented to a user by the presentation system. Map 1000 has a number of nodes 1002a through 1002g (generally, "node 1002). Each node 1002 represents an application component from which system events have been captured using operating system instrumentation. In particular, nodes 1002a through 1002d represent application components in the client tier. Nodes 1002e through 1002g represent application components in the hosted tier. Here, the size of the nodes 1002 in the map 1000 is proportional to the amount of time the corresponding application components spent processing the application transaction.

Figure 11:
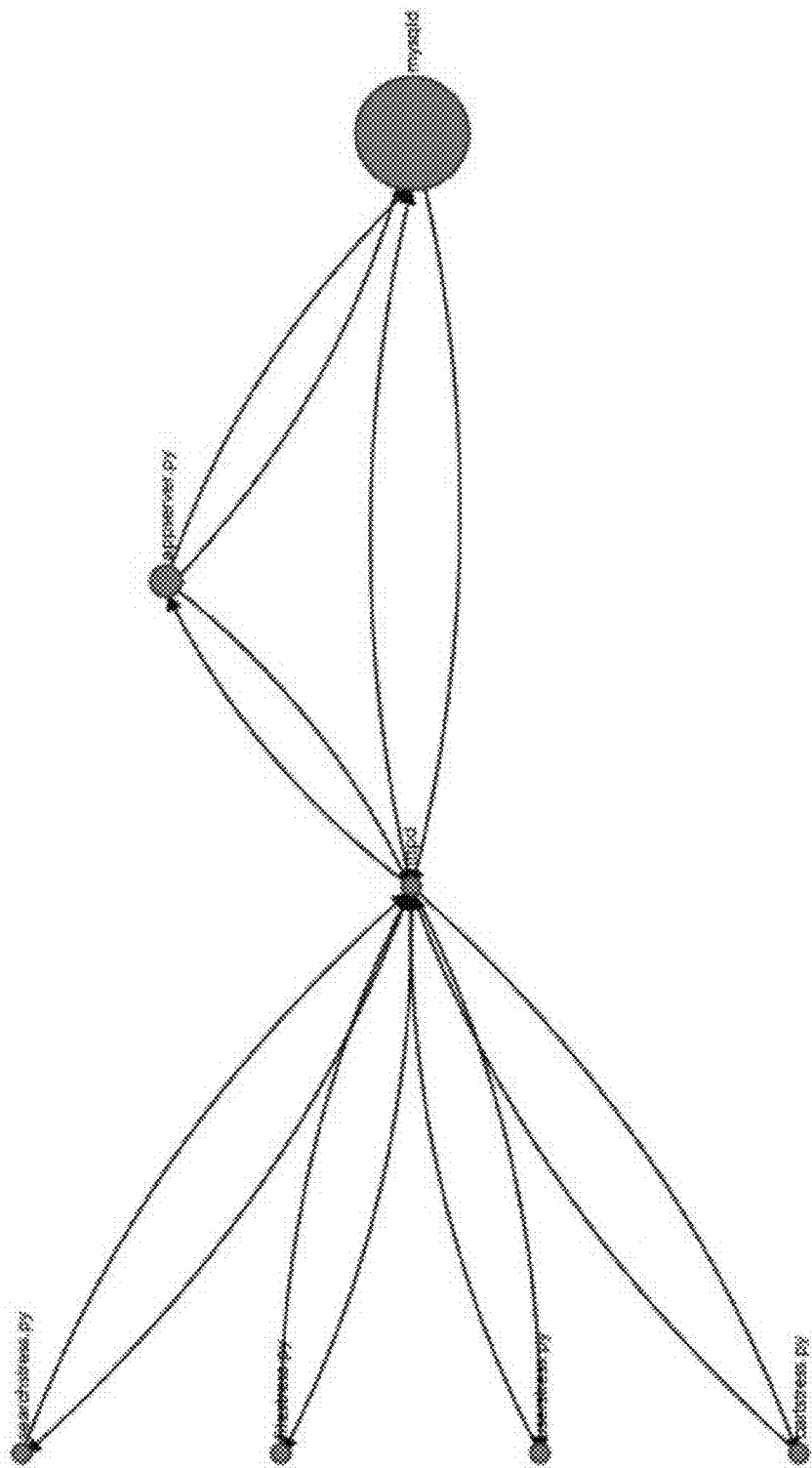

In FIG. 11, the visual size of the nodes 1002 of FIG. 10 have been changed in response to user input to the presentation system to reflect the amount of data each application component transfers on the network.

Figure 12:
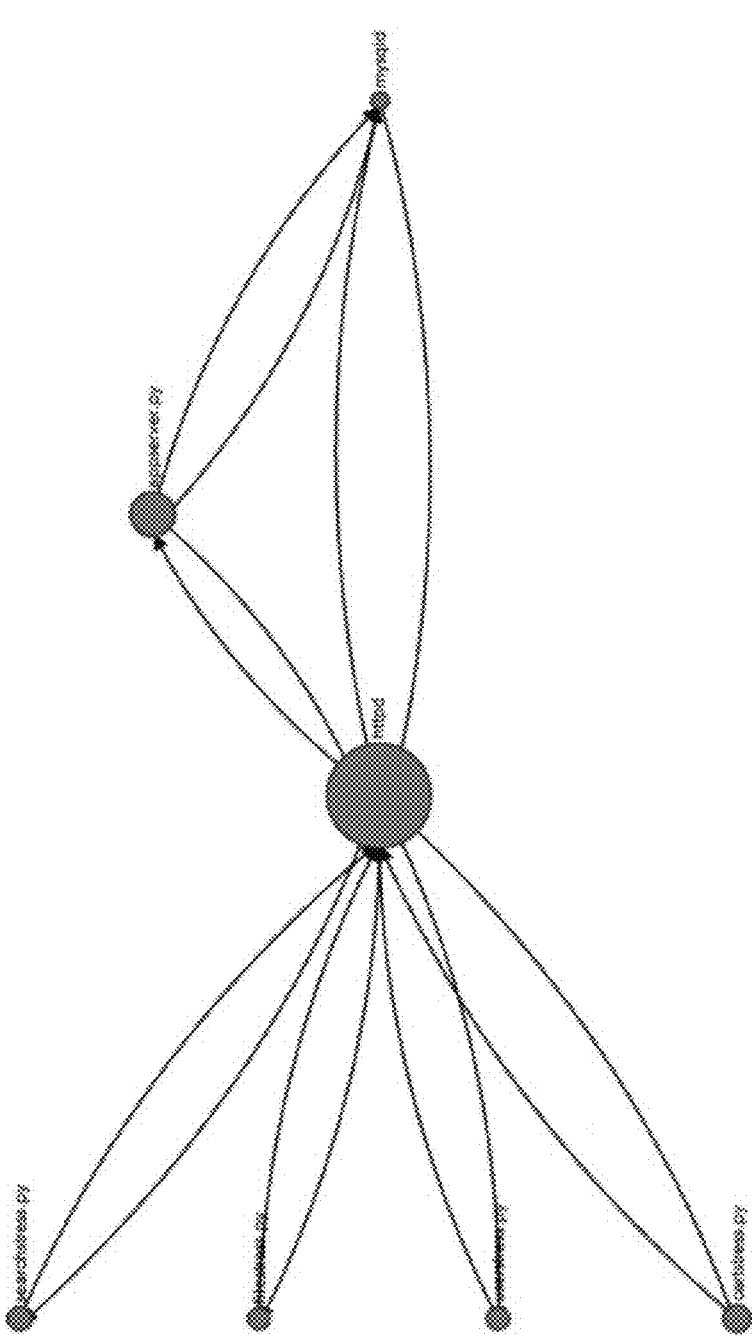

In FIG. 12, the visual size of the nodes 1002 of FIG. 100 have been changes in response to user input to the presentation system to reflect the amount of file I/O performed by each application component.

While in some embodiments, application components are represented as circles in the application component map, application components are represented as other geometric shapes or with icons in other embodiments. For example, an application component can be represented in the map with an icon that indicates the type of the corresponding application component. The size and/or shape of the icon may be used to indicate an amount of time or an amount of resource usage pertaining to a particular activity class.

File System Access Map

In some embodiments, the presentation system presents a file system access map to the user. The file system access map indicates files accessed by application components on hosts. In some embodiments, the file system access map is a treemap in which the entire area of the graph represents all file system activity during the application transactions and subsets of the entire area represent a portion of all file system activity pertaining to a particular file system directory or file. The area graph may be hierarchical to reflect the hierarchical nature of the file system.

Figure 13:
FIGS. 13-15 illustrate file system access treemaps displayed by a presentation system, in accordance with some embodiments.

For example, FIG. 13 illustrates file system access treemap 1300 that may be presented to a user by the presentation system. Treemap 1300 is in the shape of a rectangle. The area of the treemap 1300 is divided into a number of sub-rectangles. More or fewer levels of sub-rectangles are also possible. Each sub-rectangle corresponds to a file system directory or file accessed during processing of application transactions by application components. The area of the sub-rectangle represents the amount of data read from and written to the corresponding directory or file during application transaction processing.

In treemap 1300, some sub-rectangles are nested within other larger sub-rectangles reflecting the hierarchical nature of the file system. The larger sub-rectangle reflects file system activity within a "parent" directory and the nested sub-rectangle reflects file system activity within a sub-directory of the parent directory or file in the parent directory. For example, sub-rectangle 1302, highlighted in bold in FIG. 13 for illustrative purposes, represents file system activity in the parent directory "/usr/lib/python/2.7/". Nested sub-rectangle 1304, also highlighted in bold in FIG. 13 for illustrative purposes, represents file system activity within a sub-directory of "/usr/lib/python/2.7/".

Sub-rectangles representing the top level of directories and files of the file system access map can be visually distinguished in the file system access map using different fill colors. For example, sub-rectangle 1302 including all nested sub-rectangles thereof (e.g., sub-rectangle 1304) representing file system activity within the directory "/usr/lib/python/2.7/" may be colored dark green while sub-rectangle 1306 representing file system activity within the directory "/usr/include/python/2.7/" may be colored light green. In this way, the viewer can easily see that much more file system activity took place in the "/usr/lib/python/2.7/" directory than the "/usr/include/python/2.7/" directory while at the same time providing in indication through nested sub-rectangles of sub-rectangle 1302 of the distribution of file system activity within "/usr/lib/python/2.7/".

From the file system access map, a viewer can quickly determine which files and directories were accessed most For example, from treemap 1300, the viewer can see that a significant amount of file system activity took place within the "/usr/include/python/2.7/" directory.

Figure 14:
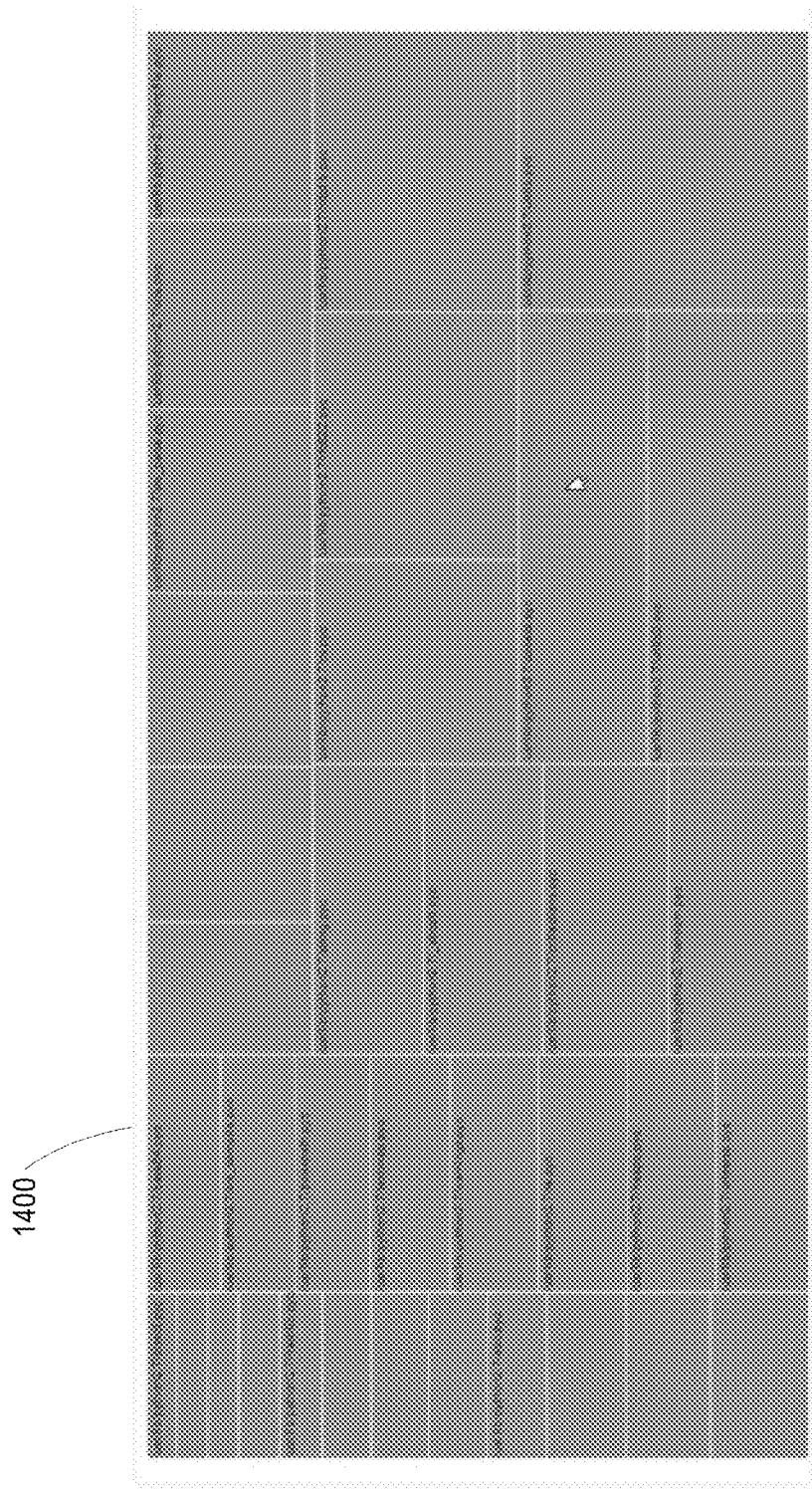

The file system access map may be interactive to allow the user to drill-down into file system access details. In particular, in response to selection of sub-rectangle of the top-level file system access map by user input (e.g., by mouse input or touch gesture on a touch sensitive display), a drill-down file system access map maybe generated and displayed to the user by the presentation system. For example, FIG. 14 illustrates a drill-down file system access treemap 1400 displayed by the presentation system in response to selection of sub-rectangle 1302 of treemap 1300. Drill-down file system access treemap 1400 indicates that most of the file system access within the directory "/usr/include/python/2.7/" pertains to loading particular python library files. An system administrator or application developer can review the drill-down treemap 1400 to see if any python libraries unnecessary for processing the application transactions are being loaded. The develop may then edit the python application source files accordingly to ensure any unnecessary python library files are not loaded, thereby reducing the amount of file system access to directory "/usr/include/python/2.7/" needed to process the application transactions.

The sizes of sub-rectangles in treemaps 1300 and 1400 represent the amount of data read from and written to various file system directories and files during application transaction processing. In some embodiments, the size of a sub-rectangle in a file system access map represents the amount of time spent reading and writing data to and from the corresponding directory or file. For example, from treemap 1300 a user can see that about half of the total amount of data read from and written to file systems involved the "/usr/include/python/2.7/" directory.

Figure 15:
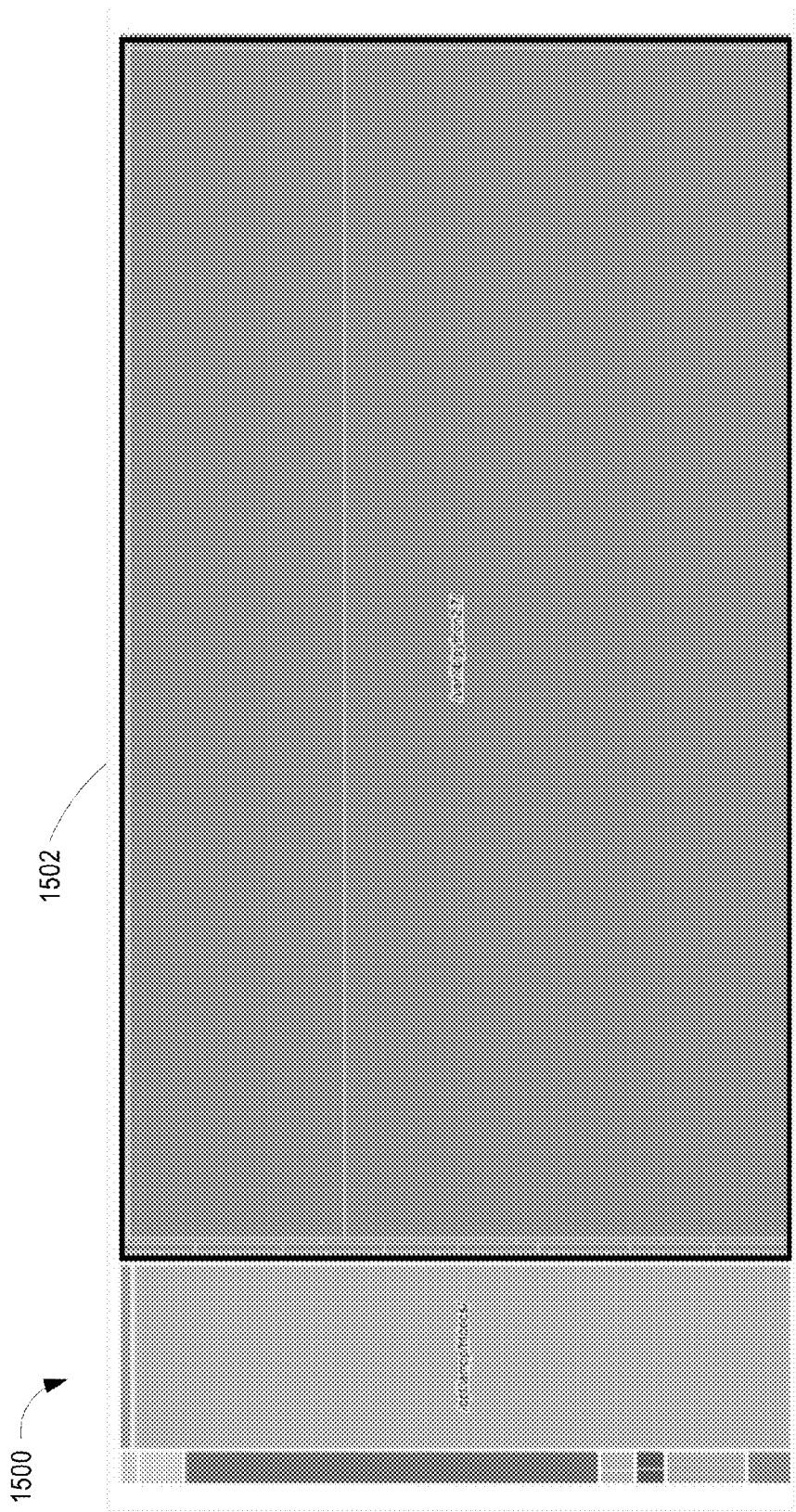

Treemap 1500 of FIG. 15 organizes file system access by time spent reading data to and from various directories and files. From treemap 1500, a user can see from the area of the entire treemap 1500 that rectangle 1502 covers that significantly more than half the file system access time involves reading data from and writing data to the "/usr/include/python/2.7/" directory. Accordingly, the user may decide that a caching solution for caching python library files stored in the "/usr/include/python/2.7/" directory is warranted to speed up file system access time for the application transactions.

Hosted-Tier Resource Usage by Client Type

Figure 16:
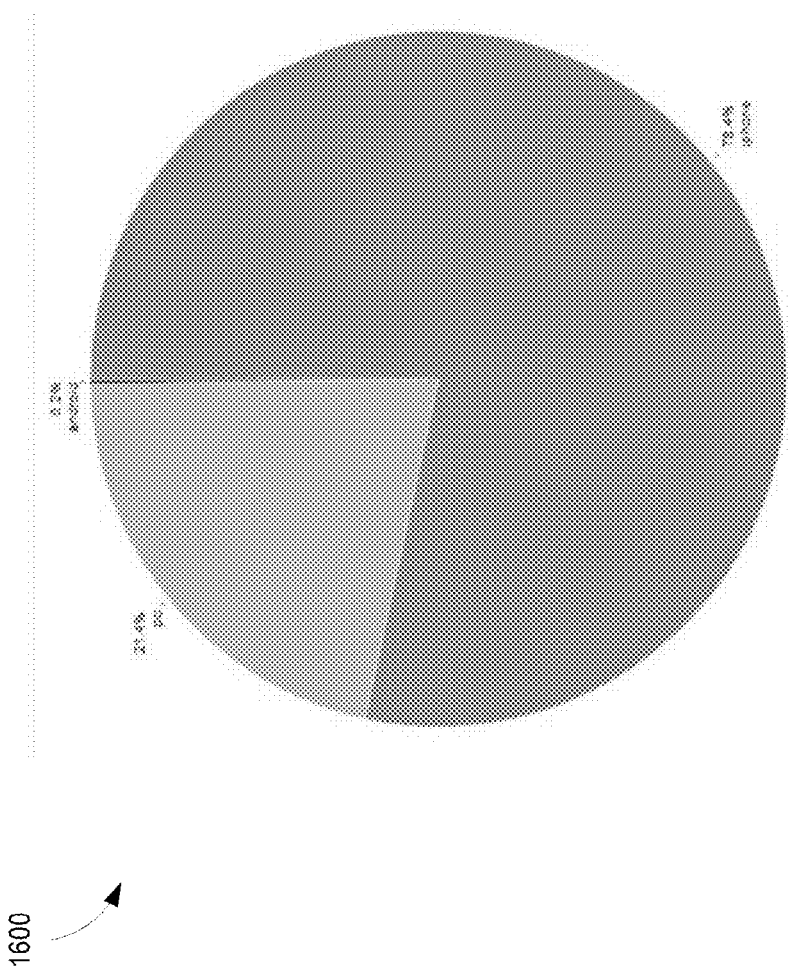
FIG. 16 illustrates a pie chart showing hosted tier resource usage by client type and displayed by a presentation system, in accordance with some embodiments.

In an embodiment, hosted infrastructure resource usage is displayed by client type. Client type information for application requests may be captured by operating system instrumentation on web servers from HTTP or HTTPS requests from clients arriving at the web servers. For example, the presentation system can present a visualization to the user indicating which client platform is using the most of a particular hosted tier resource. For example, FIG. 16 illustrates a pie chart 1600 that may be presented to a user by the presentation system. In this example, pie chart 1600 shows that the iPhone client platform causes the most disk I/O in the hosted tier with its application requests.

Hosted-Tier Resource Usage by Application Transaction URLs

Figure 17:
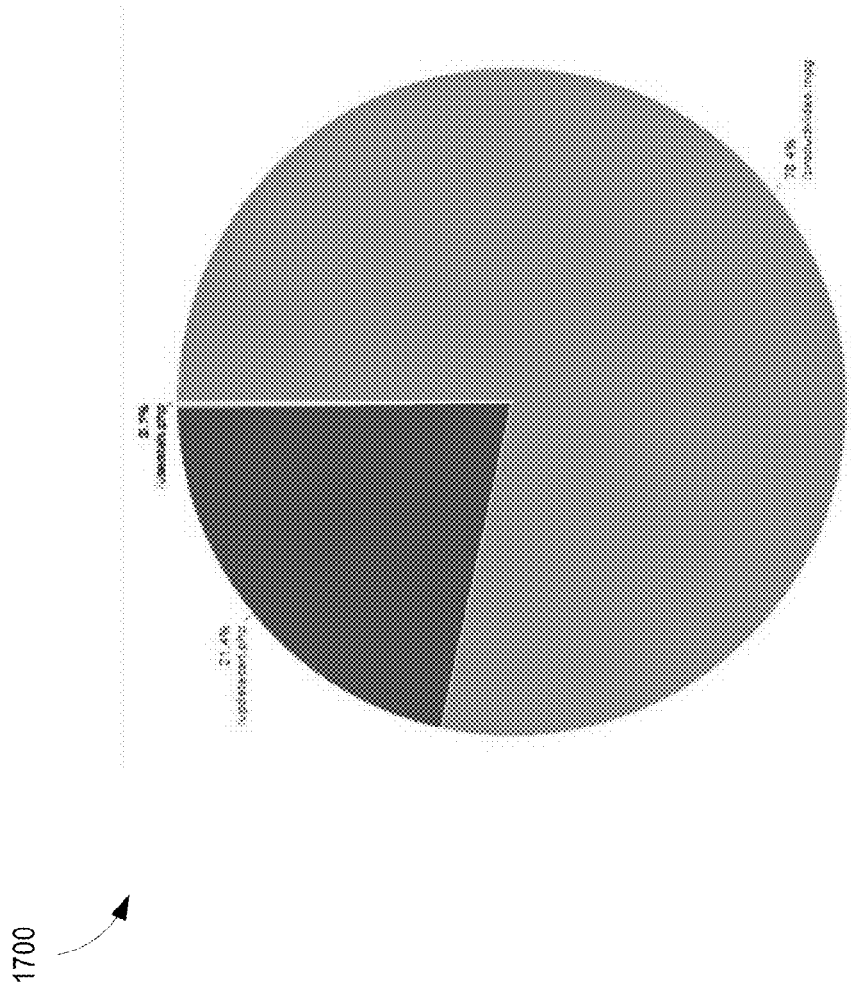
FIG. 17 illustrates a pie chart showing hosted tier resource usage by application uniform resource locators and displayed by a presentation system, in accordance with some embodiments.

In some embodiments, the presentation system allows a user to view which application transaction URLs consume the most resources of the hosted tier. For example, FIG. 17 illustrates a pie chart 1700 that may be presented to a user by the presentation system. The chart 1700 indicates disk I/O for application transactions at three different URLs of the application. As can be seen from the chart 1700, of the application transactions for the three different URLs, the application transactions for the URL "/productvideo.mpg" results in the most disk I/O in the hosted tier. This might be expected, for example, if application transactions for the URL "/productvideo.mpg" involve streaming video data from disk storage in the hosted tier to client devices. Resource usage other the disk I/O may be conveyed such as network I/O usage and CPU usage.

Captured System Events for a Single Application Transaction

Figure 18:
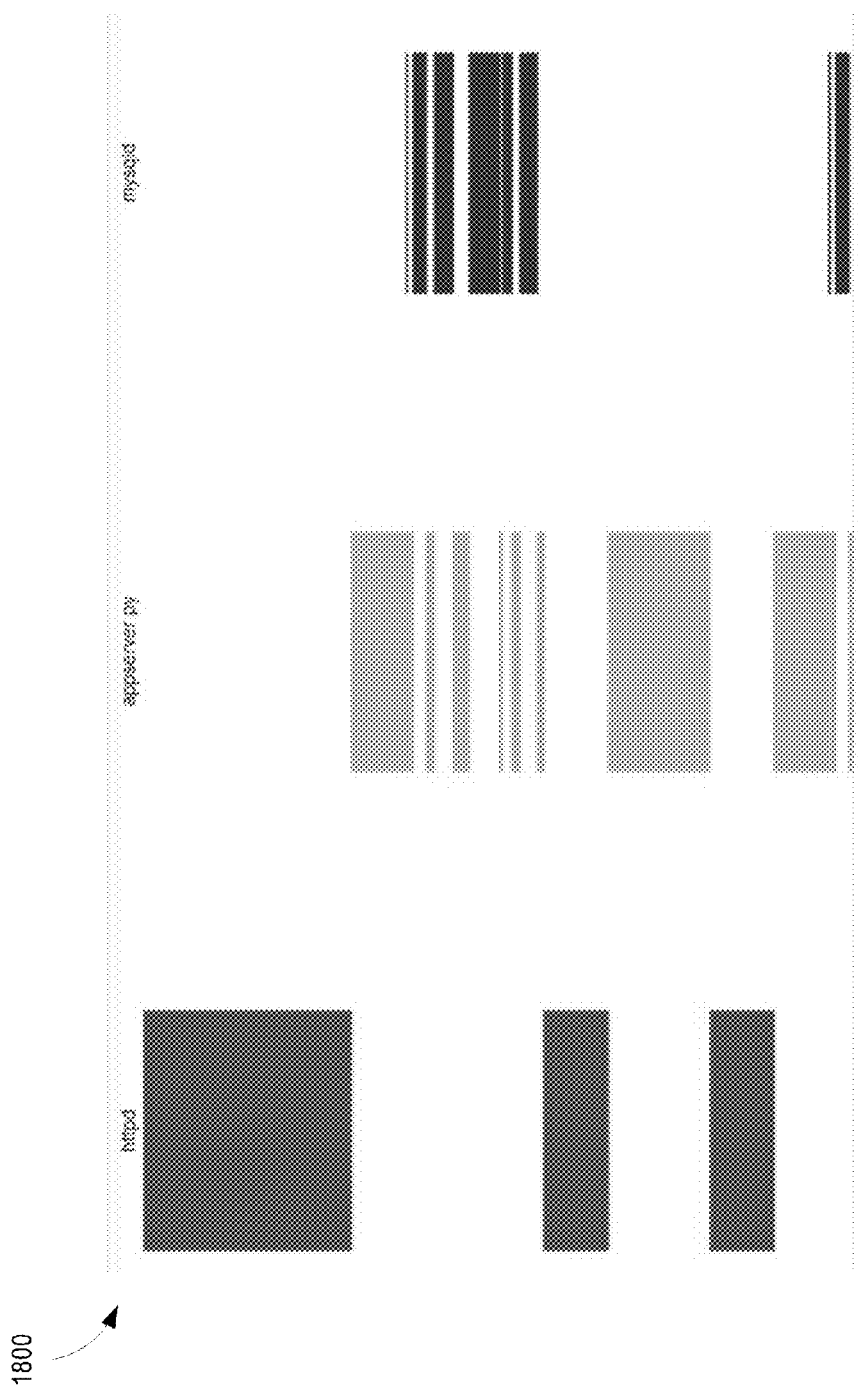
FIG. 18 illustrates a timeline view of an application transaction displayed by a presentation system, in accordance with some embodiments.

In some embodiments, the presentation system is configured to allow a user to browse the system events captured from multiple application components that process a single application transaction. For example, FIG. 18 illustrates a timeline view 1800 of a single application transaction that may be presented to a user by the presentation system. The timeline view 1800 organizes the system events captured from the application components that process the application transaction in columns, one column per application component. Within a column are blocks representing a sequence of captured system events. Gaps between blocks in a column represent periods of time when the respective application component was blocked (e.g., waiting for I/O) or not executing. For the timeline view 1800, a user can acquire a clear picture on how the application components depend on each other to process the application transaction.

Figure 19:
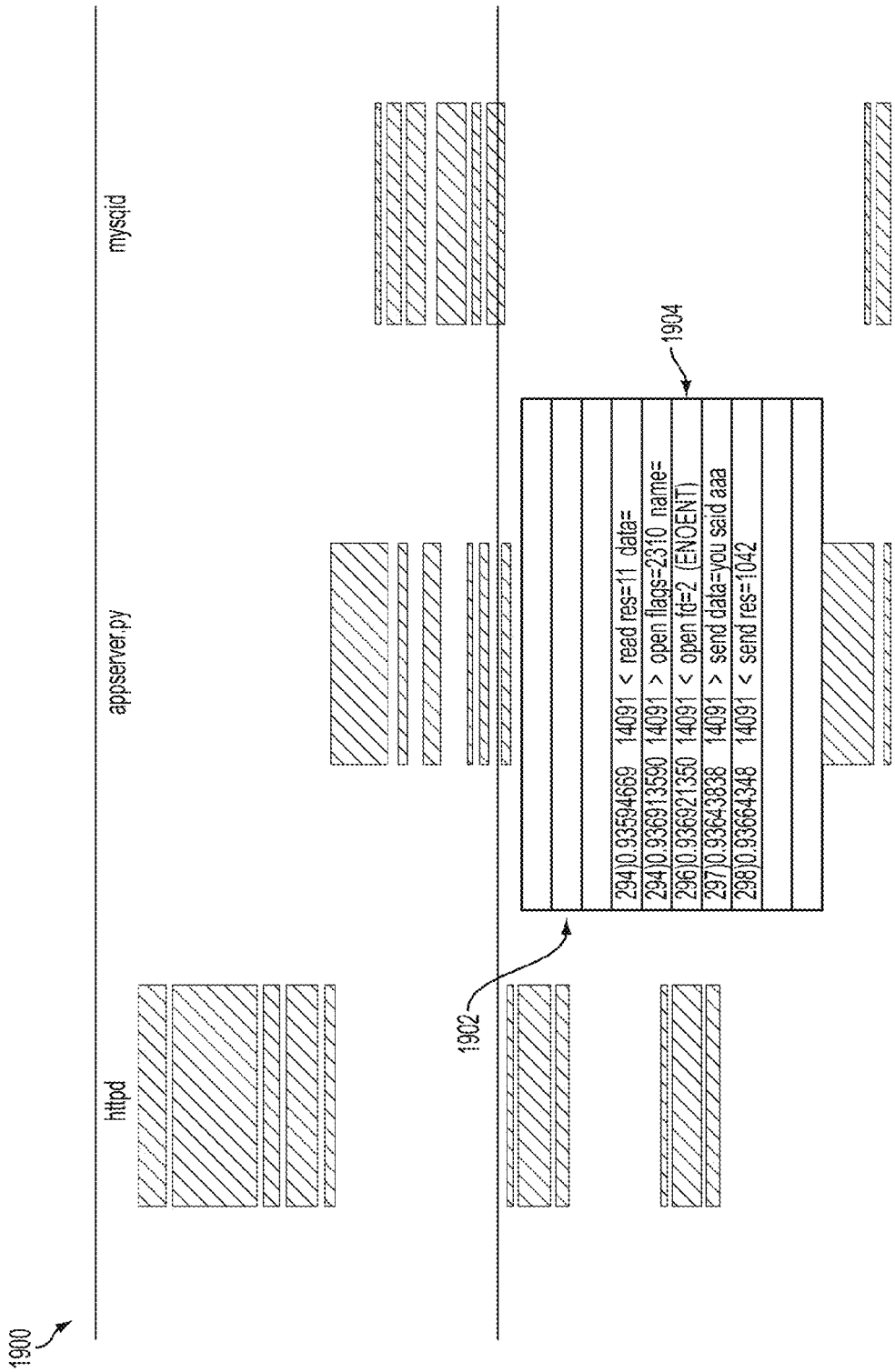
FIG. 19 illustrates a timeline view of an application transaction displayed by a presentation system, in accordance with some embodiments.

In some embodiments, the user can direct input to a block of system events in a column of the timeline view to view the individual system events that make up that block. For example, the user may mouse over the block with a pointing device or use a touch gesture on the block if displayed on a touch-sensitive display. For example, as shown in FIG. 19, the user has directed the mouse over a block in the column for the appserver.py application component. In response, the presentation system presents an overlay window 902 listing the captured system events that make up the selected block in order of capture. One of the captured system event listings 1904 is highlighted in red to indicate that the corresponding system call returned an error. Other blocks have visual indicators to indicate where a system call returned an error. For example, the first block in the column for the httpd application component has a number of red horizontal lines to indicate captured system calls that returned an error. The user can direct input to the block to discover the details of those errors.

Presentation System Graphical User Interfaces

FIG. 20, FIG. 21, FIG. 22, FIG. 23, FIG. 24 illustrate examples of web pages that may be presented to a user by the presentation system based on system events collected and processed by the CAS engine.

Figure 20:
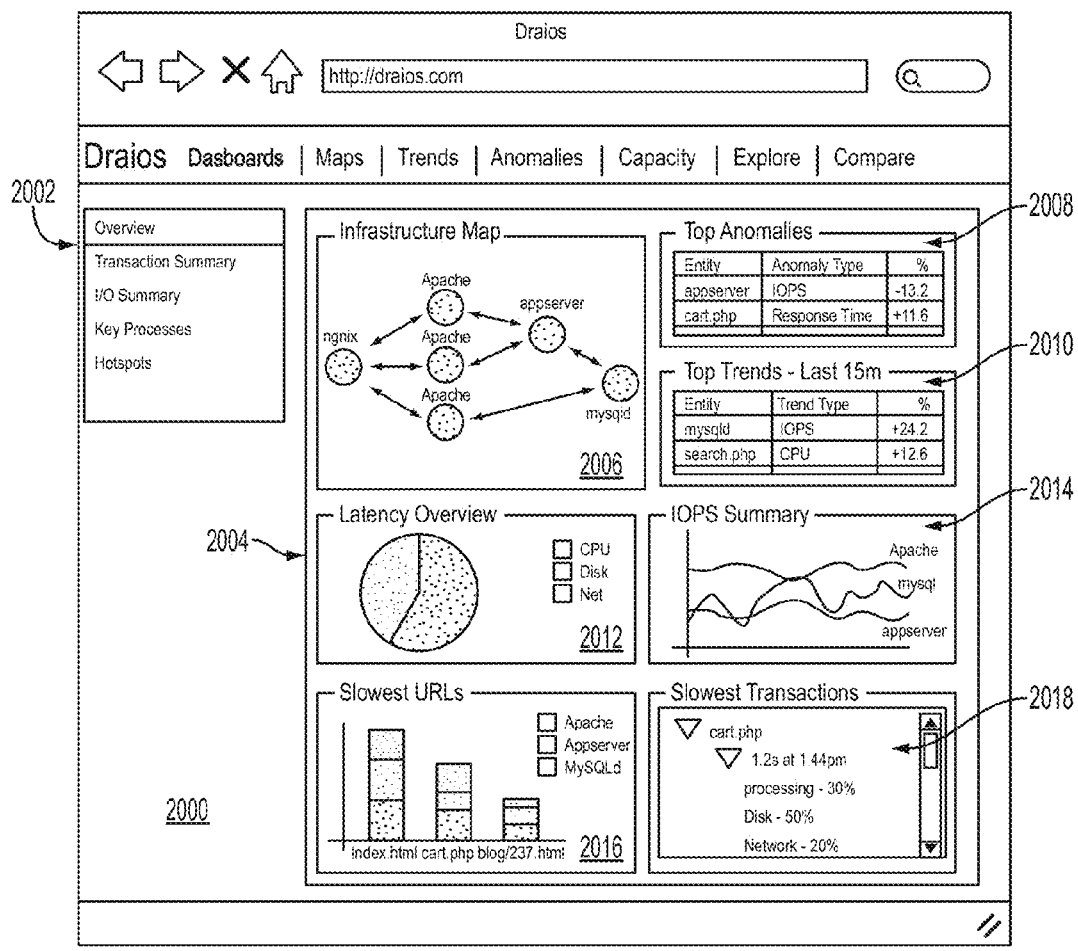
FIG. 20, FIG. 21, FIG. 22, FIG. 23, FIG. 24 illustrate examples of web pages that may be presented by a presentation system, in accordance with some embodiments.

FIG. 20 shows a web page 2000 presenting one of multiple user-selectable dashboards in the dashboard selection box 2002. In particular, web page 2000 presents the overview dashboard 2004, which is currently selected as indicated with highlighting in the dashboard selection box 2002.

The overview dashboard 2004 includes an infrastructure map widget 2006. Infrastructure map widget 2006 presents, as an application component map, the infrastructure of an application as it is composed of application components executing on hosts.

Overview dashboard 2004 also includes an anomalies widget 2008 showing performance metrics that deviate substantially from a baseline, for example, an unusually low number of input/output operations per second (IOPS) for an application server component process or an unusually high response time for an application URL.

Trends widget 2010 shows recently trending performance metrics. For example, the CPU required by the hosted tier to process the "search.php" URL has increased in the last fifteen minutes.

Latency overview widget 2012 shows the average latency application components add to application transaction processing and how much of the latency is attributable to CPU, disk I/O, or network data transfer.

IOPS Summary widget 2014 shows the disk I/O for application components involved in processing application transactions. In some embodiments, performance metrics for multiple application components for the same application component are consolidated into a single performance metric representing all of the application components for presentation by the presentation system. For example, the graph of Apache in the IOPS Summary Widget 2014 may represent an average IOPS summary across three Apache web server application components.

Slowest URLs widget 2016 shows how much time is spent by different server tiers processing the slowest processed application transaction URLs. Here, because of the operating system instrumentation, the slowest URLs widget 2016 can show not only which URLs are the slowest but how much time is spent processing the slowest URLs in different tiers. For example, slowest URLs widget 2016 can show how much time the database tier takes to process the slowest URLs which can be compared to how much time the application server tier is taking to process the same URLs.

Slowest transactions widget 2018 shows the slowest single application transaction that the hosted tier processed including the URL of the application transaction and time spent processing the transaction across different activity classes and different server tiers.

Figure 21:
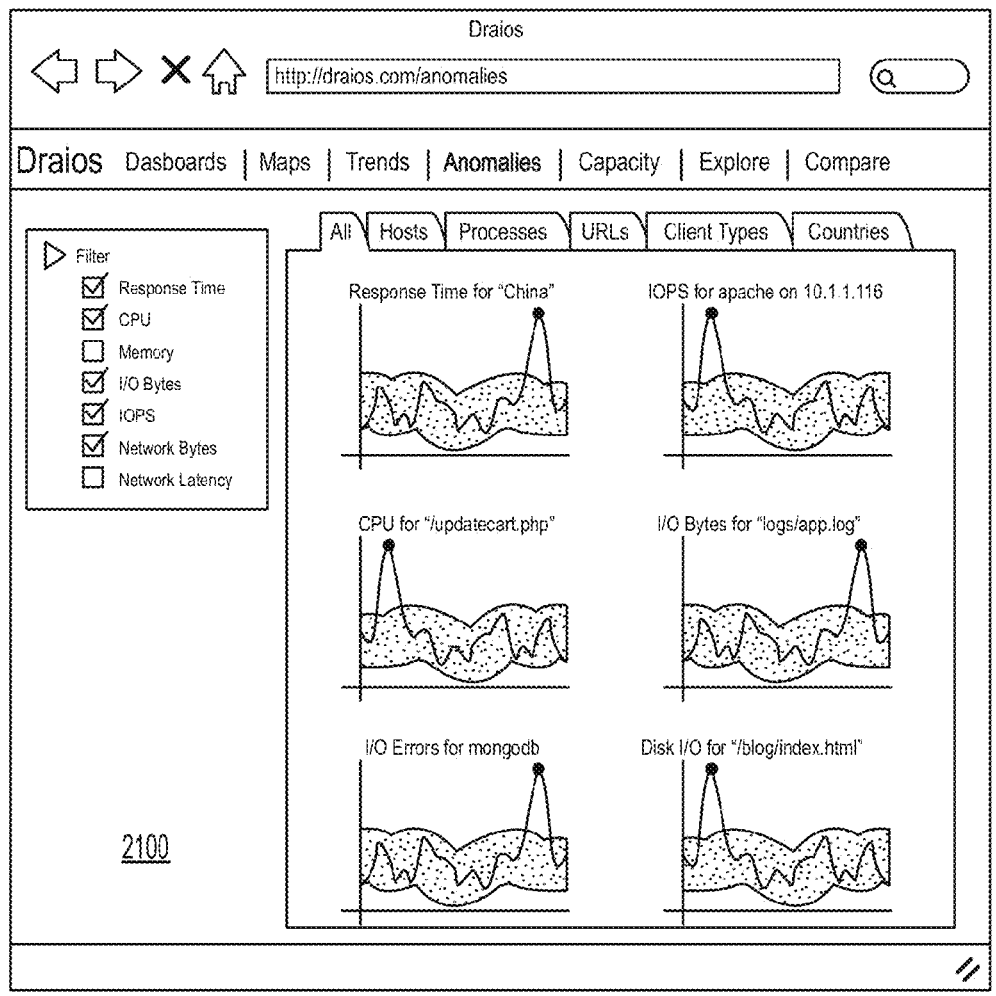

FIG. 21 illustrates an anomalies web page 2100 that may be presented to a user by the presentation system. Anomalies may be detected by base-lining key performance metrics and detecting when the performance metrics deviate usually from the baseline. A number of different performance metrics can be baselined including response time for a subset of users, disk performance or I/O errors for selected application components, and CPU usage for selected application URL, as just some examples.

Figure 22:
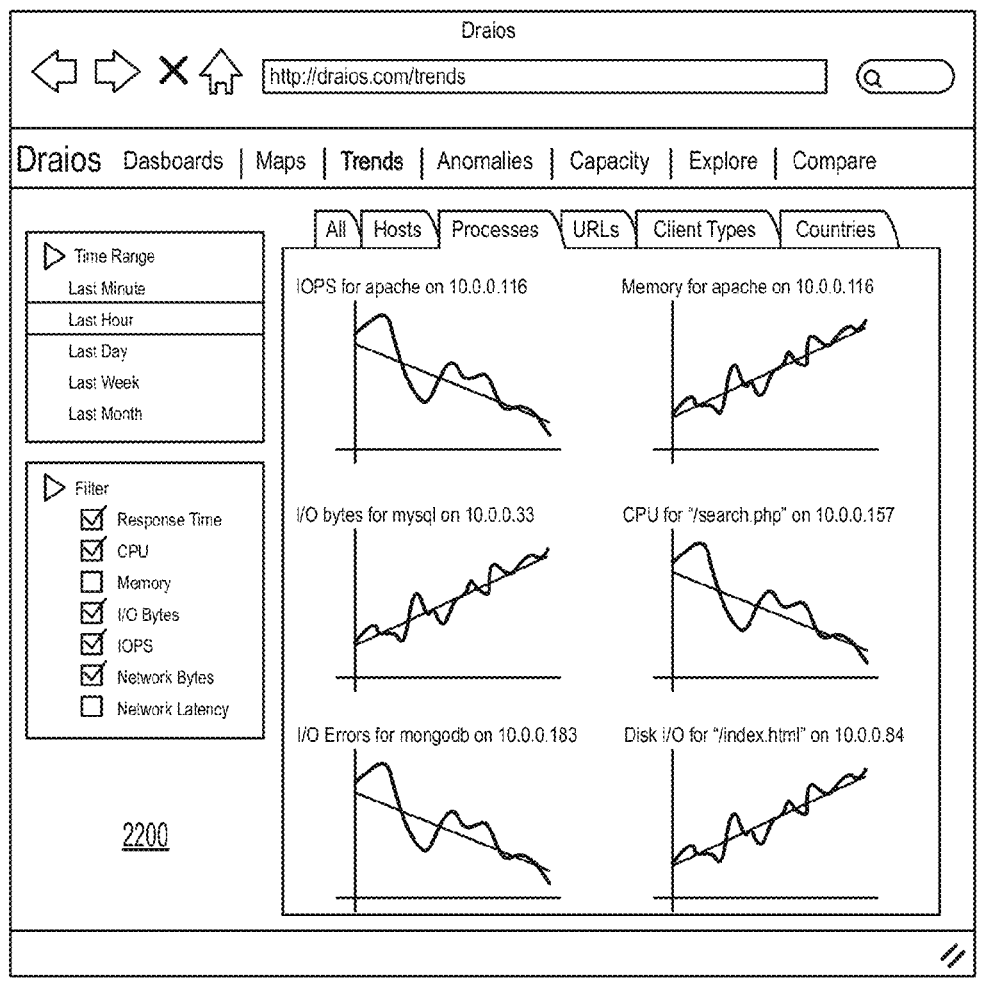

FIG. 22 illustrates a trends web page 2202 that may be presented to a user by the presentation system. Trends provide context and highlight dangerous tendencies of an application.

For example, a system administrator or application developer may receive notification from a user of an application that the application is responding slowly for the perspective of the user. Trends web page 2202 present performance metrics of the application that have recently grown or shrunk in a steady or remarkable way. Trends can be observed in the trends web page 2202 at different time ranges. Shorter time ranges, for example, on the order of minutes or hours, are useful for identifying recent storage issue or memory leaks. Longer time ranges, for example on the order of weeks or months, are useful for identifying application bottlenecks or capacity hotspots.

Figure 23:
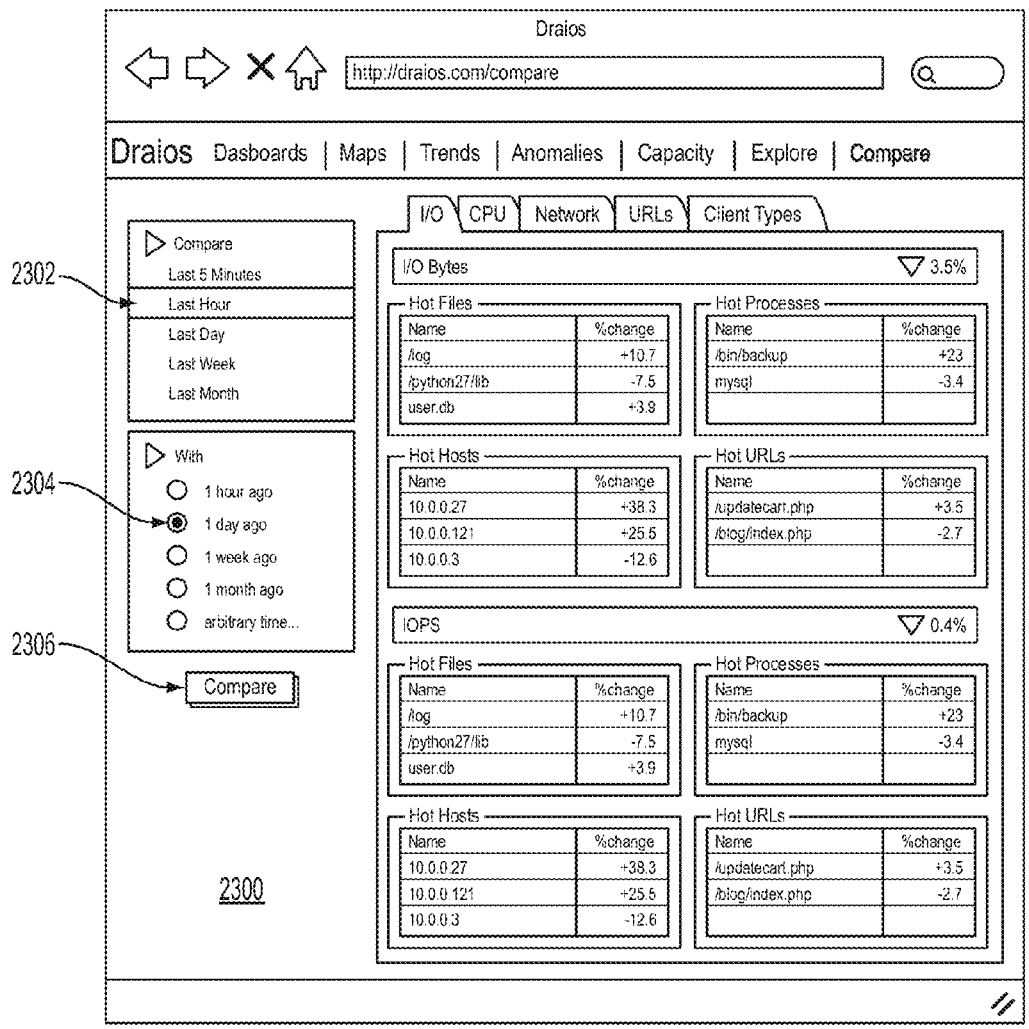

In some embodiments, the presentation system provides a compare feature. For example, a system administrator may use the compare feature after upgrading the application software or changing the application configuration. After the upgrade or change, the system administrator might be curious to understand the impact of the upgrade or change on application performance. The compare feature of the presentation system accepts two time periods as input to compare. The result of the compare operation can include displaying to the user performance metrics that have significantly changed between the two time periods. For example, FIG. 23 illustrates a web page 2300 generated by the compare feature of the presentation system. Web page 2300 is generated in response to specifying two time periods to compare. For example, web page 2300 may be generated in response to making a source time period selection 2302, a target time period selection 2304, and activating the compare button 2306. In this example, the source time period is the last hour and the target time period is the same hour on the previous day. In response, web page 2300 shows that disk I/O throughput for the application component has decreased by 0.4%. Web page 2330 also shows problem files, processes, hosts, and ULs.

Figure 24:
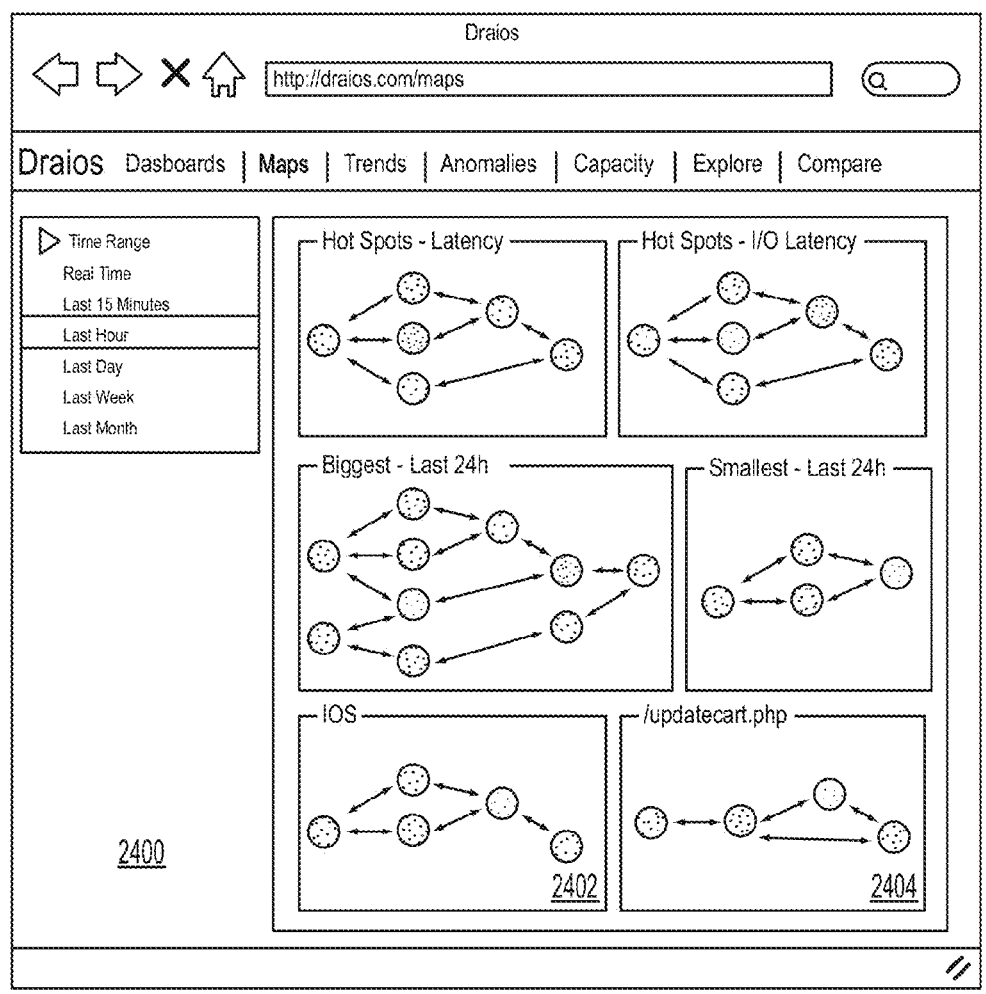

In some embodiments, the presentation system presents a maps web page to the user. For example, FIG. 24 illustrates maps web page 2400 that may be presented to a user by the presentation system. Maps web page 2400 allows the user to visualize the application layout from different useful perspectives. For example, the user can view maps web page 2400 to identify latency or processing bottlenecks. Maps web page 2400 also indicates the application infrastructure at its peak load and at its lightest load in the past hour. The maps web page may also present maps of a subset of the application infrastructure. For example, maps web page 2400 presents a subset map 2402 of the application infrastructure involved in serving IOS client devices and another subset map 2404 of the application infrastructure involved in serving a particular URL.

Application Topology Mapping

In accordance with some embodiments, the presentation system presents, in a graphical user interface (e.g., on a web page in a web browser window), an application topology map of an application executing in a hosted computing environment. Unlike existing network management solutions capable of generating a topology map of identified hosts, the application topology map presented by the presentation system reveals identified logical dependencies between identified application components. The application components and the logical dependencies there between are identified based on analysis of system events captured and collected by hosts in the hosted computing environment. By mapping logical dependencies between application components, the application topology map provides greater visibility into the application, reduces operational costs associated with supporting the application, and increases the productivity of application developers that develop the application and system administration personnel that support the application.

In an embodiment, the application topology map comprises nodes and edges connecting the nodes. Each of the nodes can represent an identified application component. Each edge can represent an identified logical dependency between two application components represented by the nodes. For example, an application topology map may comprise a first node that represents a web server instance, a second node that represents an application server instance, and an edge from the first node to the second node that represents a logical dependency of the web server instance on the application server instance. Unlike existing network management tools that present a topology map showing network dependencies between hosts, the application topology map can show logical dependencies between application components, in addition to or instead of showing logical dependencies between hosts. By doing so, visibility into logical dependencies between application components is provided.

A logical dependency may defined as a communication dependency between any two of an application component, a host, a process, or a thread. A logical dependency may include, but is not limited to, a network dependency. For example, a logical dependency may exist between two processes executing on the same host where the tow processes communicate with each other using a non-network-based inter-process communication mechanism such as, for example, a UNIX socket, a named pipe, and the like.

An application component of an application deployed in a hosted computing environment may be defined as one or more processes (and the threads thereof) executing on one or more hosts in the hosted computing environment that provide particular functionality of the overall application when executing on those hosts. Processes in the hosted computing environment and the hosts processes execute on can be identified in the system events collected from the OS agents installed on the hosts. Identified processes can then grouped into application components based on information in the collected system events that indicate which processes belong to which application components. Such information may include process identifiers, thread identifiers, process names, host names, network port identifiers, network protocols, process arguments, thread arguments, network addresses, information reflecting network or inter-process communications between processes, or any other information in the system events that indicate which processes and threads belong to which application components. In some embodiments, the OS agent identifies a network protocol used by an application component by resolving a network port accessed by the application component and/or by inspecting the payload sent and/or received by the application component on a socket file descriptor. In some embodiments, the information in collected system events includes host tags that identify application components. For example, the host tags may be provided to the OS agent during a startup or configuration phase. Host tags can also be provided to the OS agent by way of a hosted service provider. For example, during a startup or configuration phase, an OS agent on a host can query a management service (e.g., via a HTTP or HTTPS request) offered by the hosted service provider to obtain the host tag assigned to the host. The host tag may be assigned to the host by a user using a management console offered by the hosted service provider. The host tag itself may be a name or other character string label for the host.

An application component may correspond to any one of a single process executing on a single host, multiple processes executing on a single host, or multiple processes executing on multiple hosts. For example, an application component could be any one of a web server instance, a cluster of web server instances, an application server instance, a cluster of application server instances, a database server instance, a cluster of database server instances, or other logical set of one or more processes executing on one or more hosts in the hosted computing environment.

A node in the application topology map that represents an application component is referred to herein as an "application component node". In an embodiment, an application component node comprises (contains) one or more "host" sub-nodes. A host sub-node represents a host on which one or more processes of the application component represented by the containing application component node executes. The map can further comprise an edge from a host sub-node to another application component node of the application topology map or to another host sub-node. For example, an application topology map may comprise a first application component node representing a web server instance, a second application component node representing an application server instance, and an edge. The first application component node may further comprise (contain) a first host sub-node representing a first host on which one or more processes of the web server instance executes. The application topology map may further comprise an edge from the first host sub-node to the second application component node. This edge represents an identified logical dependency that the web server instance executing on the first host has on the application server instance. Unlike existing network management solutions that present a topology map showing network dependencies between hosts, the application topology map can show a logical dependency that an application component executing on a host has on another application component, in addition to or instead of showing network dependencies between hosts. By doing so, visibility into network dependencies between application components executing on hosts and other application components is provided.

While in some embodiments the application topology map shows logical dependencies between application components executing on different hosts, the application topology map shows logical dependencies between application components executing on the same host in other embodiments. For example, the application topology map may comprise a process sub-node of a host sub-node that represents a web server process executing on a host and another process sub-node of the same host sub-node that represents a database server process executing on the same host and an edge between the two process sub-nodes representing a logical dependency between the web server process and the database server process. As another example, the application topology map may comprise a thread sub-node of a process sub-node that represents a first thread of a web server process and another thread sub-node of the same process sub-node that represents a second thread of the web server process and an edge between the two thread sub-nodes representing a logical dependency between the first thread and the second thread.

As another example, continuing the previous example, the second application component node of the application topology map representing the application server instance may comprise a second host sub-node representing a second host that executes one or more processes of the application server instance. The application topology map may further comprise an edge from the first host sub-node to the second host sub-node. The edge represents an identified logical dependency of that the web server instance executing on the first host has on the application server instance executing on the second host.

Unlike existing network management solutions that present a topology map showing network dependencies between hosts, the application topology map can show a logical dependency that an application component executing on a host has on an another application component executing on another host, in addition to or instead of showing network dependencies between hosts. By doing so, visibility into logical dependencies between application components executing on hosts is provided.

In an embodiment, edges of the application topology map represent logical dependencies between map entities connected by the edges. A logical dependency exists when an application component calls, invokes, or messages another application component via a network interprocess communication mechanism such as, for example, a network remote procedure call. Logical dependencies can be identified from system events captured and recorded by OS agents installed on the hosts that execute the application components. For example, the CAS engine may identify a logical dependency that application component A1 has on application component A2 upon identifying a system event captured from a process of application component A1 indicating that the process sent a network message and a system event captured from a process of application component A2 indicating that the process of application component A2 received the network message sent by the process of application component A1.

Logical dependencies between application components and hosts can be identified from system events in a similar fashion. For example, the CAS engine may identify a logical dependency that host H1 of application component A1 has on application component A2 upon identifying a system event captured from a process of application component A1 executing on host H1 indicating that the process sent a network message and a system event captured from a process of application component A2 indicating that the process of application component A2 received the network message sent by the process of application component A1 executing on host H1.

Likewise, logical dependencies between hosts can be identified from system events. For example, the CAS engine may identify a logical dependency that host H1 of application component A1 has on host H2 of application component A2 upon identifying a system event captured from a process of application component A1 executing on host H1 indicating that the process sent a network message and a system event captured from a process of application component A2 executing on host H2 indicating that the process of application component A2 executing on host H2 received the network message sent by the process of application component A1 executing on host H1.

In an embodiment, an edge in the application topology map connects two application component nodes, an application component node and a host sub-node, or two host sub-nodes. For example, an edge from application component node A1 representing a first application component to application component node A2 representing a second application component represents a logical dependency of the first application component on the second application component. An edge from application component A1 to host sub-node H1 of application component A2 represents a logical dependency of the first application component on the second application component executed at the host represented by host sub-node H1. An edge from host sub-node H2 of application component A1 to host sub-node H1 of application component A2 represents a logical dependency of the first application component executed at the host represented by host sub-node H2 on the second application component executed at the host represented by host sub-node H1.

Performance Metrics

In an embodiment, one or more performance metrics are computed for one or more application components represented in an application topology map and values of the performance metrics are displayed in a graphical user interface that also presents the map. For example, the performance metrics can be computed by the CAS engine and the graphical user interface generated by the presentation system. By presenting the application topology map in conjunction with the computed performance metrics in the graphical user interface, a user viewing the graphical user interface is provided greater insight into the computing performance of the application in the hosted computing environment.

In an embodiment, the performance metrics are computed from one or more sets of system events captured and recorded by OS agents executing on hosts in the hosted computing environment. For example, the one or more sets of systems events can be collected by the CAS engine and the CAS engine can compute the performance metrics there from.

In an embodiment, each set of system events corresponds to a continuous period of time referred to herein as a "sample time window". Thus, each set of system events and each system event in a set of system events belong to a sample time window. Each sample time window can vary in length from a short as a few seconds, a few minutes, or a few hours to as long as a day, a few days, a week, or longer. A sample time window to which a system event belongs can be determined based on a time that indicates roughly when the system event occurred. For example, a capture time may be associated with a system event by the OS agent when the system event is captured by the OS agent. For example, when the OS agent captures a system event, a current system clock time can be used as the capture time for the system event. As another example, a collection time may be associated with a system event by the CAS engine when the system event is collected by the CAS engine. For example, when the CAS engine collects or obtains a system event from an OS agent, a current system clock time can be used as the collection time for the system event. In some cases, a time indicating when the system event occurred is intrinsic to the system event itself. For example, a system event may comprise a timestamp generated by a process or an operating system associated with the system event.

During a sample time window, an application deployed in a hosted computing environment may process a number of application transactions and thereby cause a number of system events belonging to the sample time window to be captured by OS agents in the hosted computing environment. As described above with respect to FIG. 7, an application transaction typically starts when a request (e.g., a HTTP or HTTPS request) is received from a client process by a server process (e.g., a web server process) and ends when the full body of the corresponding response (e.g., a HTTP or HTTPS response) is sent by the server process to the client process. When a server process executing on a host receives the request from the client, the server process typically distributes the request to one or more other hosts in the hosted computing environment. Processes on each of those hosts may in turn distribute the requests they receive to other still other hosts in the hosted computing environment. In other words, a single client request of application in a hosted computing environment may cause a "fan-out" of multiple levels (tiers) of multiple requests within the hosted computing environment.

Figure 25:
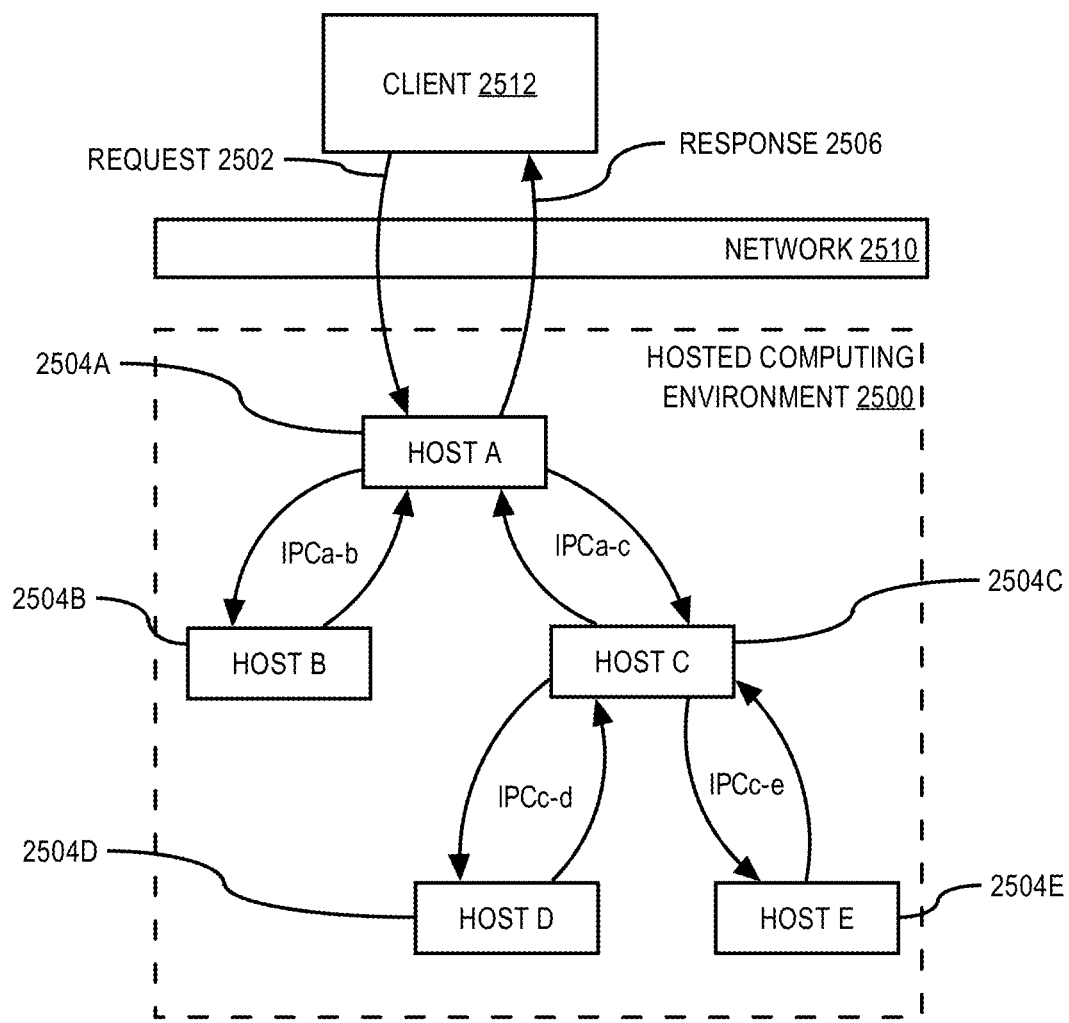
FIG. 25 illustrates an example of the fan-out of a client request through hosts of a hosted computing environment.
Figure 26A:
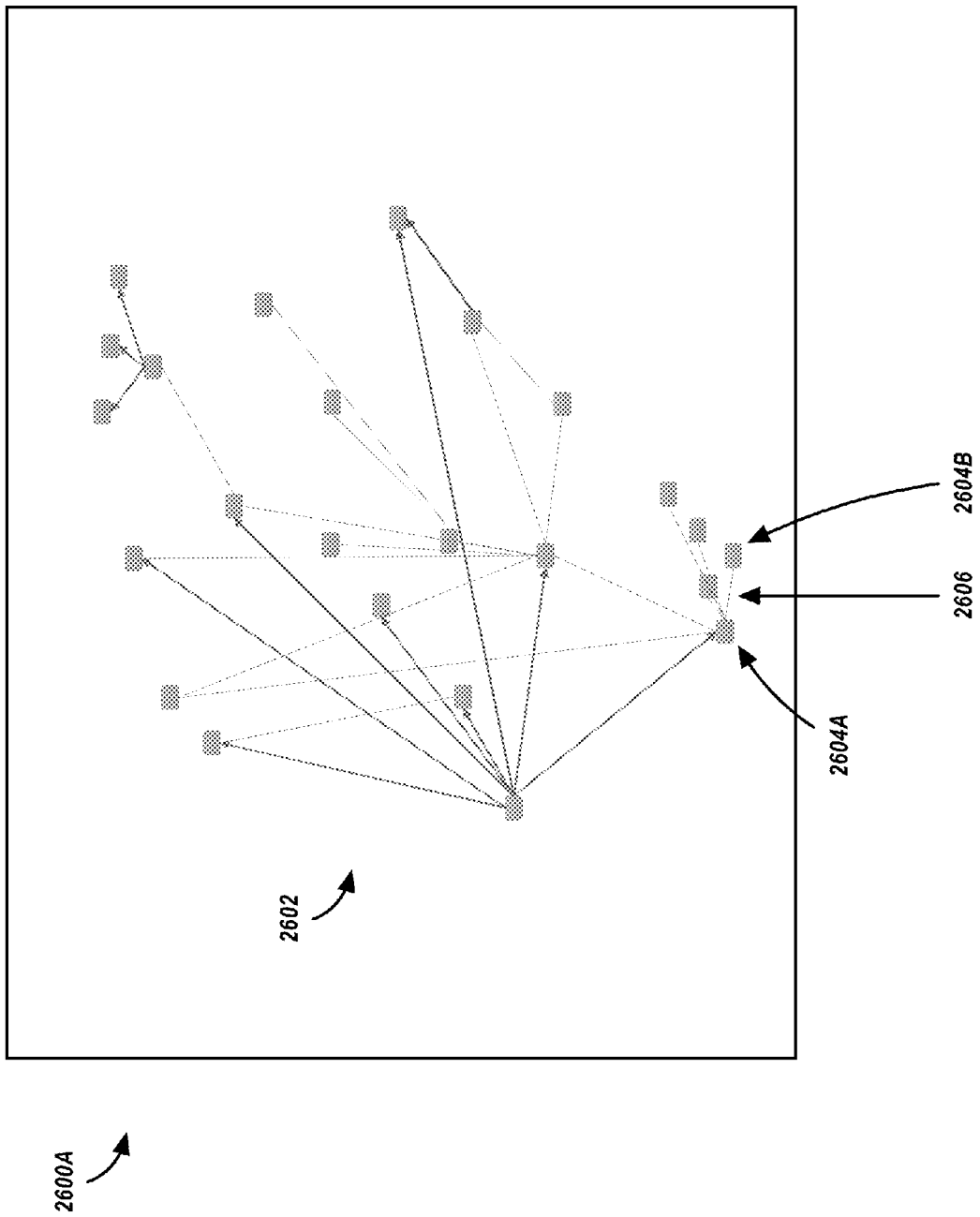
FIG. 26A, FIG. 26B, FIG. 26C, FIG. 26D, FIG. 26E, FIG. 26F, FIG. 26G, FIG. 26H illustrate a zoom feature of an application topology map presented by a presentation system, in accordance with some embodiments.
Figure 26B:
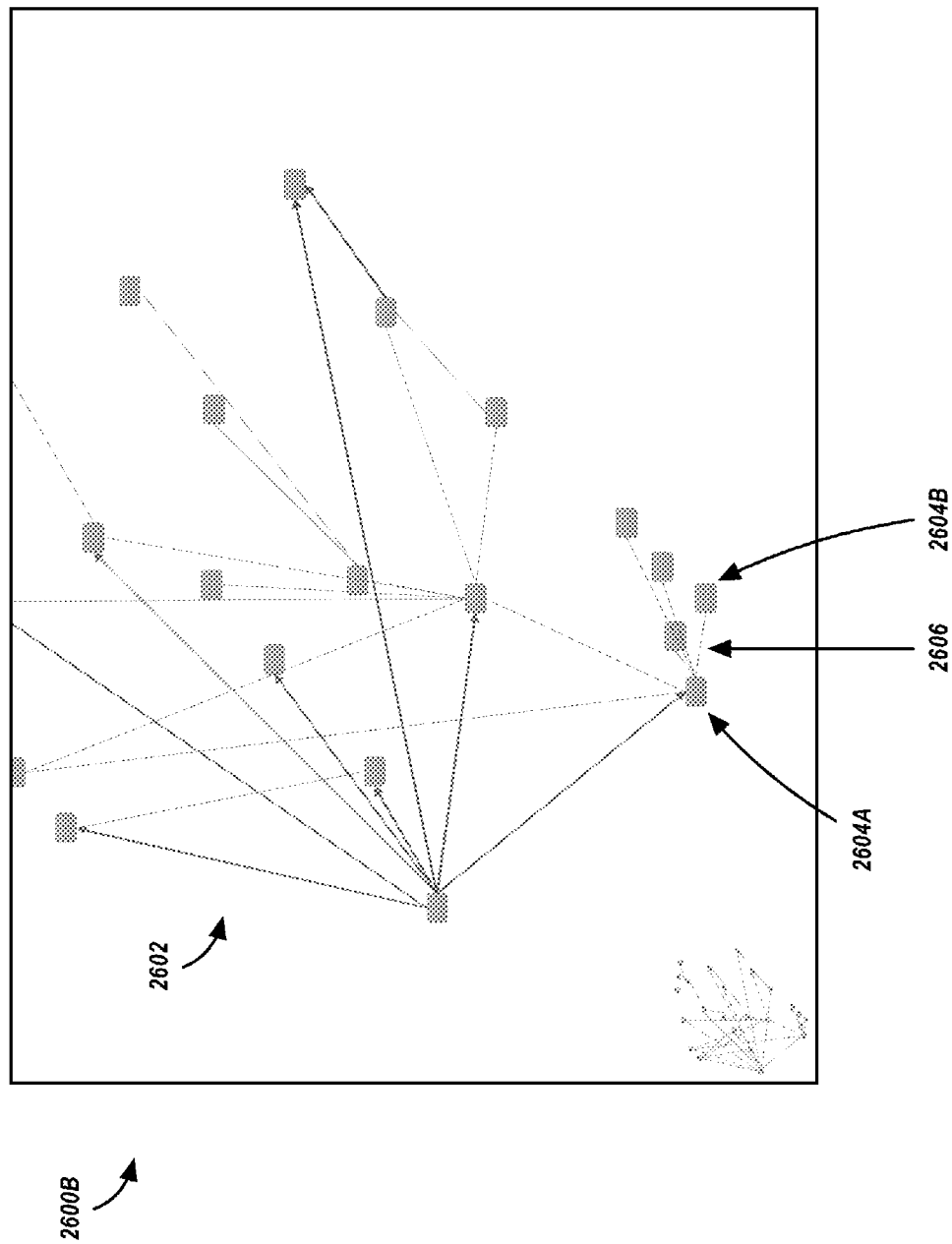
Figure 26C:
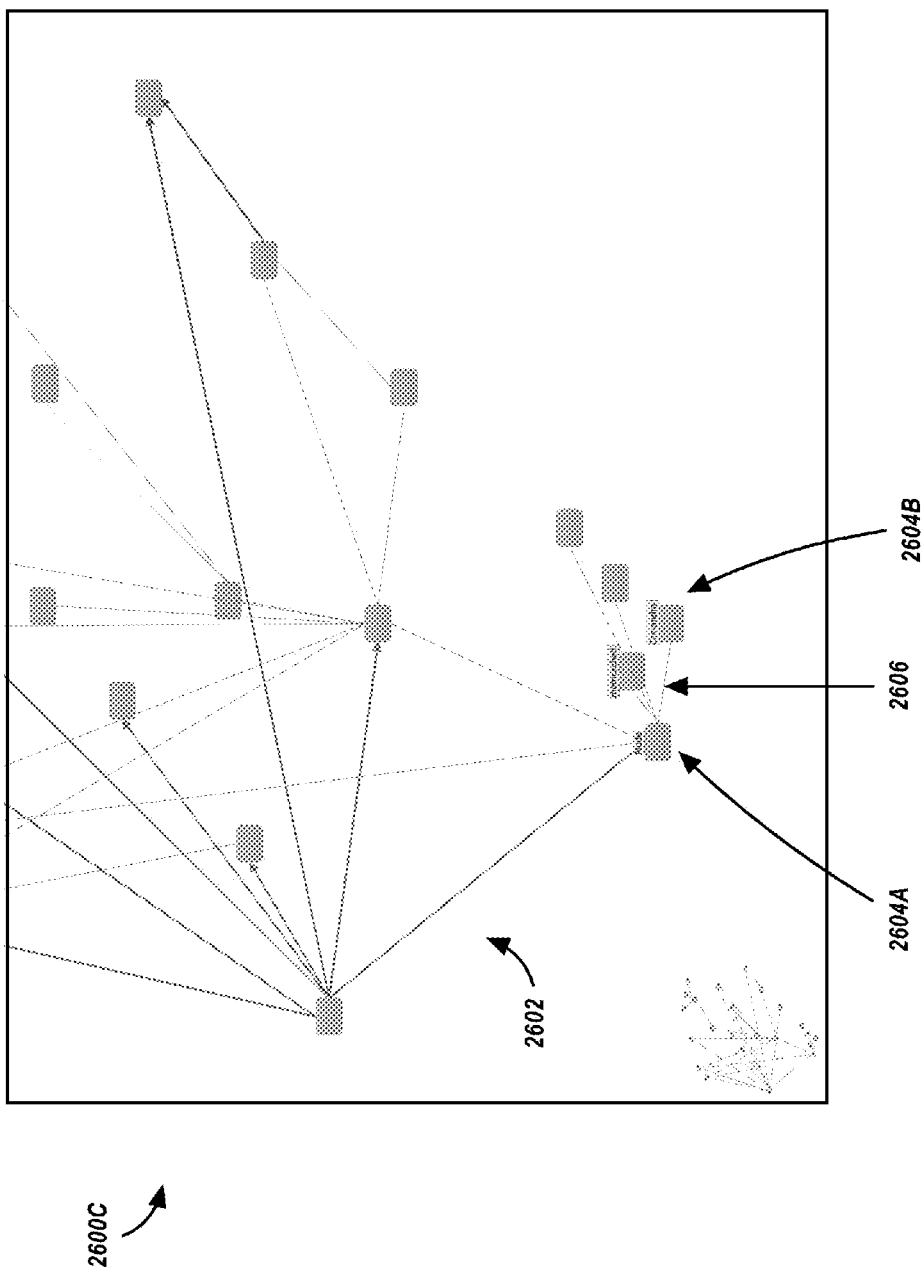
Figure 26D:
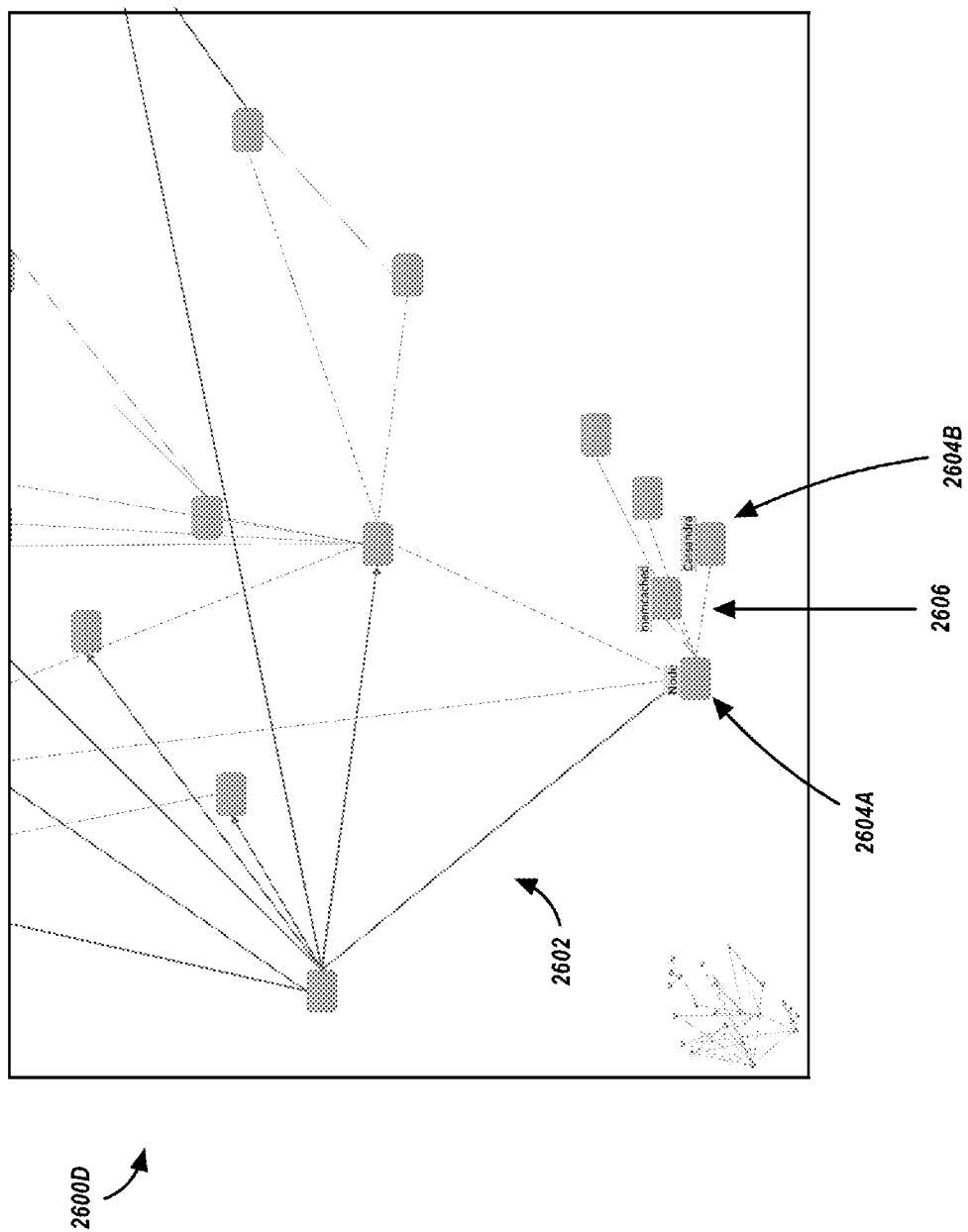
Figure 26E:
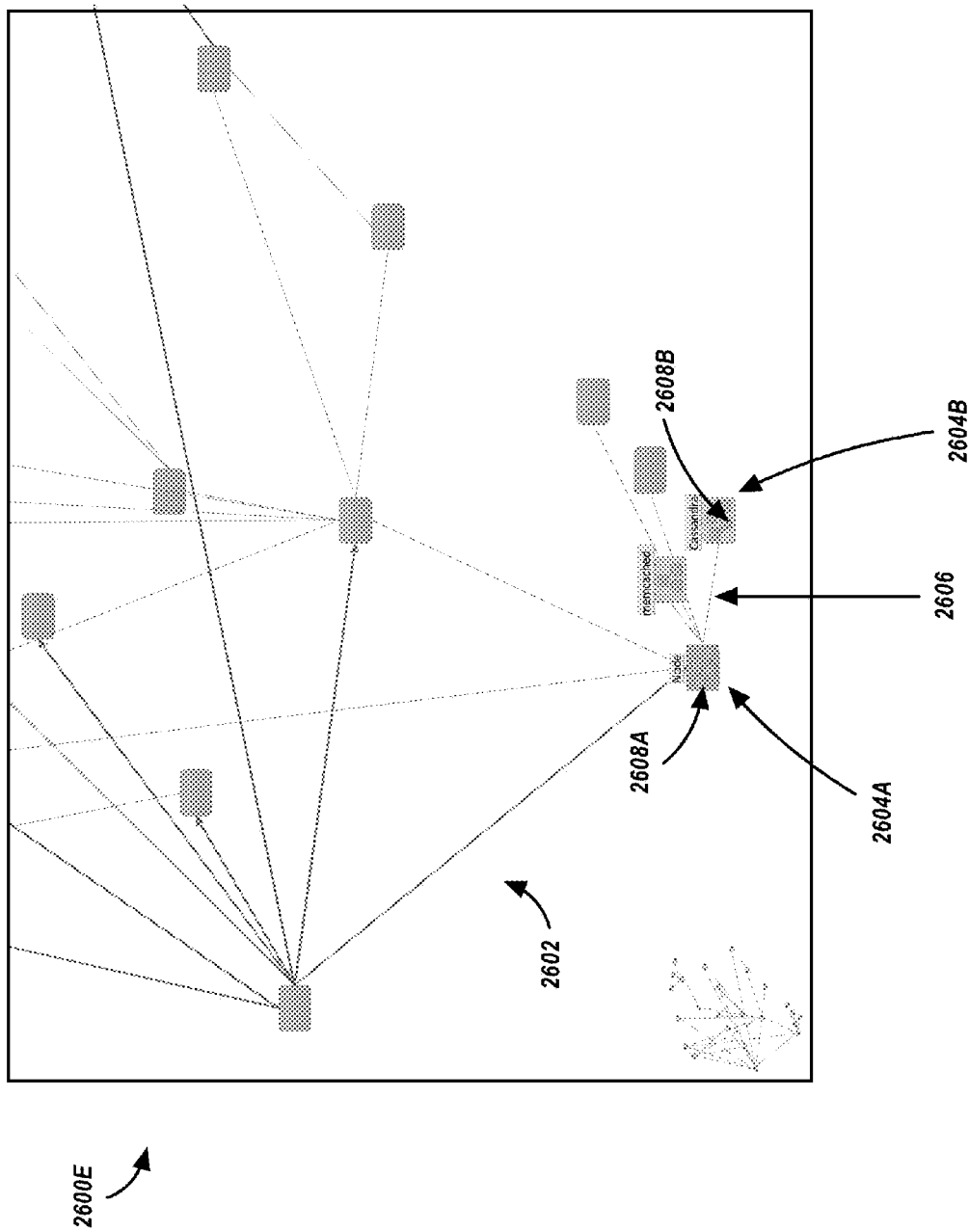
Figure 26F:
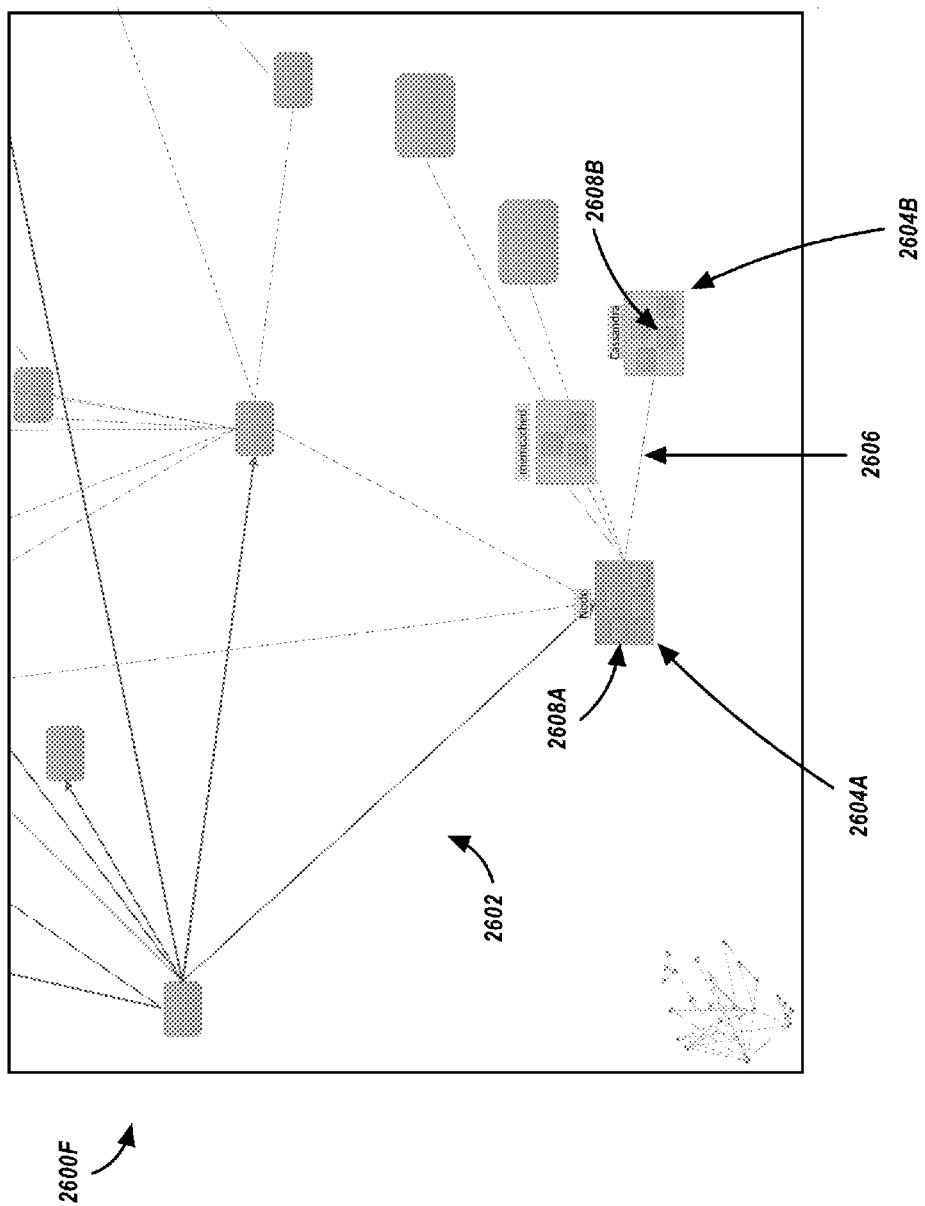
Figure 26G:
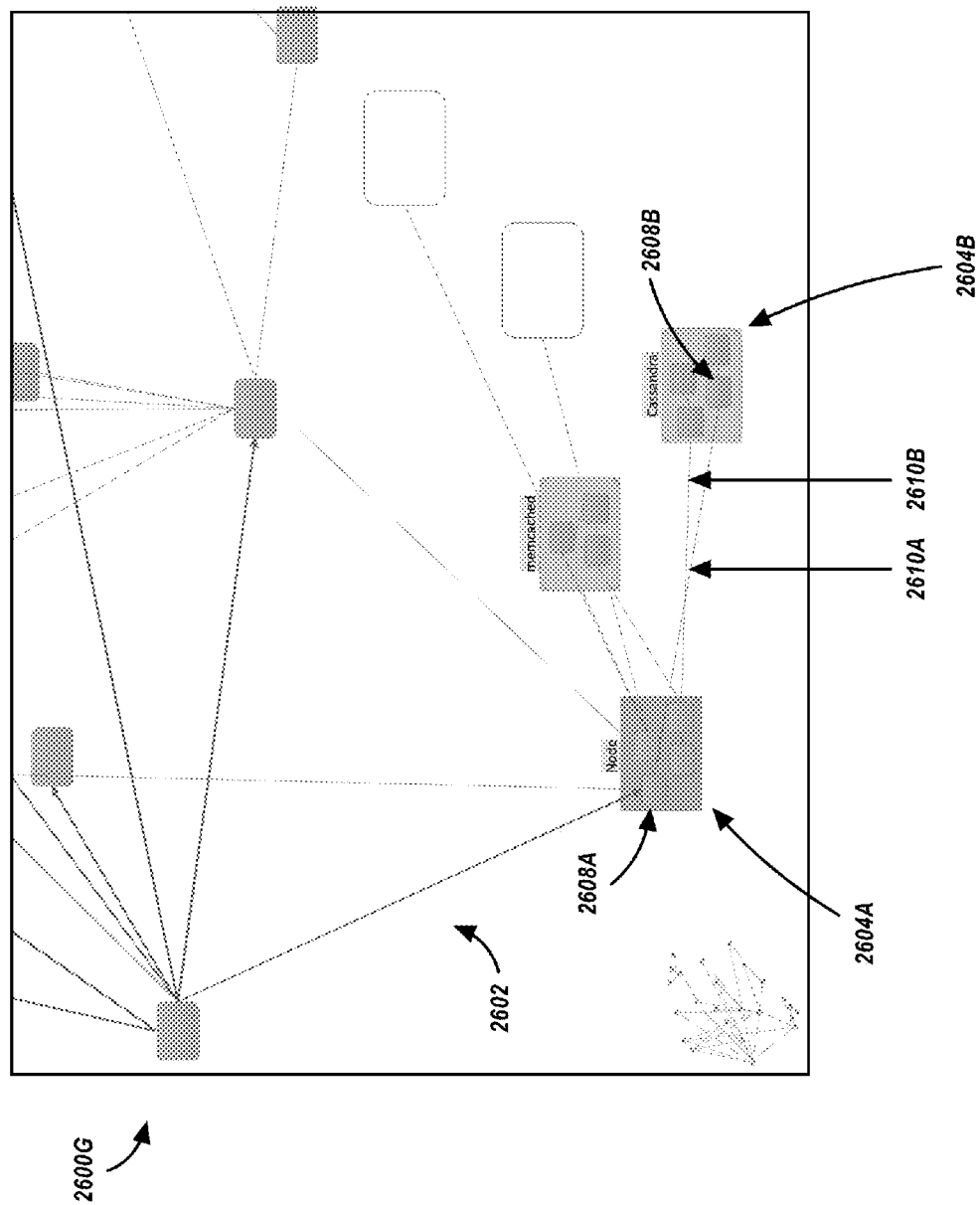
Figure 26H:
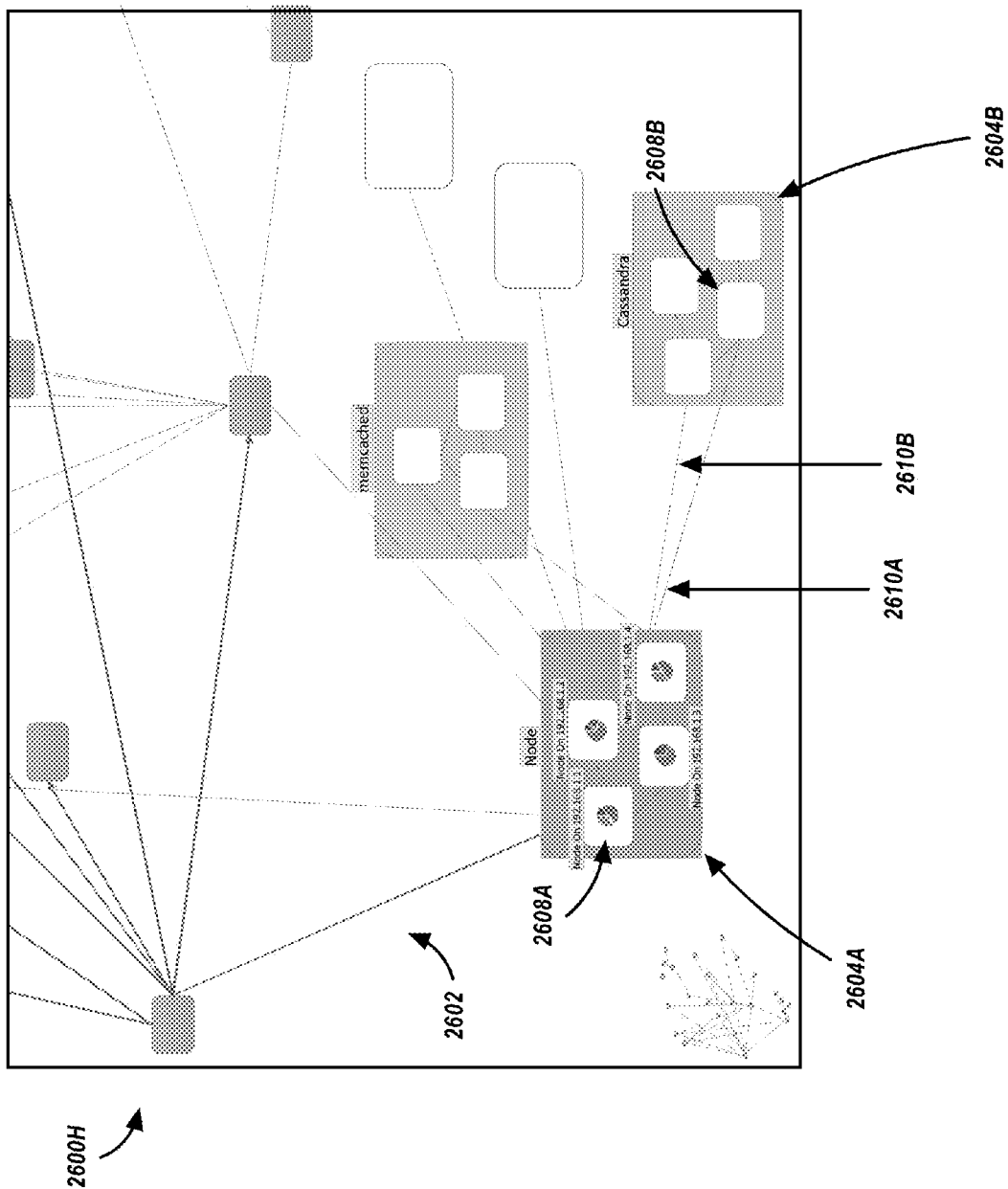

For example, FIG. 25 illustrates a simple example of the fan-out of a client request through hosts of a hosted computing environment 2500 on behalf of a request 2502 from a client device 2512. As shown, the request 2502 is sent from the client device 2512 over a network 2510 and received at host 2504A. This causes host 2504A to make two network interprocess communication calls, one to host 2504B and the other to host 2504C. The IPC call from host 2504A to host 2504C causes host 2504C in turn to make two more network interprocess communication calls, one to host 2504D and the other to host 2504E. After host 2504A has received the IPC call replies from hosts 2504B and 2504C, the host 2504A prepares a response 2506 based on the replies and sends it to the client device 2512.

One simple way to measure the performance of the hosted computing environment 2500 from is to measure the amount of time between when the request 2502 is fully received at the host 2504A and the response 306 is fully sent from the host 2504A. If this time is too long, it may indicate that there is a performance problem in the hosted computing environment 2500. While this simple measurement may indicate problematic system performance issues, it does not by itself tell which hosts 2504 or application components are causing the poor performance. Thus, engineers and developers would appreciate technologies that provide them with the tools to more effectively diagnose and identify the root cause of poor system performance.

The needs of engineers, developers, and other personnel are addressed by generating and displaying an application topology map and related performance metrics based on system events collected from OS agents installed on hosts in a hosted computing environment.

In some embodiments, performance metrics are computed for application components from a set of system events that correspond to a sample time window. This set of system events may be referred to as a "sample set". System events may be included in a sample set based on time. For example, system events may be assigned to a sample set based on the times they are captured by OS agents and/or the times they are collected by the CAS engine.

In addition or instead of computing one or more performance metrics for an application component from a sample set, one or more performance metrics may be computed from the sample set for the application component on a host by host basis. For example, a first set of one or more performance metrics may be computed from the sample set for an application component A1 that is executed on three hosts H1, H2, and H3. In addition or alternatively, a second set of one or more performance metrics may be computed from the sample set for the application component A1 as it executed on host H1, a third set of one or more performance metrics may be computed from the sample set for application component A1 as it executed on host H2, and a fourth set of one or more performance metrics may be computed from the sample set for application component A1 as it executed on host H3. Thus, the first set of performance metrics measure performance of the application component A1 during the sample period in the aggregate (i.e., across hosts H1, H2, and H3). The second, third, and fourth sets of performance metrics measure performance of the application component A1 as it executed on hosts H1, H2, and H3, respectively.

In some embodiments, some or all of the exemplary performance metrics contained in Table 1 may be computed from one or more sample sets and displayed in a graphical user interface along with an application topology map as set forth herein. In Table 1, a performance metric computed for an "application component" refers to a performance metric computed for an application component across one or more hosts on which one or more processes of the application component executes, an application component on a particular host on which one or more processes of the application component executes, or other logical collection of one or more processes executing on one or more hosts.

TABLE 1

Exemplary Performance Metrics

| Performance Metric | Description |
| --- | --- |
| CPU usage | Percentage of CPU time spent executing the application component. |
| CPU steal | For virtualized hosted computing environments, the percentage of CPU time a virtual CPU that executes the application component waits for a real CPU while the hypervisor is serving another virtual CPU. |
| Request Time | Average time the application component spends serving a single network request. |
| Requests Per Second | Average number of network requests per second served by the application component. |
| Total Delay Contribution | Total time spent by the application component serving network requests. |
| Disk I/O Bytes Per Second | Average number of bytes the application component reads from and writes to disk per second. Here, "disk" refers to one or more mass storage devices for persistently storing data. |
| Memory Usage | Percentage of memory used by the application component. |
| Client to Server Bytes Per Second | Average number of bytes the application component receives over the network per second. |
| Server to Client Bytes Per Second | Average number of bytes the application component sends over the network per second. |

The performance metrics in Table 1 are merely exemplary. In some embodiments, performance metrics computed from one or more sample sets are forecasts. For example, a performance metric may be an estimated number of network requests per second that an application component can serve before becoming too statured with network requests based on historical CPU, I/O, and memory usage patterns of the application component indicated in the one or more sample sets.

Zooming

Graphical User Interface (GUI) 2600A-GUI 2600H (FIGS. 26A-26H) depict an example of zooming in on an application topology map displayed on one graphical user interface screen.

GUI 2600A (FIG. 26A) illustrates an exemplary graphical user interface for zooming where the graphical user interface includes an application topology map 2602. The map 2602 comprises nodes (e.g., 2604A and 2604B) and edges connecting the nodes (e.g., 2606). Each node (e.g., 2604A) of the map 2602 represents an identified application component and each edge (e.g., 2606) represents a logical dependency between two application components.

In an embodiment, nodes (e.g., 2604a) and/or edges (e.g., 2606) are color coded or otherwise visually distinguished in the map 2602 so as to indicate to potential performance problems with respect to the application components. A performance problem with an application component or a network performance problem may be detected if one or more performance metrics computed for the application component exceeds a threshold. A user can use the zoom in feature of the map 2602 to investigate details of the performance problems related to the highlighted nodes and/or edges of the map 2602.

A user may provide input to zoom in on the map 2602. The user may provide the input in a conventional manner such as input provided using a pointing device (e.g., a mouse), a keyboard, or a touch sensitive surface (e.g., a touch screen display).

GUI 2600B (FIG. 26B) illustrates the exemplary graphical user interface following the user input to zoom in on the map 2602. The map 2602 is enlarged in response to the user input such that a portion of the map 2602 displayed in GUI 2600A prior to the input is no longer displayed in GUI 2600B after the input and the remaining portion of the map 2602 displayed in GUI 2600B after the input is enlarged in size relative to its size in GUI 2600A.

UI 2600C (FIG. 26C) illustrates the exemplary graphical user interface following additional user input to zoom in on the map 2602. The map 2602 is further enlarged in response to the additional user input. In addition, user-friendly names of application components represented by nodes (e.g., 2604A and 2604B) are displayed next to the nodes in the map 2602. In an embodiment, the user-friendly name of an application component is derived or based on information in system events captured from the executing processes of the application component. For example, a process name or a name to which a process name is mapped may be used as the user-friendly name.

UI 2600D (FIG. 26D) illustrates the exemplary graphical user interface following additional user input to zoom in on the map 2602. The map 2602 is further enlarged in response to the additional user input.

UI 2600E (FIG. 26E) illustrates the exemplary graphical user interface following additional user input to zoom in on the map 2602. The map 2602 is further enlarged in response to the additional user input. In addition, host sub-nodes (e.g., 2608A and 2608B) are displayed within application component nodes (e.g., 2606A and 2606B). Each host sub-node (e.g., 2608A) represents a host on which one or more processes of the application component represented by the containing application component node (e.g., 2606A) executes. For example, host sub-node 2608B represents a host on which one or more processes of a "Cassandra" application component represented by application node 2606B executes.

UI 2600F (FIG. 26F) illustrates the exemplary graphical user interface following additional user input to zoom in on the map 2602. The map 2602 is further enlarged in response to the additional user input.

UI 2600G (FIG. 26G) illustrates the exemplary graphical user interface following additional user input to zoom in on the map 2602. The map 2602 is further enlarged in response to the additional user input. In addition, edges representing logical dependencies between application components are replaced with edges showing logical dependencies between individual hosts of the application components. For example, the edge 2606 in GUI 2600F representing a logical dependency between the "Node" application component represented by application component node 2604A and the "Cassandra" application component represented by the application component node 2604B is replaced in GUI 2600G with edges 2610A and 2610B that represent logical dependencies between hosts of the application components. For example, edge 2610A represents a logical dependency between one or more processes of the "Node" application component executing on the host represented by host sub-node 2608A and one or more processes of the "Cassandra" application component executing on the host represented by host sub-node 2608B. Edges representing logical dependencies between hosts can also color coded or otherwise visually distinguished to indicate network performance issues. For example, edge 2610A may be color coded red to alert the user that a relatively large amount of data per period of time (e.g., bytes per second) or a relatively large number of network request per period of time (e.g., requests per second) is being transmitted between one or more processes of the "Node" application component executing on the host represented by host sub-node 2608A and one or more processes of the "Cassandra" application component executing on the host represented by host sub-node 2608B. Note that edge 2606 in GUIs 2600A through 2600F may also be color coded red for the same reasons that edge 2610 in GUI 2600G is color coded red. At the zoom levels in GUIs 2600A through 2600F, the user can see by the color coding of edge 2606 that there is a network performance issue between the two application components. And by zooming in on the map 2602 to the level indicated in GUI 2600G, the user can see that the network performance issue is affecting two hosts in particular.

UI 2600H (FIG. 26H) illustrates the exemplary graphical user interface following additional user input to zoom in on the map 2602. The map 2602 is further enlarged in response to the additional user input. In addition, user-friendly names of hosts represented by host sub-nodes (e.g., 2608A and 2604=8B) are displayed next to the host sub-nodes in the map 2602. In an embodiment, the user-friendly name of a host is derived or based on information in system events captured from the processes of the application component executing on the host. For example, a host name or a network address of the host may be used as the user-friendly name of the host in the map 2606.

Performance Metric Mapping

Figure 27A:
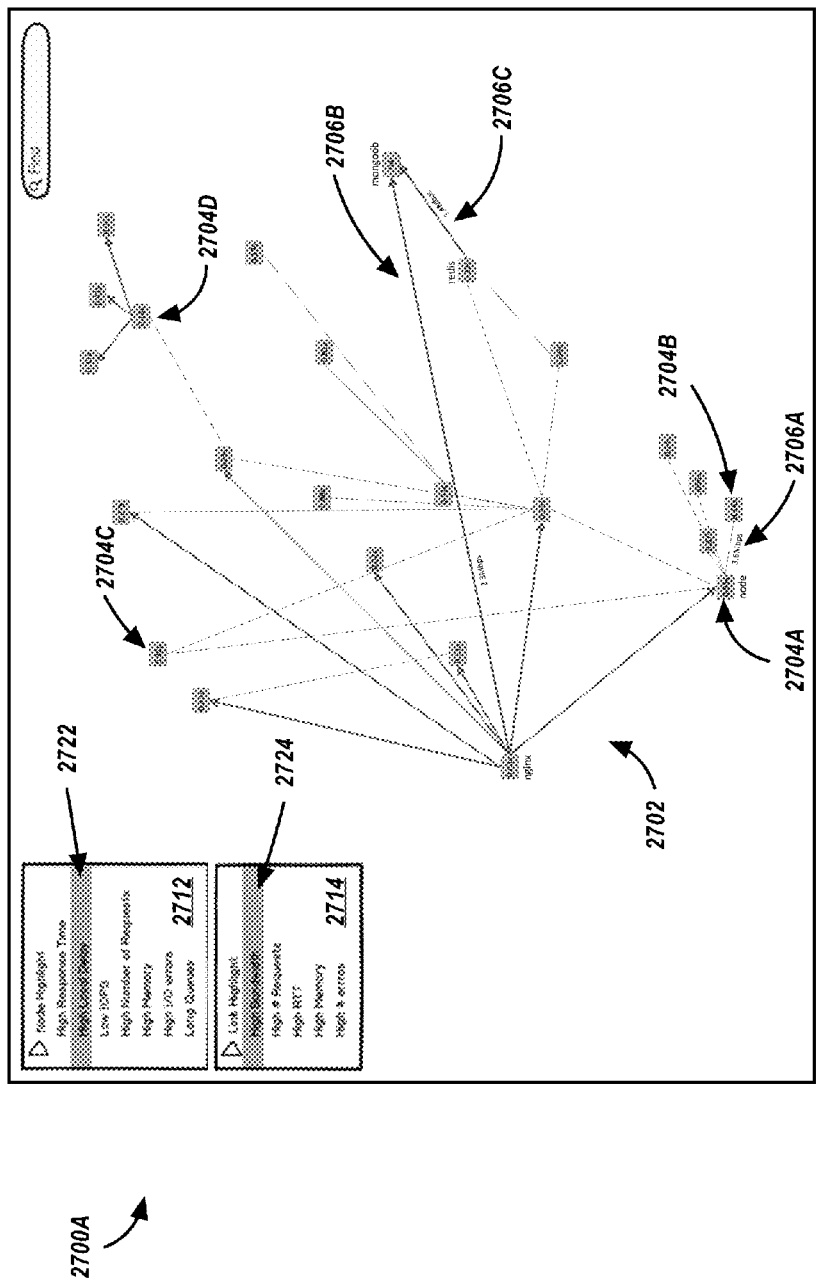
FIG. 27A, FIG. 27B, FIG. 27C illustrate a performance metric mapping feature of an application topology map presented by a presentation system, in accordance with some embodiments.
Figure 27B:
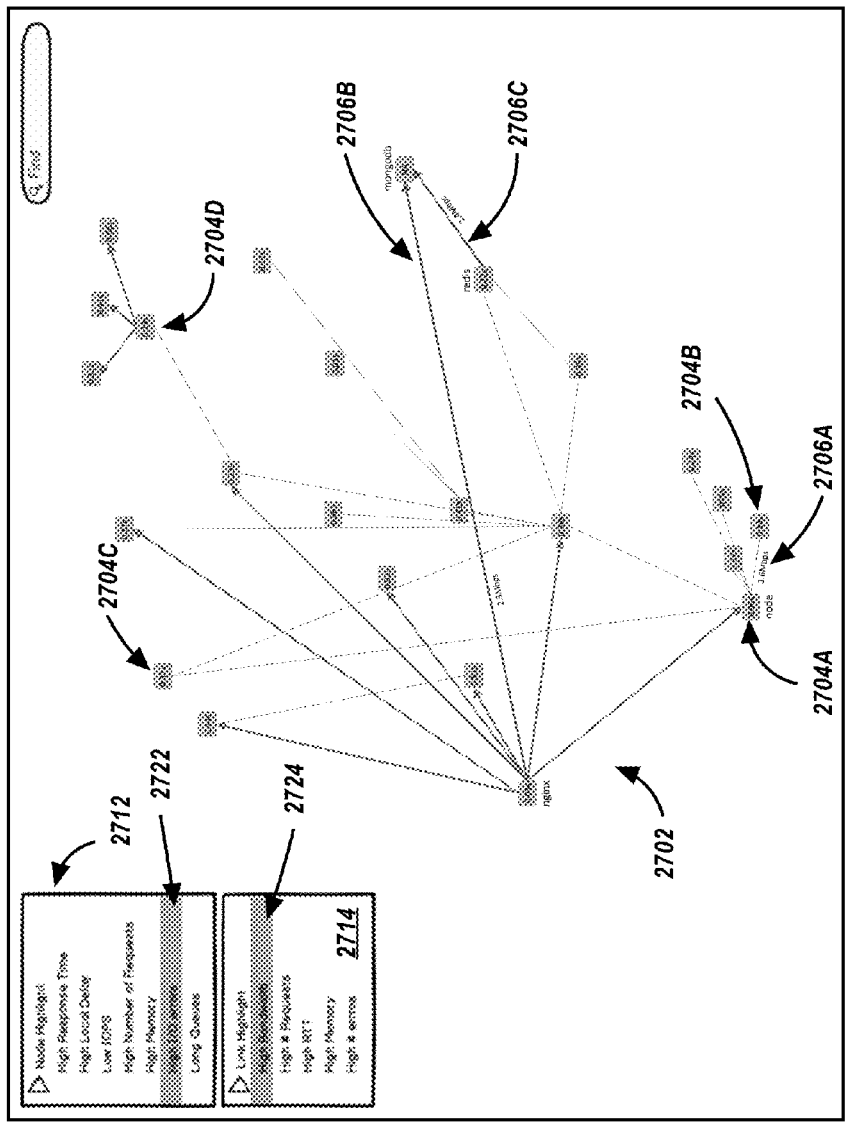
Figure 27C:
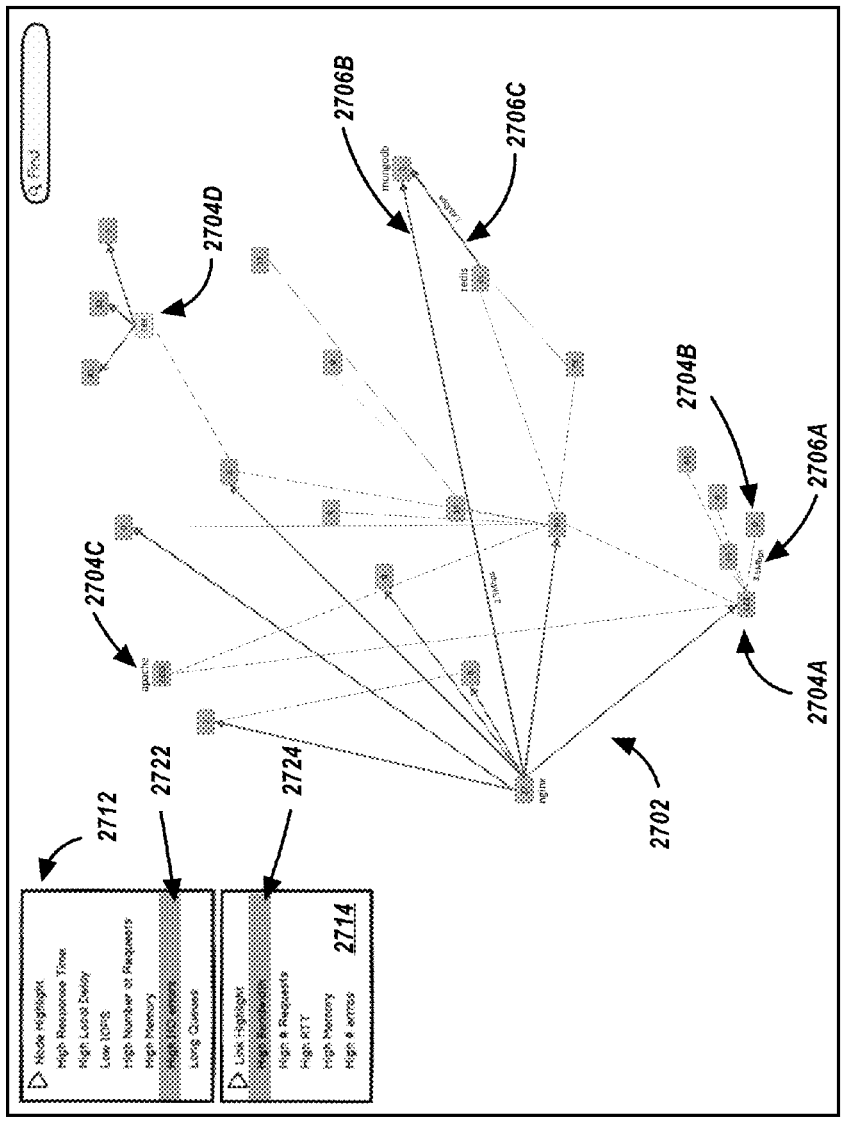
Figure 28A:
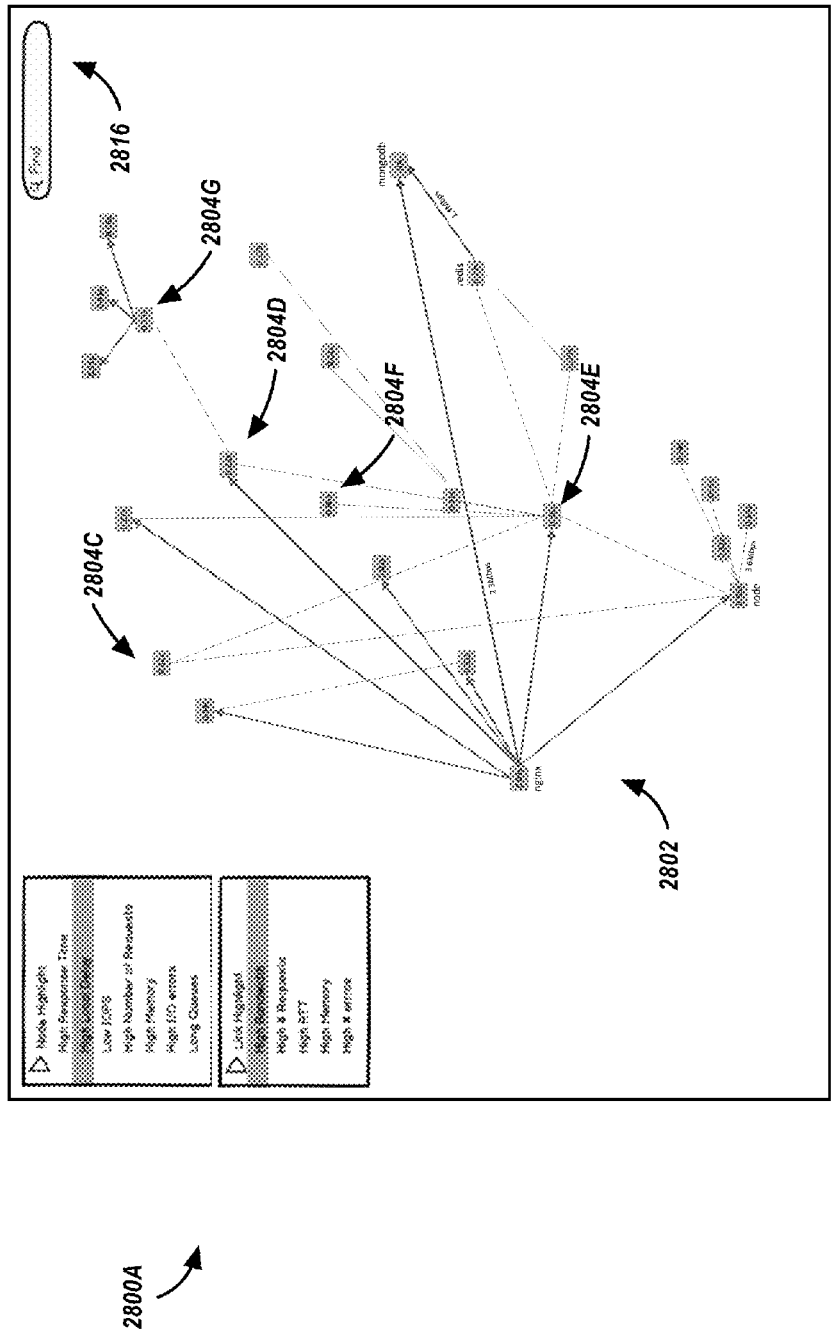
FIG. 28A, FIG. 28B, FIG. 28C, FIG. 28D, FIG. 28E, FIG. 28F illustrate a search feature of an application topology map presented by a presentation system, in accordance with some embodiments.
Figure 28B:
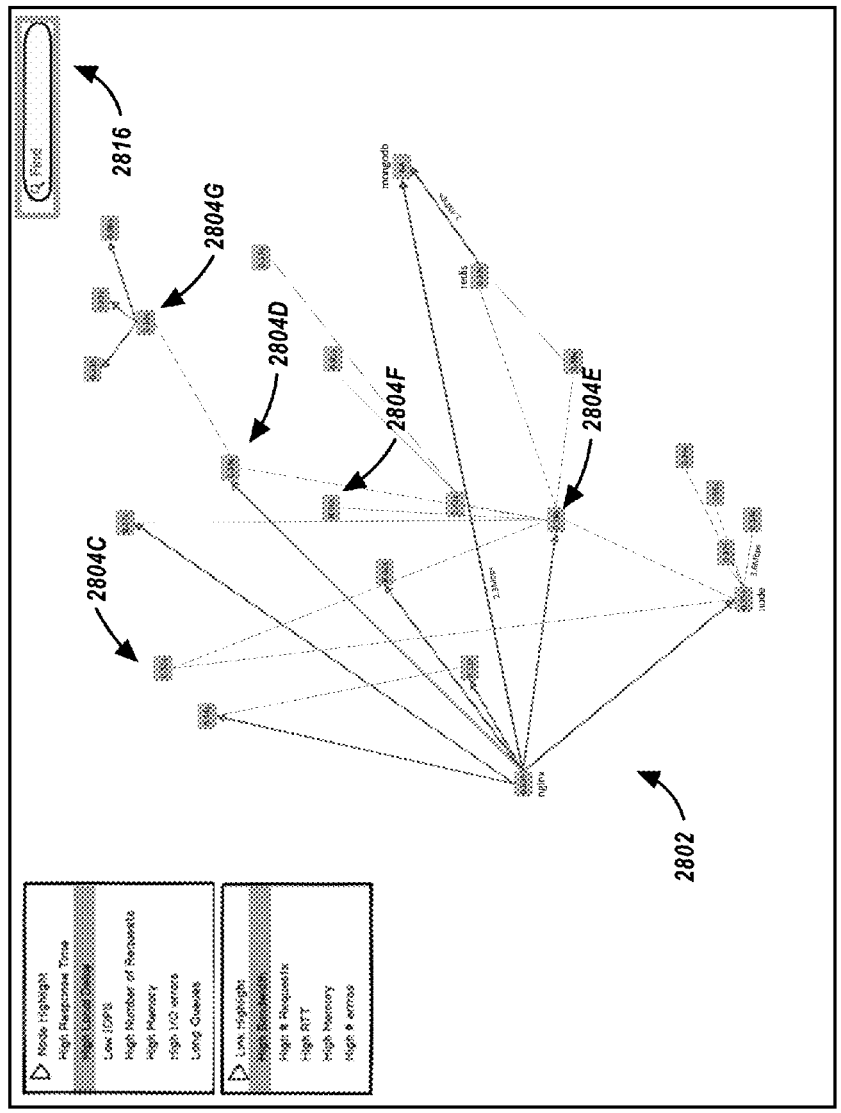
Figure 28C:
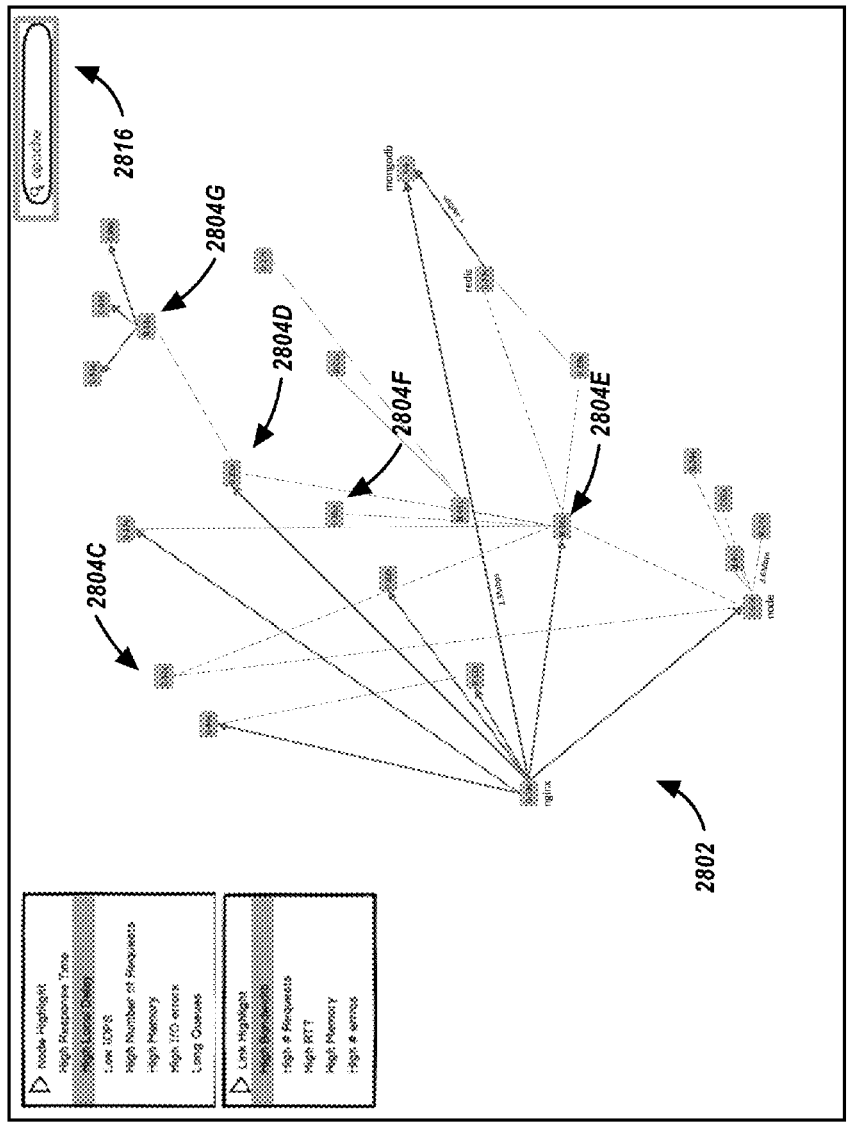
Figure 28D:
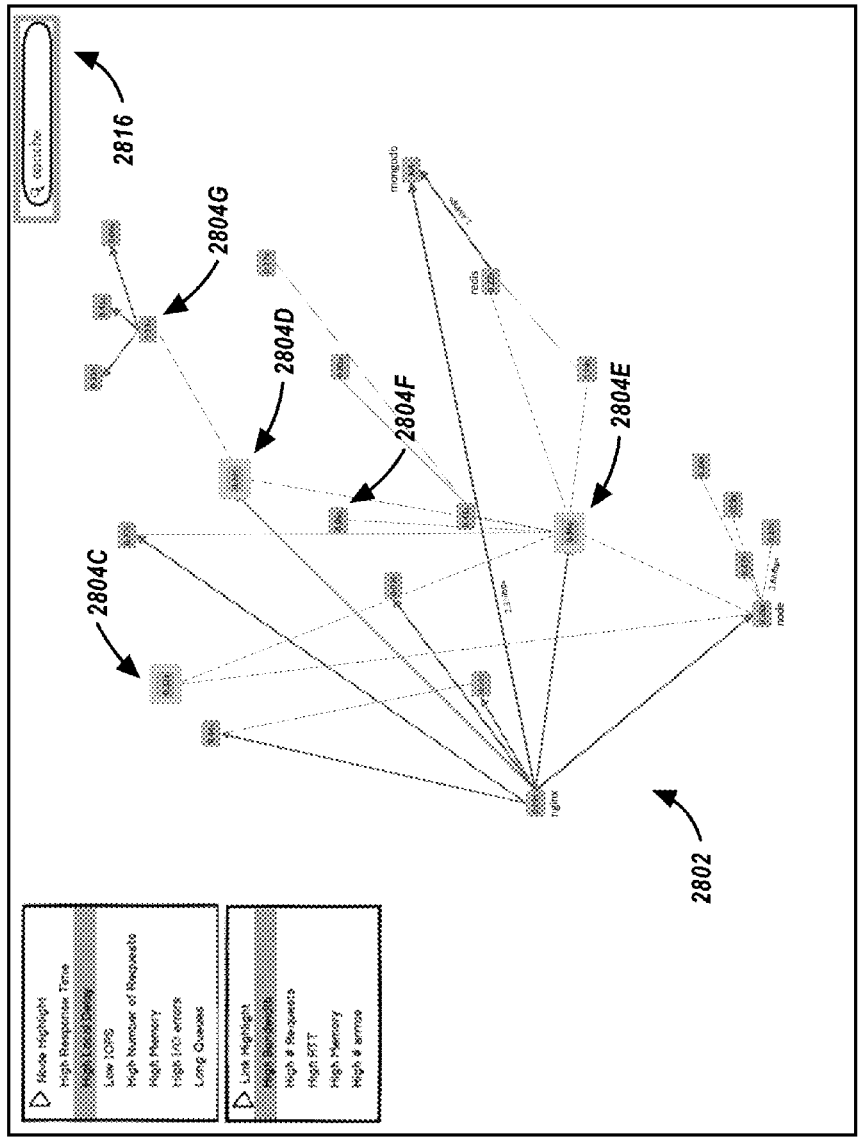
Figure 28E:
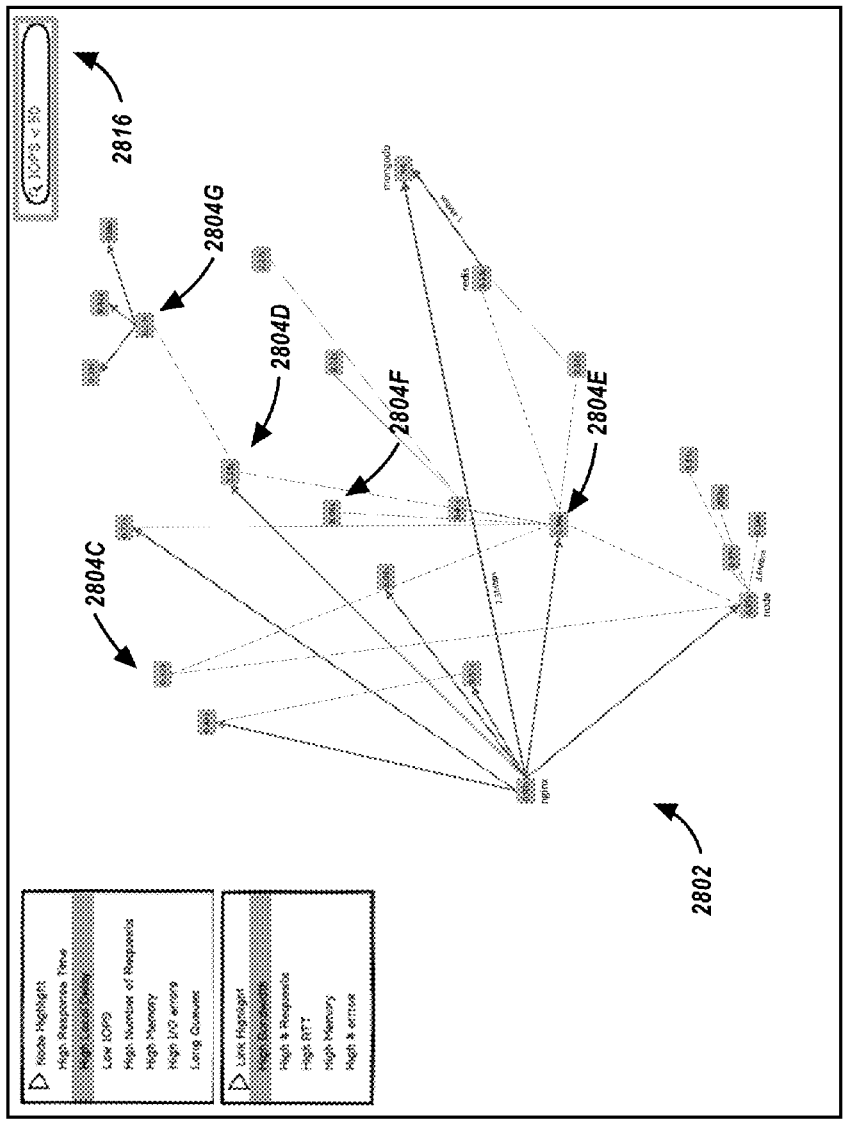
Figure 28F:
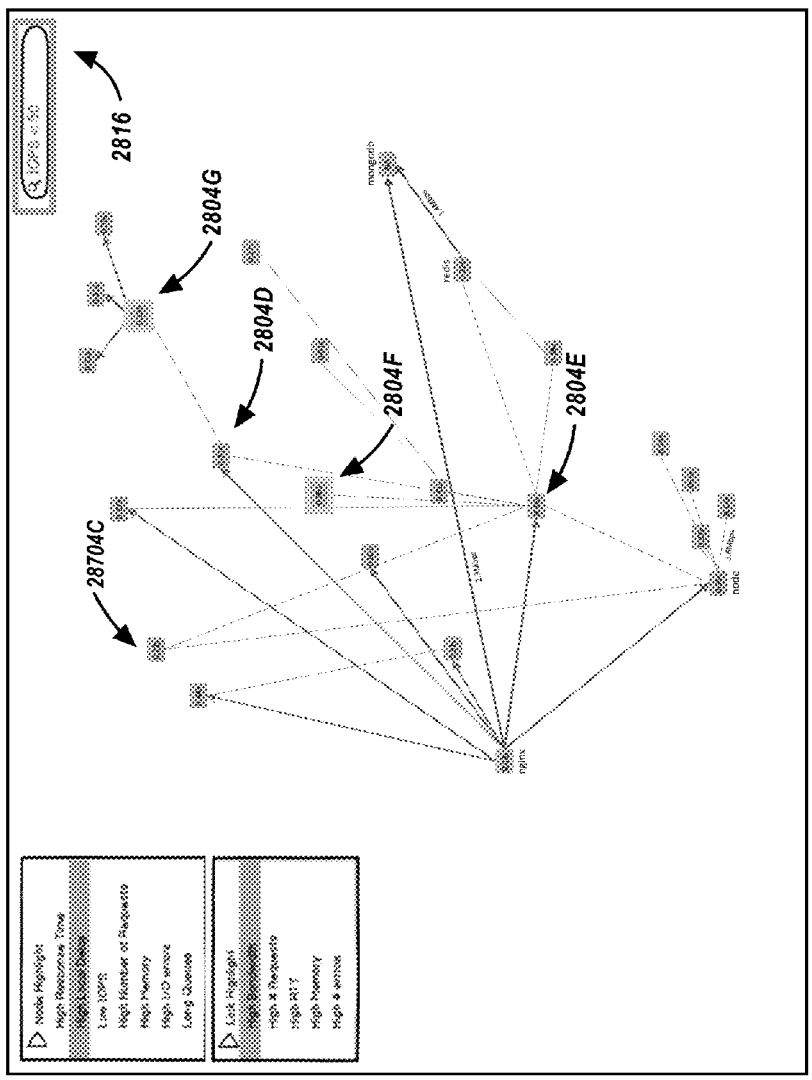
Figure 29A:
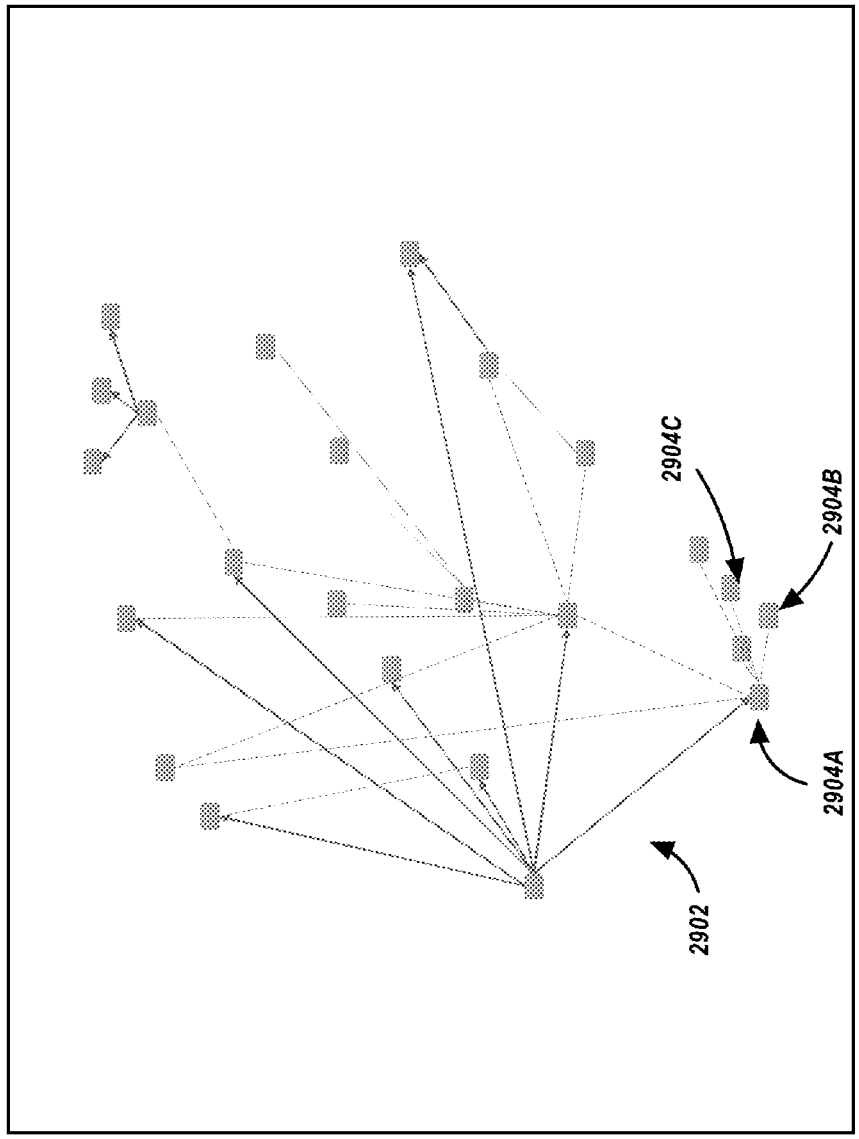
FIG. 29A, FIG. 29B, FIG. 29C, FIG. 29D, FIG. 29E illustrate a sub-mapping feature of an application topology map presented by a presentation system, in accordance with some embodiments.
Figure 29B:
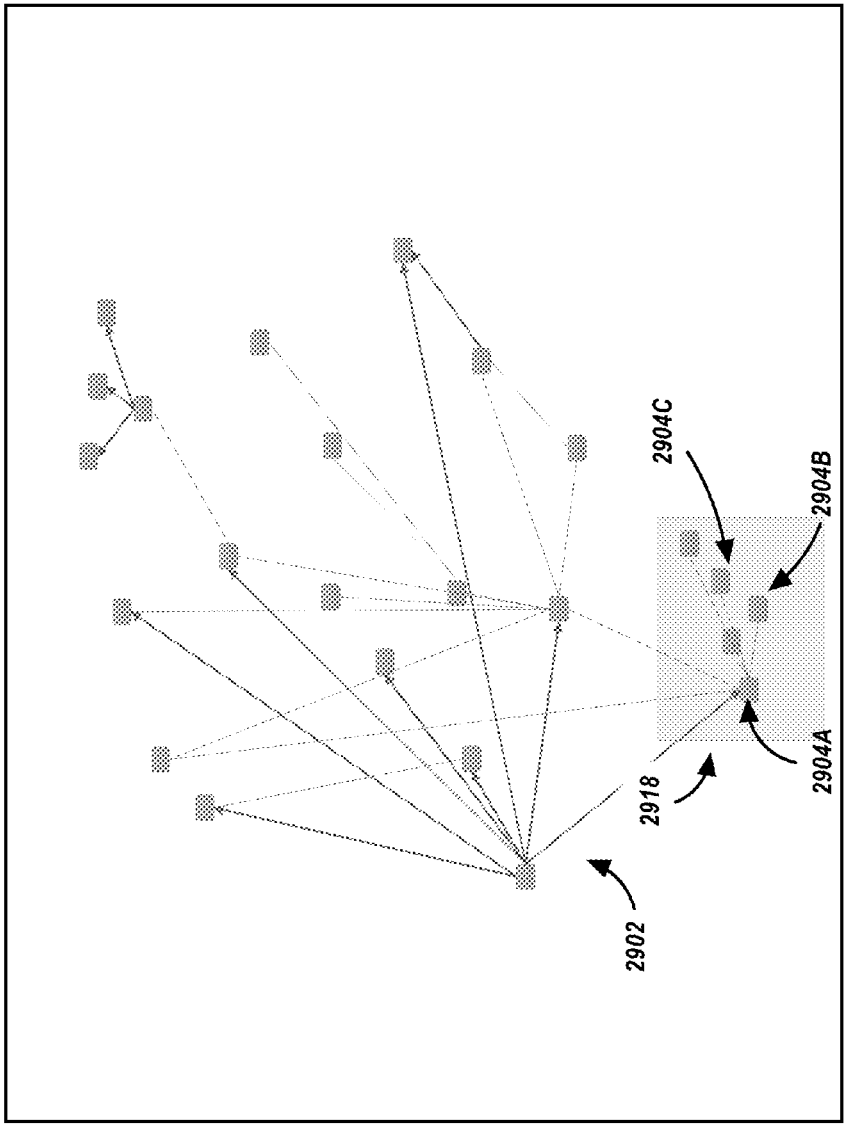
Figure 29C:
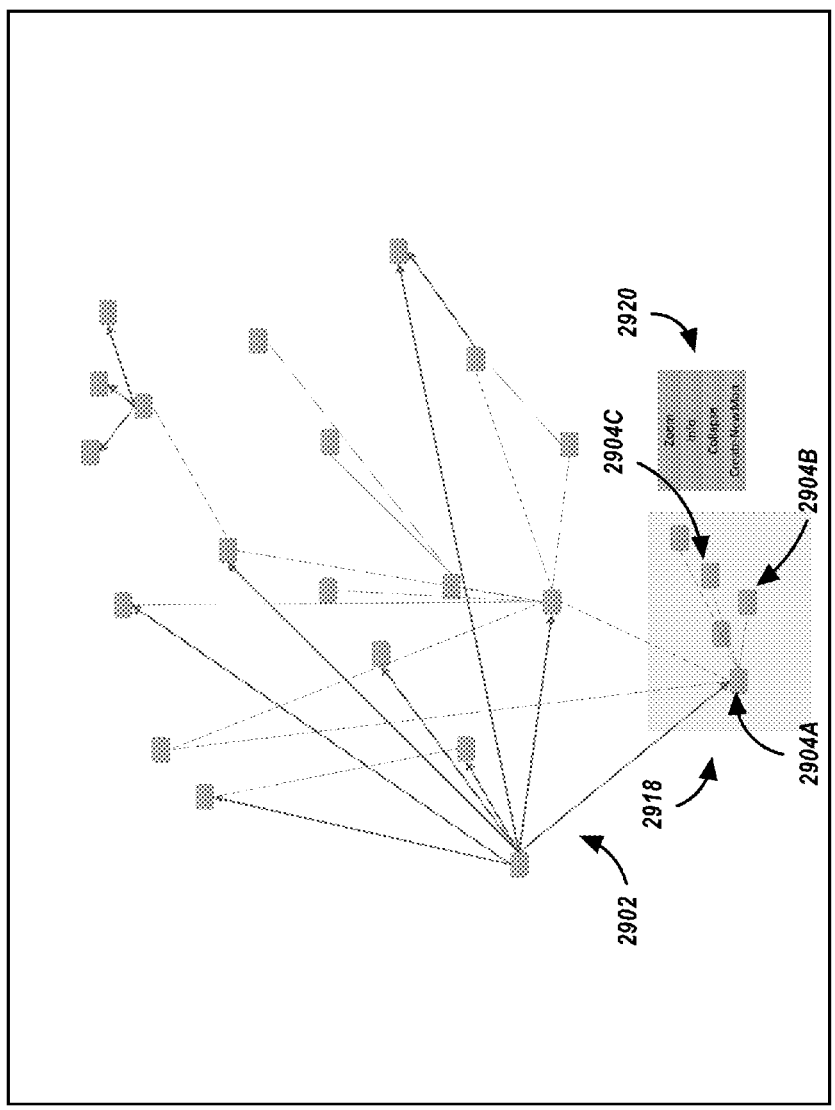
Figure 29D:
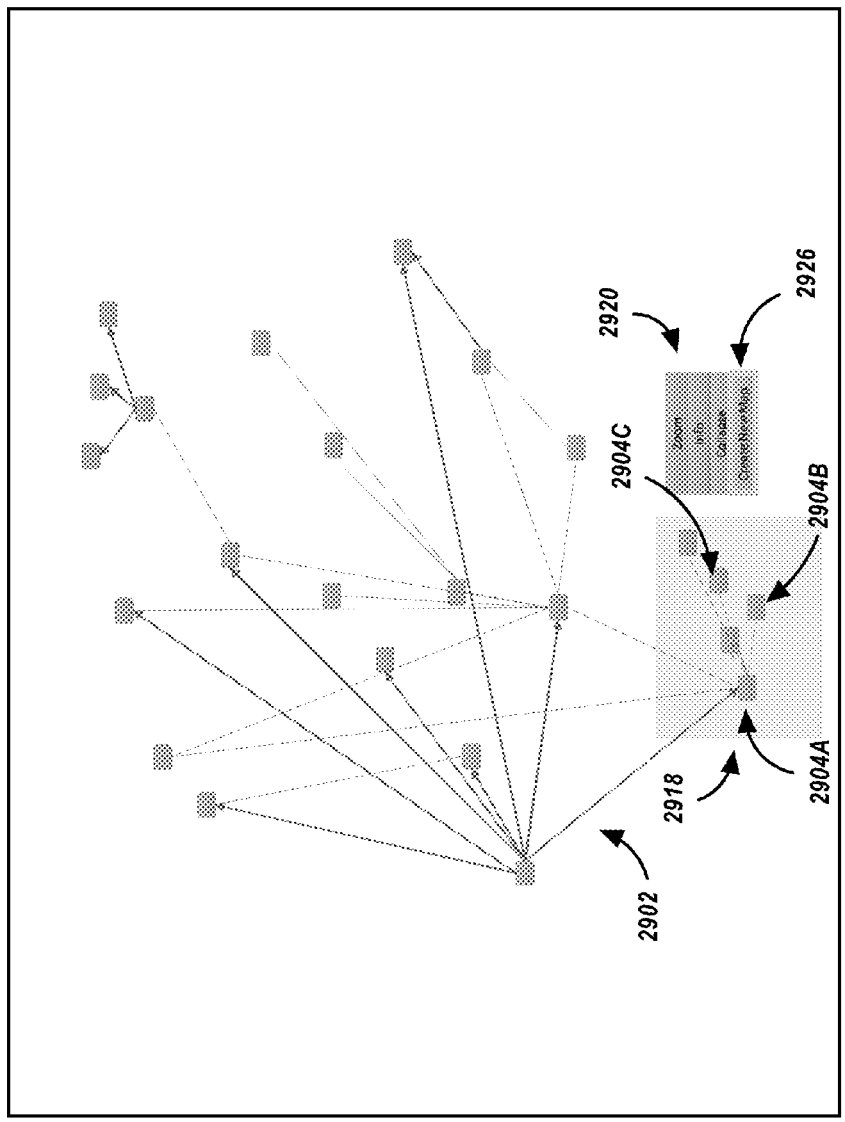
Figure 29E:
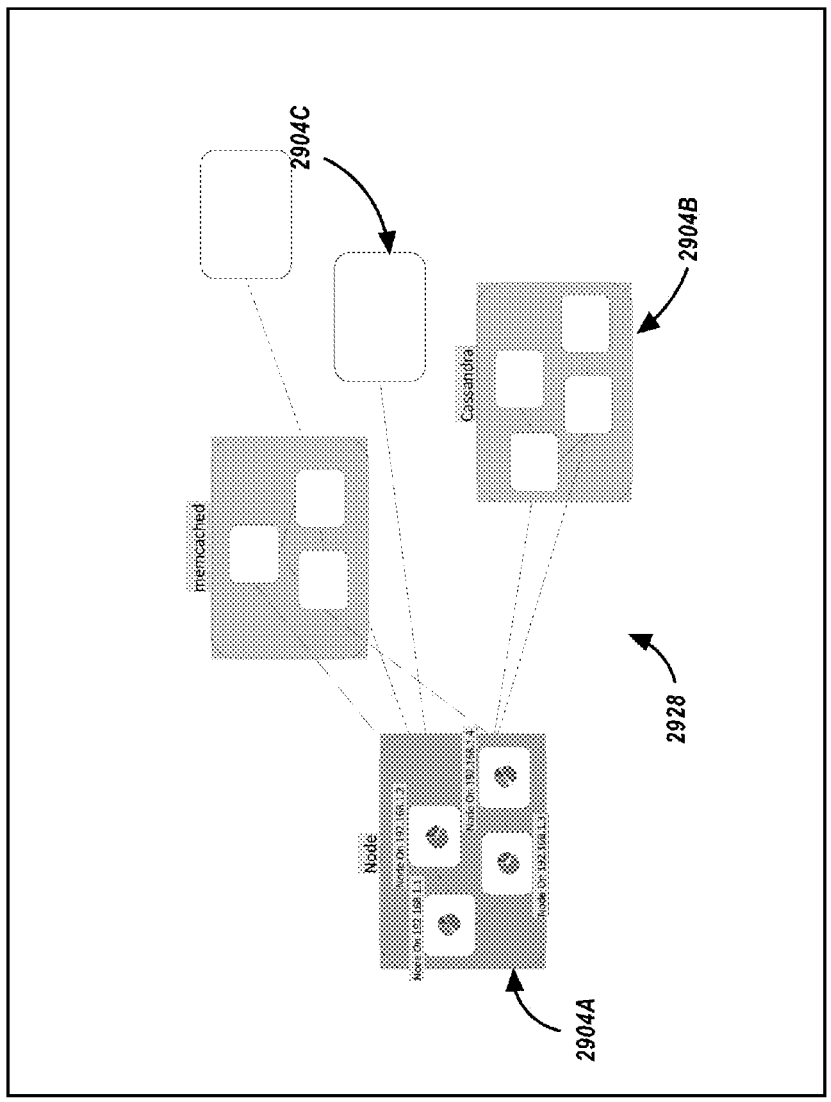
Figure 30A:
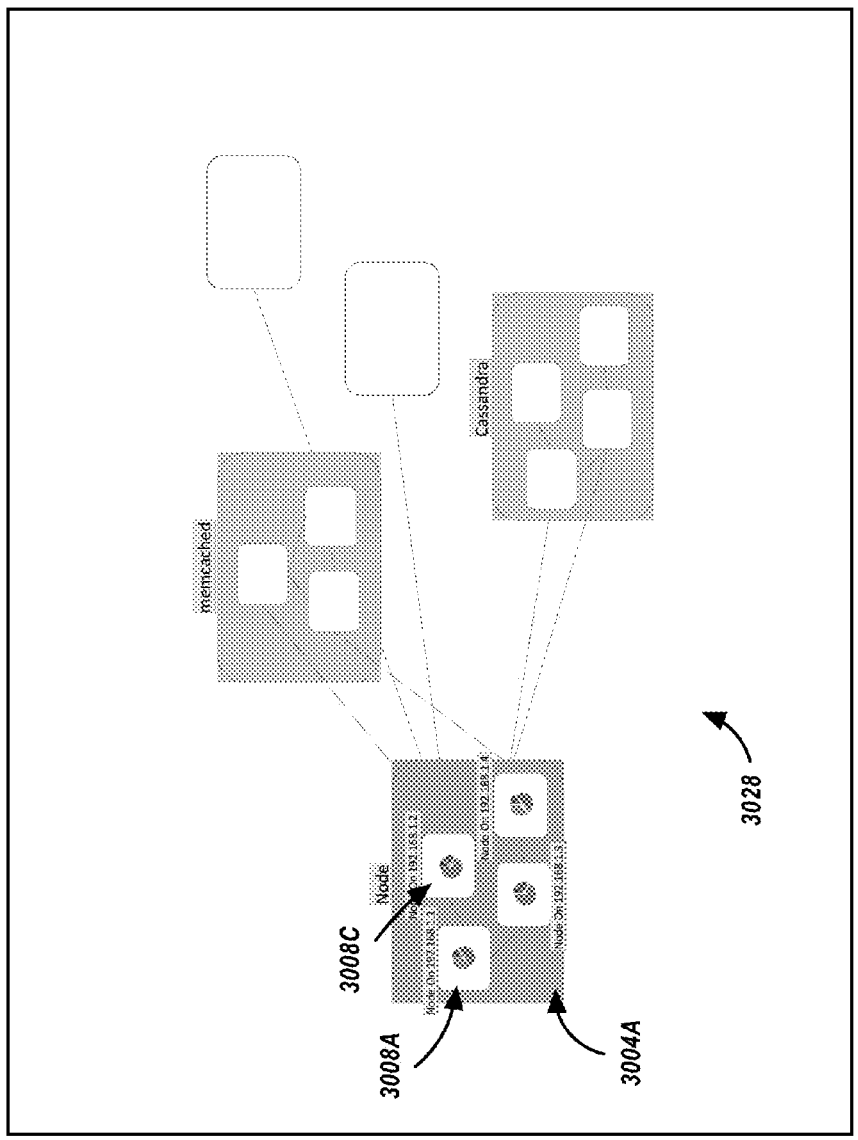
FIG. 30A, FIG. 30B, FIG. 30C, FIG. 30D, FIG. 30E, FIG. 30F illustrate an actions feature of an application topology map presented by a presentation system, in accordance with some embodiments.
Figure 30B:
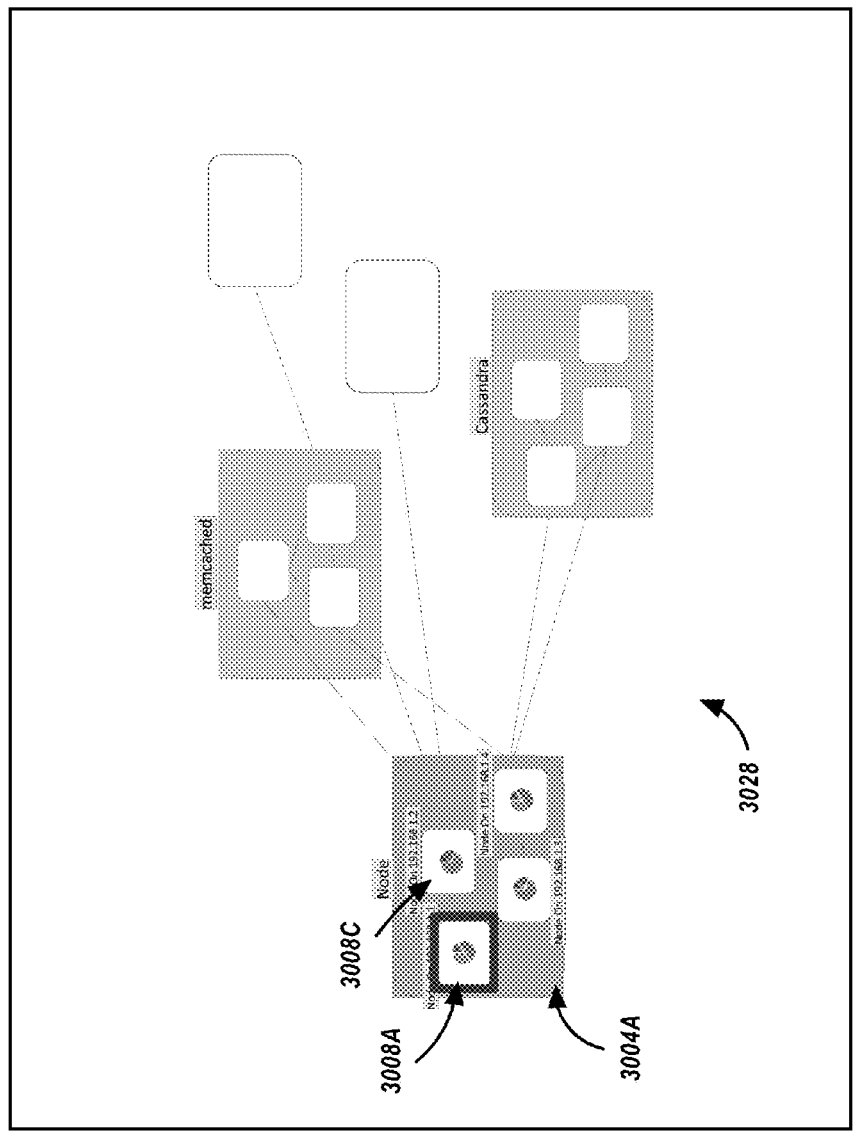
Figure 30C:
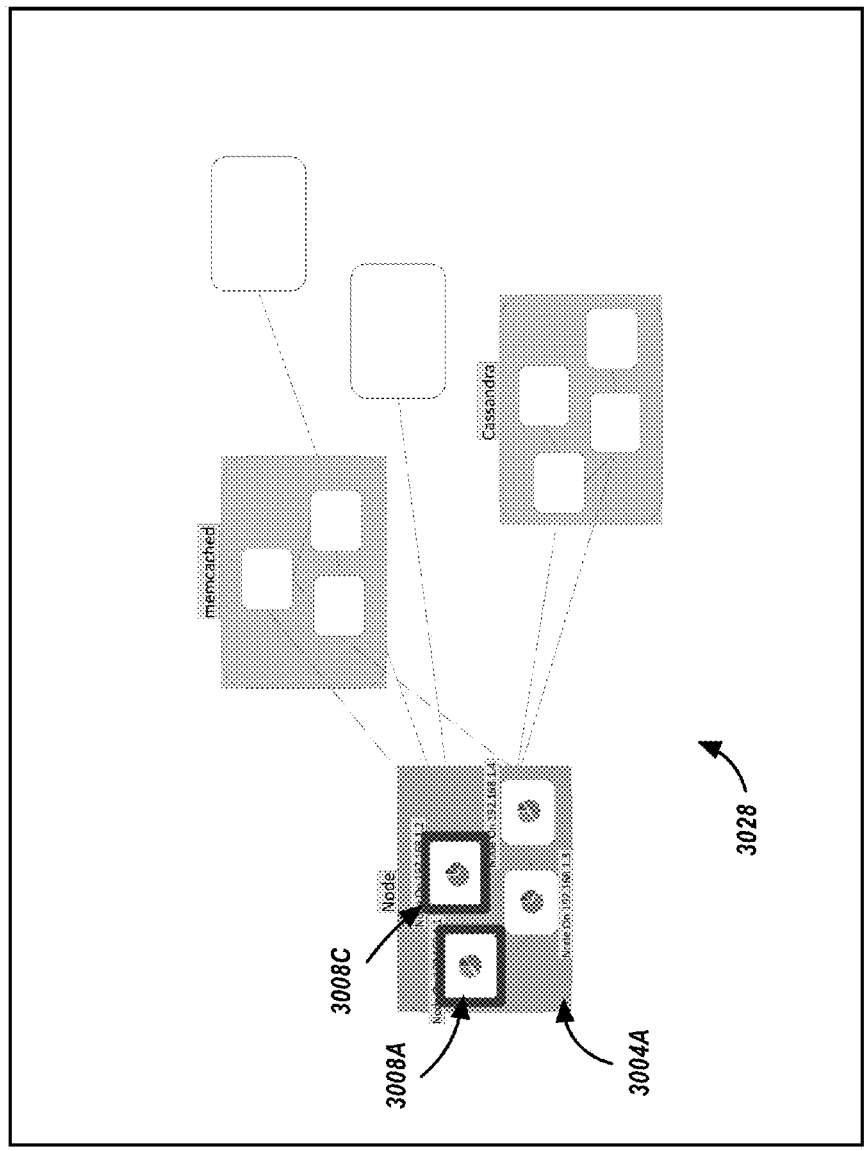
Figure 30D:
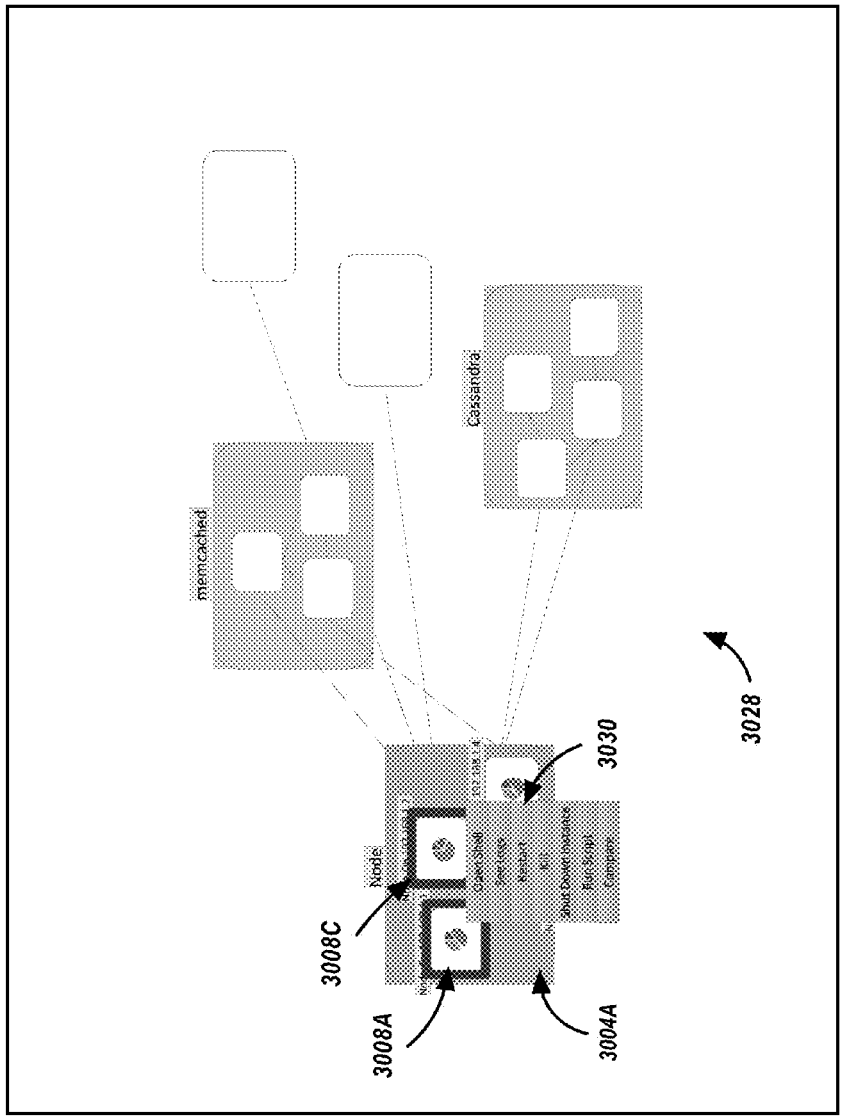
Figure 30E:
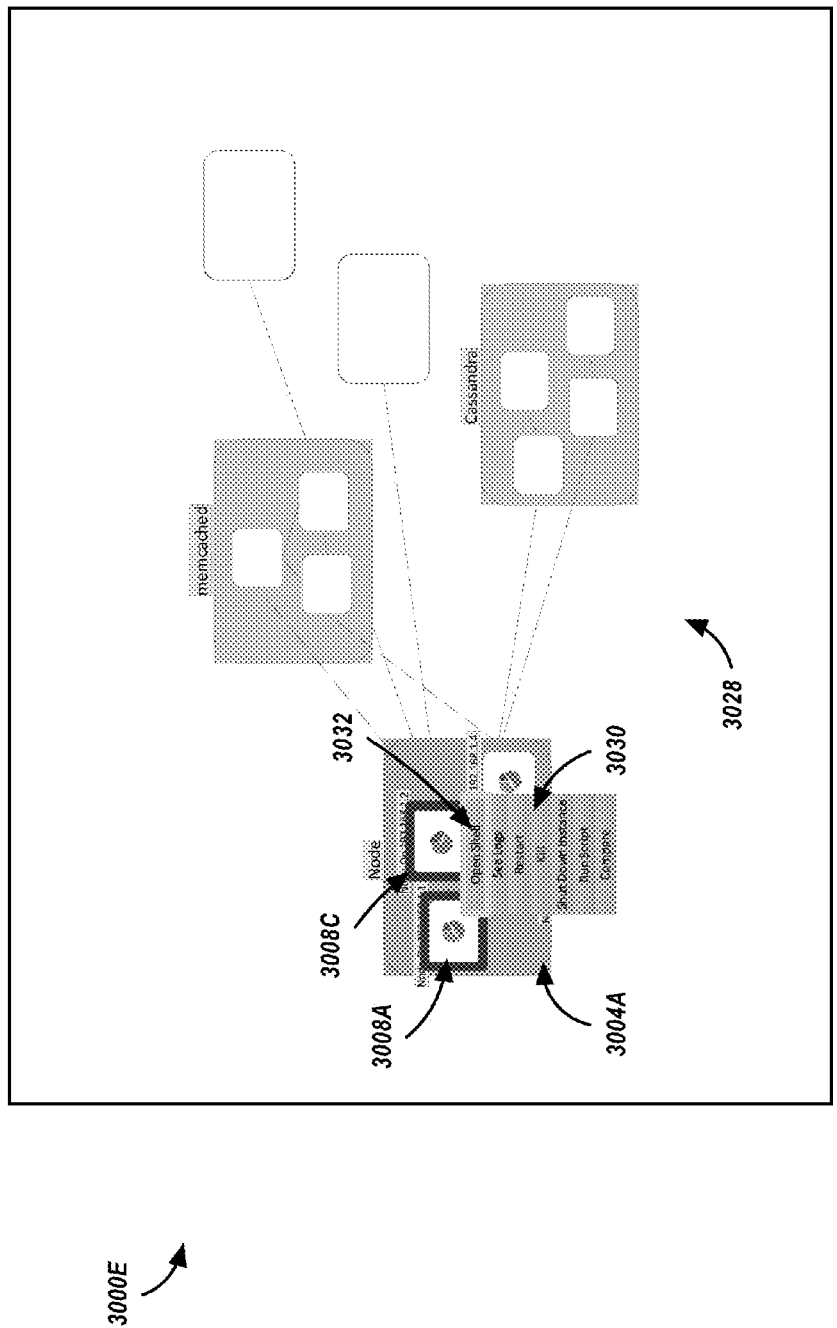
Figure 30F:
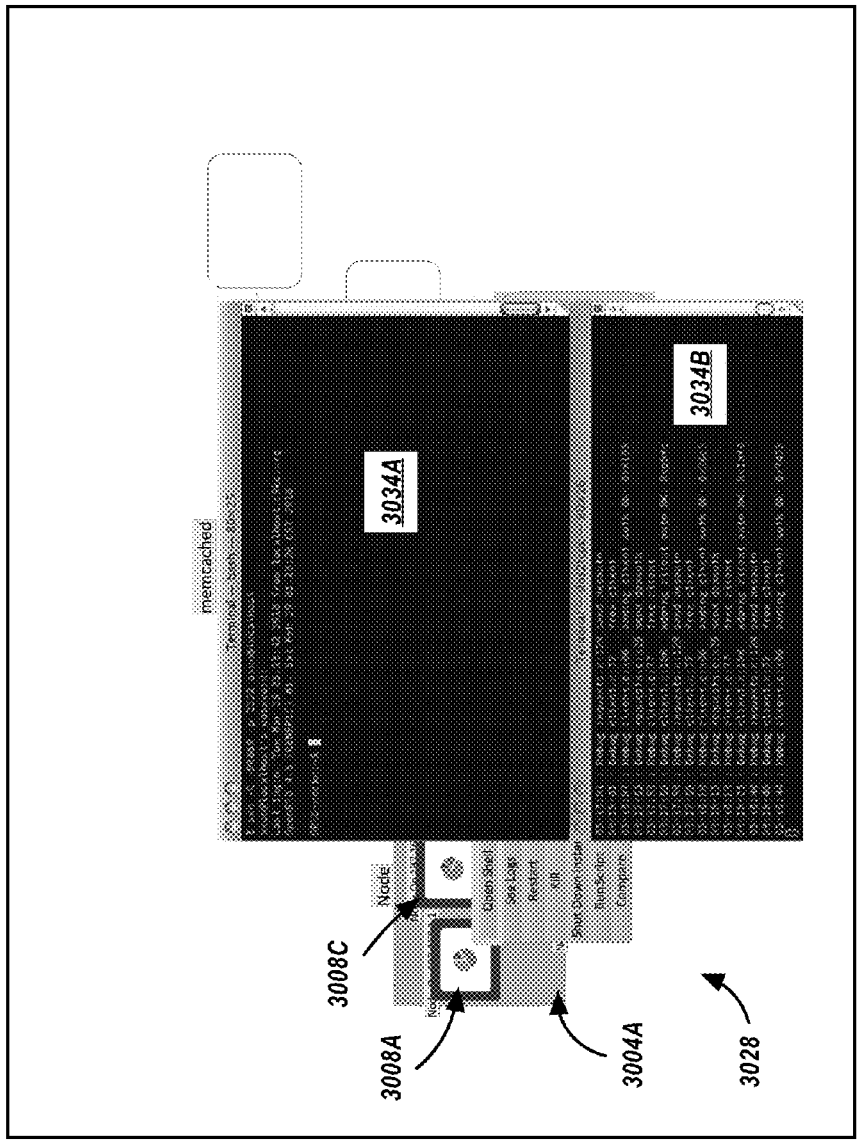

GUI 2700A-GUI 2700C (FIGS. 27A-27C) depict an example of performance metric mapping using an application topology map displayed on one graphical user interface screen.

GUI 2700A (FIG. 27A) illustrates an exemplary graphical user interface for performance metric mapping where the graphical user interface includes an application topology map 2702. The map 2702 comprises nodes (e.g., 2704A, 2704B, 2704C, 2704D) and edges (e.g., 2706A, 2706B, 2706C) connecting the nodes. Each node (e.g., 2704A) of the map 2702 represents an identified application component and each edge (e.g., 2706A) represents a logical dependency between two identified application components.

The exemplary graphical user interface also includes graphical user interface controls 2712 for selecting a performance metric to display in the map 2702 in association with the nodes (e.g., 2704A, 2704B, 2704C, 2704D). For example, controls 2712 allow the user to select one of "High Response Time", "Low IOPS", "High Number of Requests", "High Memory", "High I/O Errors", or "Long Queues". In GUI 2700A, "High Local Delay" is currently selected 2722 by the user. Accordingly, nodes (e.g., 2704A) in the map 2702 are displayed with the local delay performance metric that has been computed for the corresponding application components. For example, map 2702 indicates that the average local delay per network request of the application component represented by node 2704A is 0.95 seconds. The displayed performance metrics may reflect performance of the application components during one or more periods of time such as in the past hour, the past day, or one or more selected or specified periods of time.

The exemplary graphical user interface also includes graphical user interface controls 2714 for selecting a performance metric to display in the map 2702 in association with the edges (e.g., 2706A, 2706B, 2706C). For example, controls 2714 allow the user to select one of "High Bandwidth", "High # Requests", "High RTT", "High Memory", and "High # Errors". In GUI 2700A, "High Bandwidth" is currently selected 2724 by the user. Accordingly, edges (e.g., 2706A) in the map 2702 are displayed with the bandwidth performance metric that has been computed for application components corresponding to nodes connected by the edges. For example, map 2702 indicates in conjunction with edge 2706A that the average rate of data transfer over the network between the application component represented by node 2704A and the application component represented by node 2704B is 3.6 megabits per second (Mbps). The displayed performance metrics may reflect performance of the application components during one or more periods of time such as in the past hour, the past day, or one or more selected or specified periods of time.

Nodes (e.g., 2704A, 2704B, 2704C, 2704D) may be color coded or otherwise visually highlighted in map 2702 to indicate quality of performance with respect to a performance metric currently selected through controls 2712. For example, node 2704C may be colored green in GUI 2700A to indicate that the application component represented by node 2704C is performing good according the local delay metric computed for the application component. On the other hand, node 2704A may be colored red in GUI 2700A to indicate that the application component represented by node 2704A is performing poorly according to the local delay metric computed for the application component.

Edges (e.g., 2706A, 2706B, 2706C) may also be color coded or otherwise visually highlighted in map 2702 to indicate quality of network performance with respect to a performance metric currently selected through controls 2714. For example, edge 2706A may be colored red in GUI 2700A to indicate that the network bandwidth usage between the application component represented by node 2704A and node 2704B is high.

In GUI 2700B (FIG. 27B), a user has moved a selection cursor for controls 2712 from "High Local Delay" to "High I/O errors" 2722. Such movement and other user input directed to exemplary graphical user interface can be made by the user using conventional user input mechanisms such as a pointing device (e.g., a mouse), a keyboard, or a touch sensitive surface (e.g., a touch screen display).

In GUI 2700C (FIG. 27C), the user has selected the "High I/O errors" option 2722 of controls 2712. In response to the selection, display of the map 2702 in GUI 2700C is updated. In particular, the performance metrics displayed in GUI 2700C in association with the nodes (e.g., 2704A, 2704B, 2704C, 2704D) pertain to I/O error performance of the applicant components represented by the nodes. For example, map 2702 indicates in conjunction with application nodes 2704A, 2704B, 2704C, and 2704D that the number of I/O errors detected by the corresponding application components is 123, 0, 2385, and 789, respectively. The displayed performance metrics may reflect performance of the application components during one or more periods of time such as in the past hour, the past day, or one or more selected or specified periods of time.

Nodes (e.g., 2704A, 2704B, 2704C, 2704D) may be color coded or otherwise visually highlighted in map 2702 to indicate quality of performance with respect to a performance metric currently selected through controls 2712. For example, node 2704A may be colored green in GUI 2700A to indicate that the application component represented by node 2704A is performing good according the I/O errors metric computed for the application component. On the other hand, node 2704C may be colored red in GUI 2700A to indicate that the application component represented by node 2704C is performing poorly according to the I/O errors metric computed for application component.

Search

GUI 2800A-GUI 2800F (FIGS. 28A-28F) depict an example of searching for application components in an application topology map displayed on one graphical user interface screen.

GUI 2800A (FIG. 28A) illustrates an exemplary graphical user interface for searching for application components where the exemplary graphical user interface comprises an application topology map 2802. The map 2802 comprises nodes (e.g., 2804C, 2804D, 2804E, 2804F, 2804G) and edges connecting the nodes. Each node (e.g., 2804C) of the map 2802 represents an identified application component and each edge represents a logical dependency between two identified application components. The exemplary graphical user interface also include a search field 2816 for entering a search expression.

GUI 2800B (FIG. 28B) illustrates the exemplary graphical user interface after a user has placed focus on the search field 2816 by directing user input toward the search field. The user input can be made by the user using conventional user input mechanisms such as a pointing device (e.g., a mouse), a keyboard, or a touch sensitive surface (e.g., a touch screen display).

GUI 2800C (FIG. 28C) illustrates the exemplary graphical user interface after the user has entered the search expression "apache" into the search field 2816. The user can enter the search expression into the search field 2816 using conventional user input mechanisms such as a pointing device (e.g., a mouse), a keyboard, or a touch sensitive surface (e.g., a touch screen display).

GUI 2800D (FIG. 28D) illustrates the exemplary graphical user interface after the user has submitted the search expression "apache". The user can submit the search expression entered into the search field 2816 using conventional user input mechanisms such as a pointing device (e.g., a mouse), a keyboard, or a touch sensitive surface (e.g., a touch screen display). In response to submitting the search expression, nodes in the map 2802 representing application components that satisfy the search expression are visually highlighted. For example, in GUI 2800D, nodes 2804C, 2804D, 2804E are visually highlighted to indicate that the application components represented by these nodes satisfy the search expression "apache".

GUI 2800E (FIG. 28E) illustrates the exemplary graphical user interface after the user has entered the search expression "IOPS<50" into the search field 2816. This example search illustrates that a search expression can be in terms of performance metrics. For example, the search expression "IOPS<50" will be satisfied by application components associated with IOPS performance metric values that are less than 50. IOPS stands for the number of Input/Output Operations per Second. IOPS can be a useful measurement of the performance of mass storage devices such as solid state disk drives.

GUI 2800F (FIG. 28F) illustrates the exemplary graphical user interface after the user has submitted the search expression "IOPS<50" entered into search field 2816. The user can submit the search expression entered into the search field 2816 using conventional user input mechanisms such as a pointing device (e.g., a mouse), a keyboard, or a touch sensitive surface (e.g., a touch screen display). In response to submitting the search expression, nodes in the map 2802 representing application components that satisfy the search expression are visually highlighted. For example, in GUI 2800F, nodes 2804F and 2804G are visually highlighted to indicate that the application components represented by these nodes satisfy the search expression "IOPS<50".

While in some embodiments, a search expression entered into search field 2816 comprises one or more keywords, optionally related by one or more Boolean operators (e.g., "AND", "OR", "NOT", etc.), a search expression entered into search field 2816 comprises one or more performance metrics related to performance metric values by one or more relational operators (e.g., "<" (less than), ">" (greater than), "=" (equal to), etc.). A search expression may also comprises a combination of keywords and performance metrics. For example, the search expression "apache IOPS<50" would be satisfied by application components associated with the keyword "apache" and associated with a IOPS performance metric value less than 50.

Sub-Mapping

GUI 2900A-GUI 2900F (FIGS. 29A-29F) depict an example of sub-mapping using an application topology map displayed on one graphical user interface screen.

GUI 2900A (FIG. 29A) illustrates an exemplary graphical user interface for sub-mapping where the exemplary graphical user interface comprises an application topology map 2902. The map 2902 comprises nodes (e.g., 2904C, 2904B, 2904C) and edges connecting the nodes. Each node (e.g., 2804A) of the map 2802 represents an identified application component and each edge represents a logical dependency between two identified application components.

GUI 2900B (FIG. 29B) illustrates the exemplary graphical user interface after a user has selected a portion 2918 of the map 2902. The user can select the portion 2918 using conventional user input mechanisms such as a pointing device (e.g., a mouse), a keyboard, or a touch sensitive surface (e.g., a touch screen display). The selected portion 2918 includes nodes 2904A, 2904B, and 2904C among other nodes and edges.

GUI 2900C (FIG. 29C) illustrates the exemplary graphical user interface after the user has selected the portion 2918 of the map 2902. The exemplary graphical user interface also includes a menu 2920 for selecting one of a number of possible operation to perform on the selected portion 2918 including "Zoom", "Info", "Collapse", and "Create New Map".

GUI 2900D (FIG. 29D) illustrates the exemplary graphical user interface after the user has moved a menu item selection cursor to the menu item "Create New Map" 2926 of the menu 2920. The user can move the cursor using conventional user input mechanisms such as a pointing device (e.g., a mouse), a keyboard, or a touch sensitive surface (e.g., a touch screen display). The selected portion 2918 includes nodes 2904A, 2904B, and 2904C among other nodes and edges.

GUI 2900E (FIG. 29E) illustrates the exemplary graphical user interface after the user has selected the menu item "Create New Map" 2926. In response to the selection, display of the exemplary graphical user interface is updated to display the selected portion 2918 of the map 2902 as a sub-map 2928. Non-selected portions of the map 2902 are no longer displayed. Sub-map 2928 displays the selected portion 2926 of map 2902 in an enlarged view so that the user can see more details of the selected portion 2926 including, for example, host-sub nodes of application component nodes within the selected portion 2926.

Host Actions

GUI 3000A-GUI 3000F (FIGS. 30A-30F) depict an example of performing host actions using an application topology map displayed on one graphical user interface screen.

GUI 3000A (FIG. 30A) illustrates an exemplary graphical user interface for performing host actions where the exemplary graphical user interface comprises an application topology map 3028. The map 3028 comprises nodes (e.g., 3004A) and edges connecting the nodes. Each node (e.g., 3004A) of the map 3028 represents an identified application component and each edge represents a logical dependency between two identified application components. Node 3004A comprises a plurality of host sub-nodes including host sub-node 3008A and 3008B. Each of the host sub-nodes (e.g., 3008A) represents a host on which the application component represented by the containing application component node 3004A executes.

GUI 3000B (FIG. 30B) illustrates the exemplary graphical user interface after a user has selected host sub-node 3008A. The user may make the selection using a conventional user input mechanism such as a pointing device (e.g., a mouse), a keyboard, or a touch sensitive surface (e.g., a touch screen display). In response to the selection, host sub-node 3008A is visually highlighted in GUI 300B to convey the selection.

GUI 3000C (FIG. 30C) illustrates the exemplary graphical user interface after a user has selected host sub-node 3008B. The user may make the selection using a conventional user input mechanism such as a pointing device (e.g., a mouse), a keyboard, or a touch sensitive surface (e.g., a touch screen display). In response to the selection, host sub-node 3008B is visually highlighted in GUI 3000C to convey the selection. Also, host sub-node 3008A remains visually highlighted in GUI 3000C as a result of the prior selection of host sub-node 3008A.

GUI 3000D (FIG. 30D) illustrates the exemplary graphical user interface where a pop-up menu 3030 is made available to the user to select an action to perform on the hosts corresponding to the selected host sub-nodes 3008A and 3008B. The list of available actions include "Open Sell", "See Logs", "Restart", "Kill", "Shut Down Instance", "Run Script", and "Compare".

GUI 3000E (FIG. 30E) illustrates the exemplary graphical user interface after the user has moved a menu item selection cursor over menu item "Open Shell" 3032 of menu 3030. The user may move the cursor using a conventional user input mechanism such as a pointing device (e.g., a mouse), a keyboard, or a touch sensitive surface (e.g., a touch screen display).

GUI 3000F (FIG. 30F) illustrates the exemplary graphical user interface after the user has selected menu item "Open Sell" 3032 from menu 3030. In response to the menu item selection, a terminal window (e.g., 3034A) for each of the hosts represented by host sub-nodes 3008A and 3008B are displayed. The terminal window (e.g., 3034B) may be used to issue command line commands to the corresponding hosts.

Comparing Hosts

Figure 31A:
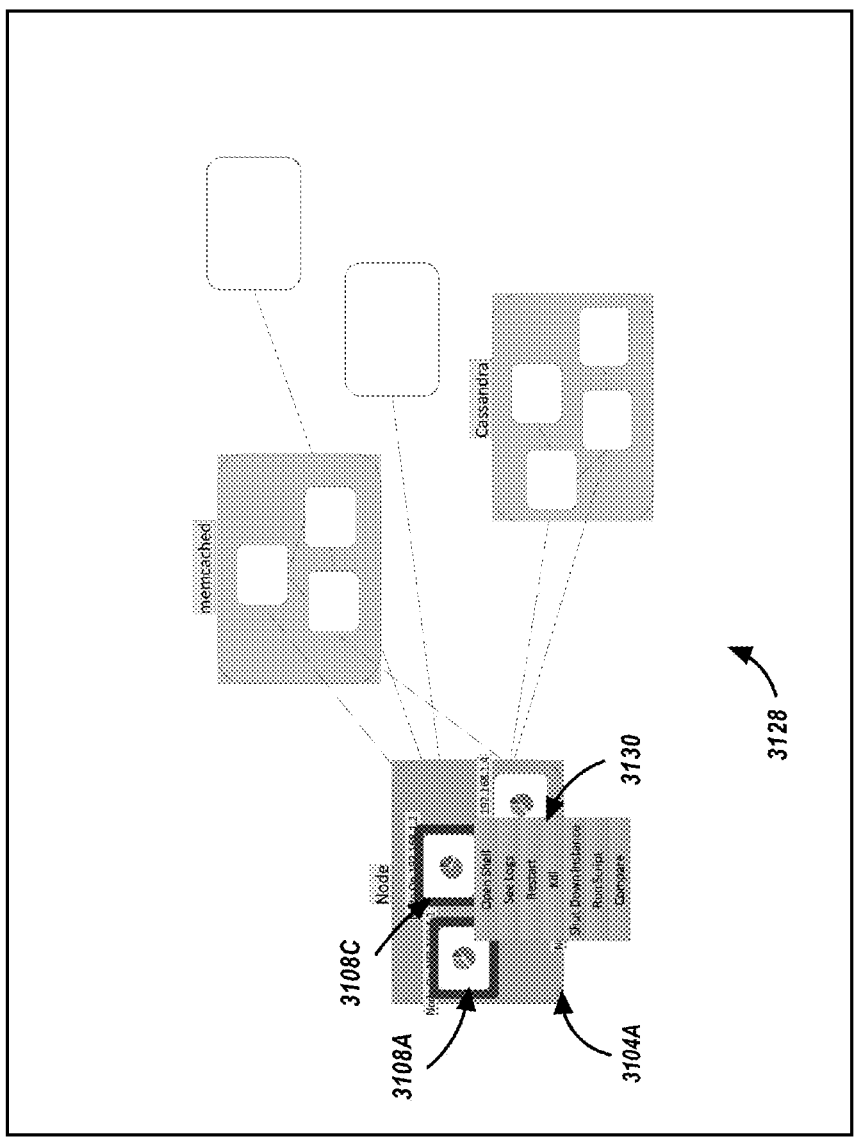
FIG. 31A, FIG. 31B, FIG. 31C illustrate a compare hosts feature of an application topology map presented by a presentation system, in accordance with some embodiments.
Figure 31B:
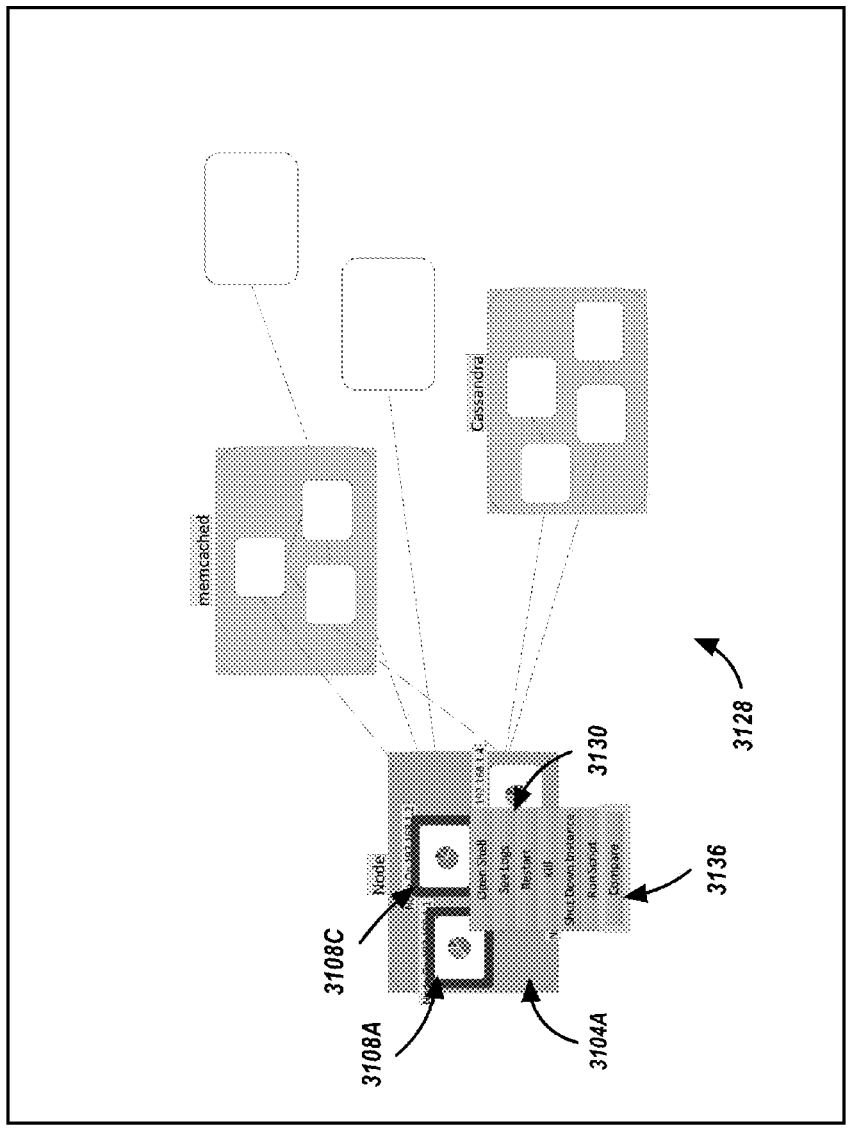
Figure 31C:
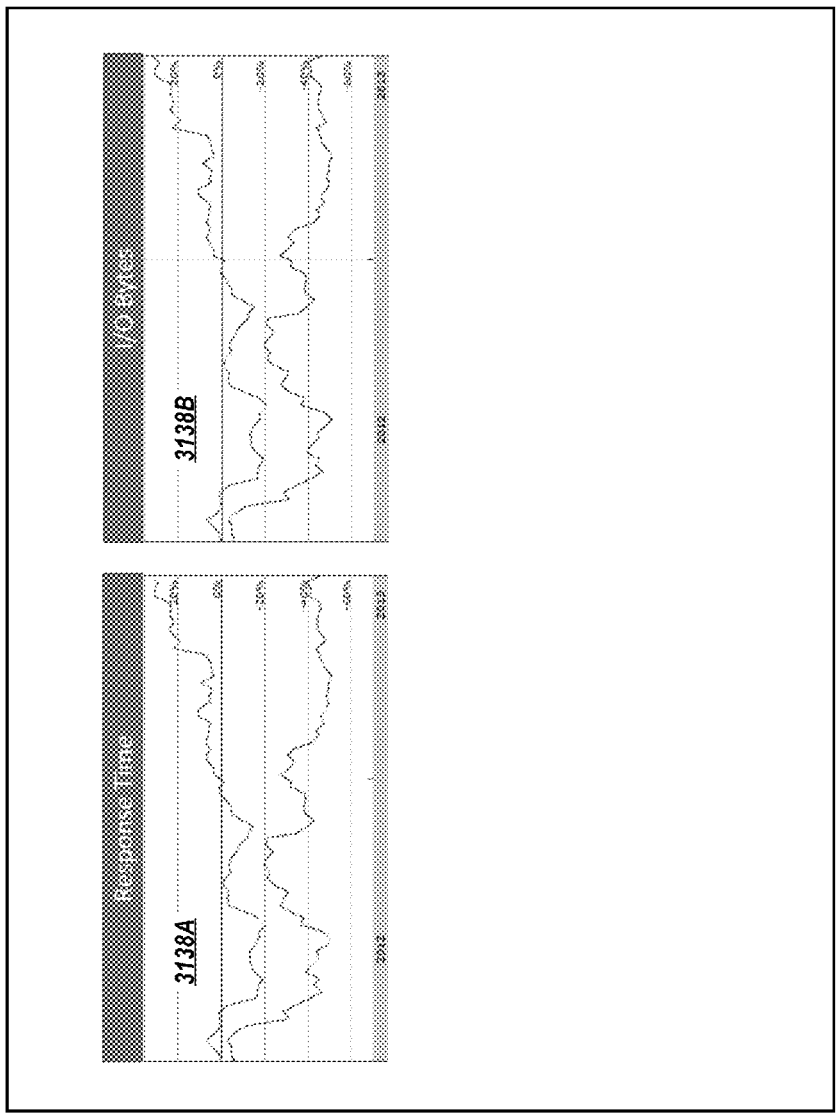

GUI 3100A-GUI 3100C (FIGS. 31A-31C) depict an example of comparing hosts using an application topology map displayed on one graphical user interface screen.

GUI 3100A (FIG. 31A) illustrates an exemplary graphical user interface for comparing the performance of hosts where the exemplary graphical user interface comprises an application topology map 3128. The map 3128 comprises nodes (e.g., 3104A) and edges connecting the nodes. Each node (e.g., 3104A) of the map 3128 represents an identified application component and each edge represents a logical dependency between two identified application components. Node 3104A comprises a plurality of host sub-nodes including host sub-node 3108A and 3108B which are both currently selected in GUI 3100A. Each of the host sub-nodes (e.g., 3108A) represents a host on which the application component represented by the containing application component node 3104A executes. GUI 3100A also includes a menu 3130 for selecting an action to perform on the hosts corresponding to the selected host sub-nodes 3108A and 3108B. The list of available actions include "Open Sell", "See Logs", "Restart", "Kill", "Shut Down Instance", "Run Script", and "Compare".

GUI 3100B (FIG. 31B) illustrates the exemplary graphical user interface after the user has moved a menu item selection cursor over menu item "Compare" 3136 of menu 3030. The user may move the cursor using a conventional user input mechanism such as a pointing device (e.g., a mouse), a keyboard, or a touch sensitive surface (e.g., a touch screen display).

GUI 3100C (FIG. 31C) illustrates the exemplary graphical user interface after the user has selected menu item "Compare" 3136 from menu 3130. In response to the menu item selection, one or more charts (e.g., 3138A and 3138B) are displayed. Each chart (e.g., 3138A) charts the performance over a period of time of the hosts selected for comparison with respect to one or more application components. For example, chart 3138A charts over a period of time the percentage the response times of the hosts represented by host sub-nodes 3108A and 3108B were over/under a baseline. Chart 3138B charts over a period of time the percentage the number of I/O Bytes the response times of the hosts represented by host sub-nodes 3108A and 3108B were over/under a baseline.

Comparing Time Intervals

Figure 32A:
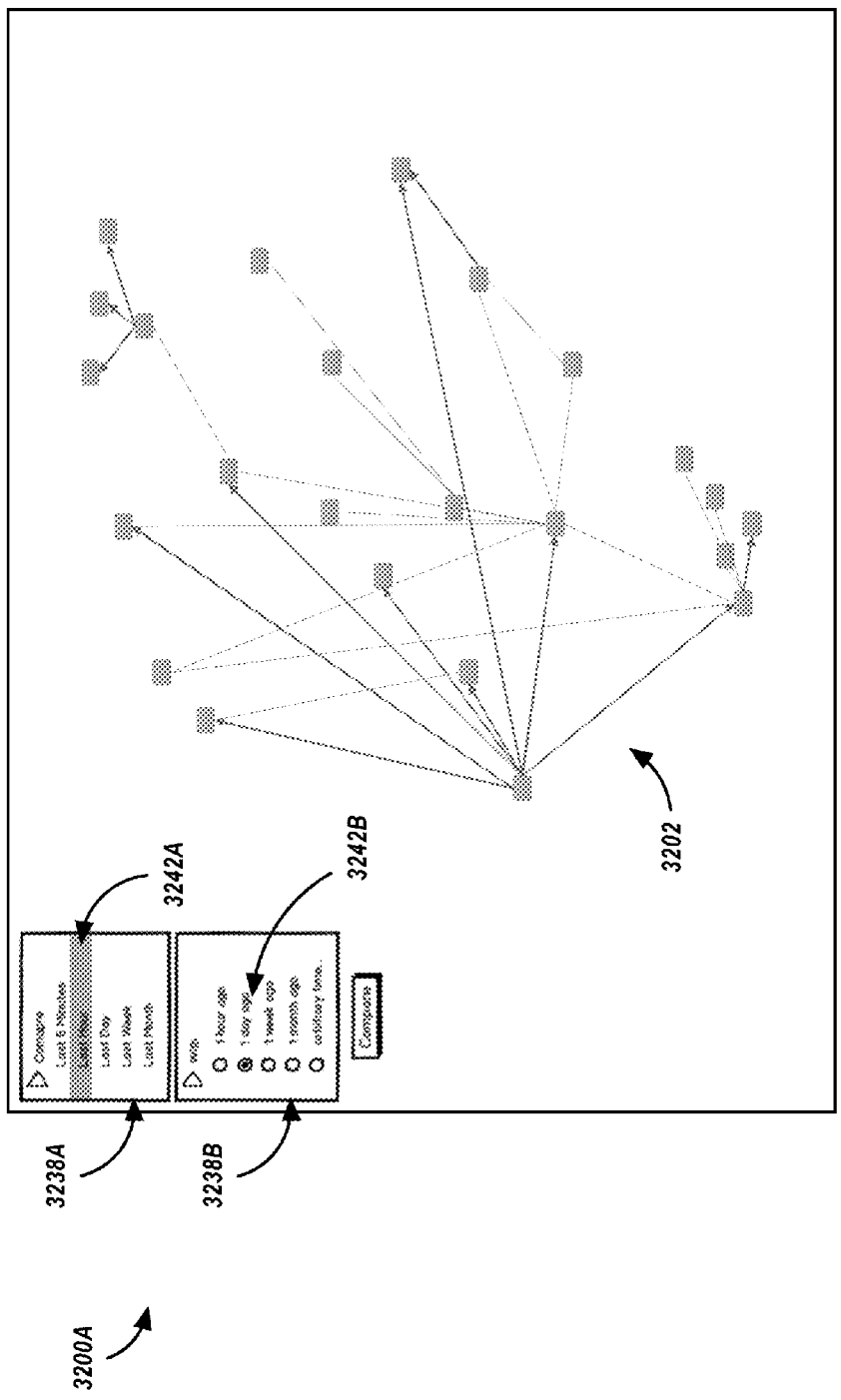
FIG. 32A, FIG. 32B, FIG. 32C illustrate a compare time intervals feature of an application topology map presented by a presentation system, in accordance with some embodiments.
Figure 32B:
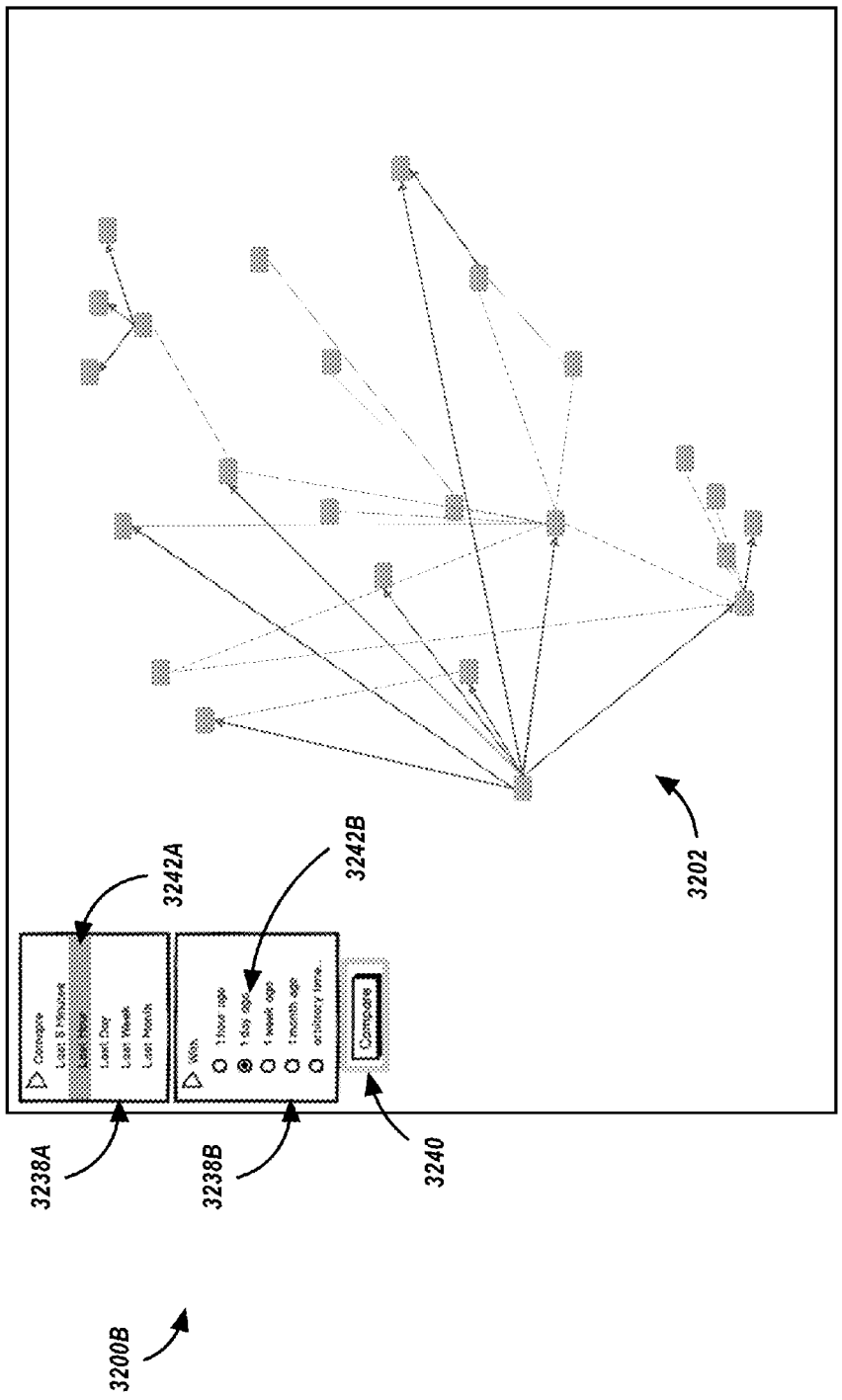
Figure 32C:
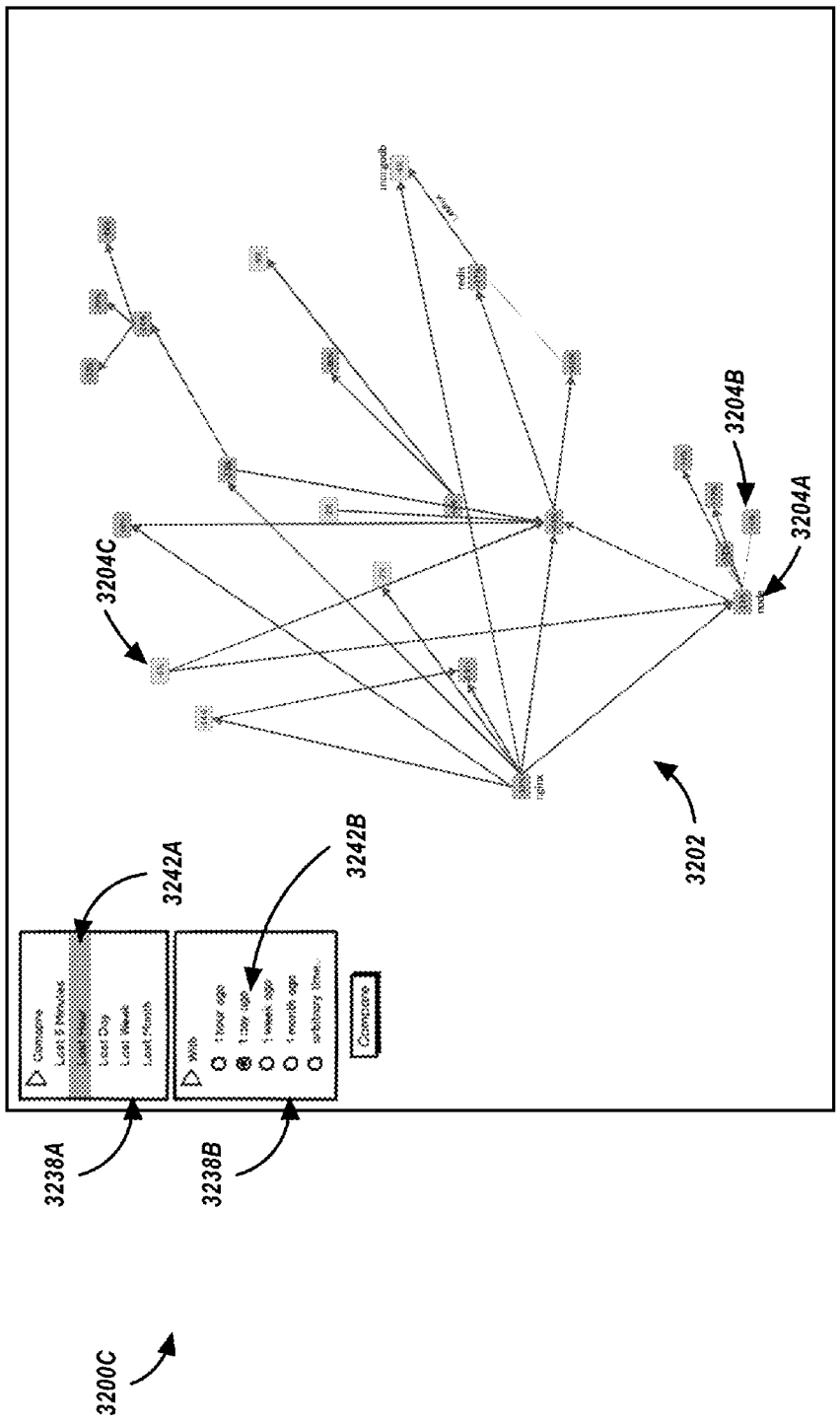

GUI 3200A-GUI 3200C (FIGS. 32A-32C) depict an example of comparing time intervals using an application topology map displayed on one graphical user interface screen.

GUI 3200A (FIG. 32A) illustrates an exemplary graphical user interface for comparing performance of an application in a hosted computing environment during two different time intervals where the exemplary graphical user interface comprises an application topology map 3202. The map 3202 comprises nodes and edges connecting the nodes. Each node of the map 3202 represents an identified application component and each edge represents a logical dependency between two identified application components.

The exemplary graphical user interface also includes user interface controls 3238A for selecting a first time period and user interface controls 3238B for selecting a second time period. In particular, user interface controls 3238A allow the user to select as the first time period one of the last 5 minutes, the last hour, the last day, the last week, or the last month. User interface controls 3238B allow the user to select as the second time period one of one hour ago, one day ago, one week ago, one week ago, or a user specified period of time. In this example, the user has selected as the first time period "the last hour" 3242A and selected as the second time period "one day ago" 3242B. The user may select the first and second time periods using controls 3238A and 3238B using a conventional user input mechanism such as a pointing device (e.g., a mouse), a keyboard, or a touch sensitive surface (e.g., a touch screen display).

GUI 3200B (FIG. 32B) illustrates the exemplary graphical user interface after the user has moved a cursor over "Compare" button 3240. The user may move the cursor using a conventional user input mechanism such as a pointing device (e.g., a mouse), a keyboard, or a touch sensitive surface (e.g., a touch screen display).

GUI 3200C (FIG. 32C) illustrates the exemplary graphical user interface after the user has selected "Compare" button 3140. In response to the selection of button 310, display of the graphical user interface is updated based on a comparison between the performance of the application components during the first time period and the performance of the application components during the second time period. Specifically, each application component node of the map 3202 is updated based on results of the comparison. For example, GUI 3200C indicates that the computing performance of the application component represented by application component node 3204A decreased 13% during the last 5 minutes relative to the performance of that application component one day ago, that the computing performance of the application component represented by application component node 3204B increased 6% during the last 5 minutes relative to the performance of the application component one day ago, and that the computing performance of that application component represented by application component node 3204C decreased 6% during the last 5 minutes relative to the performance of that application component one day ago.

Applicant component nodes of the map 3202 may also be color coded or otherwise visually highlighted to indicate relative computing performance between the two selected time periods. For example, node 3204B may be color coded green to indicate that computing performance of the application component represented by node 3204B improved during the last 5 minutes relative to 1 day ago and node 3204A may be color coded red to indicate that computing performance of the application component represented by node 3204A decreased during the last 5 minutes relative to 1 day ago.

Security

In some embodiments, the application management solution is used to store system events for purposes of reconstructing hacker attacks, user activity, virus attacks, or other security vulnerabilities of an application. Additional context can be created around the captured system events and analytic tasks can be performed by the CAS engine on the stored system events including tracking the sequence of steps involved in a hacker penetration of the application or a virus attack. Such tracking may include, but is not limited to, tracking:

network data and file exchange,
creation or removal of processes,
file creation, removal, and access,
library loading,
changing of access privileges,
user impersonation, and
modifications to the kernel.

Other tasks that may be performed include tracking user activity. Such tracking may include, but is not limited to, tracking:

list of executed commands,
accessed files, directories, and volumes,
change of system settings,
network data and file exchange, and
unauthorized data export.

In some embodiments, captured system events are presented in a three-pane window configuration in the presentation system. One pane lists captured system events in chronological order.

Example Implementing Mechanism

FIG. 33 is a block diagram that illustrates a computer system 3300 with which embodiments of the present invention can be implemented. Computer system 3300 includes bus 3302 or other communication mechanism for communicating information and hardware processor (CPU) 3304 coupled with bus 3302 for processing information. Bus 3302 collectively represents all system, peripheral, and chipset buses that communicatively connect the numerous components of computer system 3300. Hardware processor 3304 may be one or more general purpose microprocessors or a multi-core processor in different implementations.

Computer system 3300 also includes memory 3306, such as a random access memory (RAM) or other dynamic storage device, coupled to bus 3302 for storing information and instructions to be executed by processor 3304. Memory 3306 also may be used for storing temporary variables or other intermediate information during execution of instructions to be executed by processor 3304. Such instructions, when stored in non-transitory storage media accessible to processor 3304, render computer system 3300 into a special-purpose machine that is customized to perform the operations specified in the instructions.

Computer system 3300 further includes a read only memory (ROM) 3308 or other static storage device coupled to bus 3302 for storing static information and instructions for processor 3304.

Storage device 3310, such as a solid state drive, a magnetic disk, or an optical drive, is provided and coupled to bus 3302 for storing information and instructions.

Computer system 3300 can be coupled via bus 3302 to display 3312, such as a liquid crystal display (LCD), for displaying information to a computer user.

One or more physical input devices 3314, for example an alphanumeric keyboard or other keyboard or keypad, can be coupled to bus 3302 for communicating information and command selections to processor 3304. Another possible type of input device 3314 is a cursor control, such as a mouse, a trackball, or cursor direction keys for communicating direction information and command selections to processor 3304 and for controlling cursor movement on display 3312. This input device typically has two degrees of freedom in two axes, a first axis (e.g., x) and a second axis (e.g., y), that allows the device to specify positions in a plane. Yet another possible type of input device 3314 is a touch-sensitive surface, such as one that overlays display 3312 to form a touch-screen display, for communicating direction and other information and command selections to processor 3304. The touch-sensitive surface typically has a sensor or set of sensors that accepts input from a user based on haptic and/or tactile contact.

One or more audio output devices 3316, for example headphones and/or audio speakers, can be coupled to bus 3302 for outputting audible information to a computer user.

Network interface 3318 provides a two-way data communication establishing a network link 3320 to a local network 3322. Network link 3320 may be wired (e.g., an Ethernet wire link) or wireless (e.g., a cellular wireless link or WiFi wireless link). Local network 3322 can be a local Area network (LAN), a wide area network (WAN), or other network that is communicatively coupled to the Internet 3324 or one or more other data networks for communicating with one or more other computing devices 3326 that are also linked to the Internet 3324, local network 3322, and/or the one or more other data networks.

Computer system 3300 can send messages and receive data, including program code, through the network(s) 3322 and/or 3326, network link 3320 and network interface 3318. For example, a server 3326 might transmit requested code for an application program through the Internet 3324, local network 3322 and network interface 3318. The received code may be executed by processor 3304 as it is received, and/or stored in storage device 3310, or other non-volatile storage for later execution.

Computer system 3300 may implement the techniques described herein using customized hard-wired logic, one or more application specific integrated circuits (ASICs) or filed programmable arrays (FPGAs), firmware and/or program logic which in combination with the computer system causes or programs computer system 3300 to be a special-purpose machine.

According to one embodiment, the techniques herein are performed by computer system 3300 in response to processor 3304 executing one or more sequences of one or more instructions contained in main memory 3306. Such instructions may be read into memory 3306 from another storage medium, such as storage device 3310. Execution of the sequences of instructions contained in memory 3306 causes processor 3304 to perform the process steps described herein.

In alternative embodiments, hard-wired circuitry may be used in place of or in combination with software instructions.

Usage of Terms and Glossary

As used in the description of the invention and the appended claims, the terms "first", "second", etc. may be used herein to describe various elements, these elements should not be limited by these terms. These terms are only used to distinguish one element from another. For example, a first device could be termed a second device, and, similarly, a second device could be termed a first device, without departing from the scope of the present invention. The first device and the second device are both devices, but they are not the same device.

The singular forms "a", "an" and "the" are intended to include the plural forms as well, unless the context clearly indicates otherwise.

It will also be understood that the term "and/or" refers to and encompasses any and all possible combinations of one or more of the associated listed items.

It will be further understood that the terms "includes," "including," "comprises," and/or "comprising" specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "non-transitory media" refers to any media that store data and/or instructions that cause a machine to operation in a specific fashion. Such non-transitory media may comprise non-volatile media and/or volatile media. Non-volatile media includes, for example, solid state devices, optical drives, and magnetic disks, such as storage device 3310. Volatile media includes dynamic memory, such as memory 3306. Common forms of non-transitory media include, for example, floppy disks, flexible disks, hard disks, solid state drives, magnetic tape, CD-ROMs, flash drives, or any other electronic, magnetic, or optical data storage media, and a RAM, a PROM, an EPROM, a FLASH-EPROM, a NVRAM, or any other memory chip or cartridge. Non-transitory media is distinct from but may be used in conjunction with transmission media. Transmission media participates in transferring information between non-transitory media. For example, transmission media includes coaxial cables, copper wire and fiber optics, including the wires that comprise bus 3302. Transmission media can also take the form of acoustic or light waves, such as those generated during radio-wave and infrared data communications.

The invention claimed is:

1. A system for application topology mapping of an application deployed on a plurality of hosts in a hosted computing environment, the system comprising:

a plurality of agents installed on the plurality of hosts, the plurality of agents configured to capture system events from operating systems on the hosts, the system events resulting from a plurality of application components of the application executing on the plurality of hosts;

one or more computers having at least a processor and memory and including a collection and analysis engine that is configured to obtain the system events captured by the plurality of agents, to identify captured system events that pertain to an application component of the plurality of application components, and to compute, from the identified captured system events that pertain to the application component, a performance metric value reflecting computing performance of the application component over a period of time;

one or more computers having at least a processor and memory and including a presentation system that is configured to display an application topology map and the performance metric value in a graphical user interface, the application topology map comprising a plurality of nodes and edges there between, the plurality of nodes representing the plurality of application components, the edges representing logical dependencies between the plurality of application components;

wherein the presentation system is configured to update display of the graphical user interface to display a sub-map of the application topology map, in response to receiving a selection of a portion of the application topology map; and wherein the sub-map does not comprise any nodes of the plurality of nodes not within the portion.

2. A system for application topology mapping of an application deployed on a plurality of hosts in a hosted computing environment, the system comprising:

a plurality of agents installed on the plurality of hosts, the plurality of agents configured to capture system events from operating systems on the hosts, the system events resulting from a plurality of application components of the application executing on the plurality of hosts;

one or more computers having at least a processor and memory and including a collection and analysis engine that is configured to obtain the system events captured by the plurality of agents, to identify captured system events that pertain to an application component of the plurality of application components, and to compute, from the identified captured system events that pertain to the application component, a performance metric value reflecting computing performance of the application component over a period of time;

one or more computers having at least a processor and memory and including a presentation system that is configured to display an application topology map and the performance metric value in a graphical user interface, the application topology map comprising a plurality of nodes and edges there between, the plurality of nodes representing the plurality of application components, the edges representing logical dependencies between the plurality of application components;

wherein the application component is a first application component;

wherein the presentation system is configured to present the application topology map in a first zoom state at a first time and in a second zoom state at a second time;

wherein, while the application topology map is in the first zoom state, the graphical user interface comprises a first application component node, a second application component node, and a first edge connecting the first application component node and the second application node, the first application component node representing the first application component, the second application component node representing a second application component of the plurality of application components, the first edge representing a logical dependency between the first application component and the second application component;

wherein, while the application topology map is in the second zoom state, the graphical user interface comprises a first host-sub node of the first application component node, a second host-sub node of the second application component node, and a second edge connecting the first host-sub node and the second host sub-node, the first host sub-node representing a first host of the plurality of hosts, the second host sub-node representing a second host of the plurality of hosts, the second edge representing a logical dependency between the first application component on the first host and the second application component on the second host;

wherein, while the application topology map is in the first zoom state, the graphical user interface does not display at least one of the first host sub-node or the second host sub-node.

3. The system of claim 2:

wherein the presentation system is configured to present the application topology map in a third zoom state at a third time;

wherein, while the application topology map is in the third zoom state, the graphical user interface comprises a first process-sub node of the first host-sub node, a second process-sub node of the second host sub-node, and a third edge connecting the first process-sub node and the second process sub-node, the first process sub-node representing a first process of the first application component executing on the first host, the second process sub-node representing a second process of the second application component executing on the second host, the third edge representing a logical dependency between the first process and the second process;

wherein, while the application topology map is in the second zoom state, the graphical user interface does not display at least one of the first process sub-node or the second process sub-node.

4. The system of claim 1:

wherein the application component is a first application component;

wherein the performance metric value is a first performance metric value;

wherein the first performance metric value is for a first performance metric;

wherein the graphical user interface provides user interface controls for selecting a second performance metric from among a plurality of performance metrics that comprises the first performance metric and the second performance metric;

wherein the presentation system is configured to update display of the graphical user interface to no longer display the first performance metric value and to display a value for the second performance metric computed for the first application component reflecting computing performance of the first application component over the period of time, in response to receiving a selection of the second performance metric.

5. The system of claim 1:

wherein the presentation system is configured to update display of the graphical user interface to visually highlight any nodes of the plurality of nodes corresponding to any application components of the plurality of application components that satisfy a search expression, in response to receiving the search expression.

6. A system for application topology mapping of an application deployed on a plurality of hosts in a hosted computing environment, the system comprising:
- a plurality of agents installed on the plurality of hosts, the plurality of agents configured to capture system events from operating systems on the hosts, the system events resulting from a plurality of application components of the application executing on the plurality of hosts;
- one or more computers having at least a processor and memory and including a collection and analysis engine that is configured to obtain the system events captured by the plurality of agents, to identify captured system events that pertain to an application component of the plurality of application components, and to compute, from the identified captured system events that pertain to the application component, a performance metric value reflecting computing performance of the application component over a period of time;
- one or more computers having at least a processor and memory and including a presentation system that is configured to display an application topology map and the performance metric value in a graphical user interface, the application topology map comprising a plurality of nodes and edges there between, the plurality of nodes representing the plurality of application components, the edges representing logical dependencies between the plurality of application components;
- wherein the application component is a first application component;
- wherein the graphical user interface comprises a first host-sub node of the first application component node, the first host sub-node representing a first host of the plurality of hosts;
- wherein the presentation system is configured to update display of the graphical user interface to display a list of a plurality of selectable items, in response to a selection of the first host sub-node;
- wherein each selectable item of the plurality of selectable items corresponds to an action of a plurality of actions to perform involving the first host;
- wherein the presentation system is configured to update display of the graphical user interface to display a terminal window for the first host, in a response to a selection of a particular selectable item of the plurality of selectable items.

7. A system for application topology mapping of an application deployed on a plurality of hosts in a hosted computing environment, the system comprising:
- a plurality of agents installed on the plurality of hosts, the plurality of agents configured to capture system events from operating systems on the hosts, the system events resulting from a plurality of application components of the application executing on the plurality of hosts;
- one or more computers having at least a processor and memory and including a collection and analysis engine that is configured to obtain the system events captured by the plurality of agents, to identify captured system events that pertain to an application component of the plurality of application components, and to compute, from the identified captured system events that pertain to the application component, a performance metric value reflecting computing performance of the application component over a period of time;
- one or more computers having at least a processor and memory and including a presentation system that is configured to display an application topology map and the performance metric value in a graphical user interface, the application topology map comprising a plurality of nodes and edges there between, the plurality of nodes representing the plurality of application components, the edges representing logical dependencies between the plurality of application components;
- wherein the application component is a first application component;
- wherein the graphical user interface comprises a first host sub-node and a second host sub-node of the first application component node, the first host sub-node representing a first host of the plurality of hosts, the second host sub-node represented a second host of the plurality of hosts;
- wherein the presentation system is configured to update display of the graphical user interface to display a list of a plurality of selectable items, in response to a selection of the first host sub-node and the second host sub-node;
- wherein each selectable item of the plurality of selectable items corresponds to an action of a plurality of actions to perform pertaining to the first host and the second host;
- wherein the presentation system is configured to update display of the graphical user interface to display a chart of computing performance of the first host and the second host over the period of time, in a response to a selection of a particular selectable item of the plurality of selectable items.

8. The system of claim 1:
- wherein the graphical user interface comprises first user interface controls for specifying a first period of time;
- wherein the graphical user interface comprises second user interface controls for specifying a second period of time;
- wherein the presentation system is configured to update display of the application topology map to visually indicate relative computing performance of the plurality of application components between the first period of time and the second period of time.

9. The system of claim 1, wherein the graphical user interface is displayed in a web page in a web browser.

10. A method for application topology mapping of an application deployed on a plurality of hosts in a hosted computing environment, the method comprising:
- a plurality of agents, installed on the plurality of hosts, capturing system events from operating systems on the hosts, the system events resulting from a plurality of application components of the application executing on the plurality of hosts;
- one or more computers, having at least a processor and memory and including a collection and analysis engine, obtaining system events captured by the plurality of agents, identifying captured system events that pertain to an application component of the plurality of application components, and computing, from the identified captured system events that pertain to the application component, a performance metric value reflecting computing performance of the application component over a period of time;
- one or more computers, having at least a processor and memory and including a presentation system, presenting an application topology map in a graphical user interface, the application topology map comprising a plurality of nodes and edges there between, the plurality of nodes representing the plurality of application components, the edges representing logical dependencies between the plurality of application components, the graphical user interface comprising display of the performance metric value computed for the application component;

wherein the step of the presentation system updating display of the graphical user interface to display a sub-map of the application topology map, in response to receiving a selection of a portion of the application topology map; and wherein the sub-map does not comprise any nodes of the plurality of nodes not within the portion.

11. A method for application topology mapping of an application deployed on a plurality of hosts in a hosted computing environment, the method comprising:

a plurality of agents, installed on the plurality of hosts, capturing system events from operating systems on the hosts, the system events resulting from a plurality of application components of the application executing on the plurality of hosts;

one or more computers, having at least a processor and memory and including a collection and analysis engine, obtaining system events captured by the plurality of agents, identifying captured system events that pertain to an application component of the plurality of application components, and computing, from the identified captured system events that pertain to the application component, a performance metric value reflecting computing performance of the application component over a period of time;

one or more computers, having at least a processor and memory and including a presentation system, presenting an application topology map in a graphical user interface, the application topology map comprising a plurality of nodes and edges there between, the plurality of nodes representing the plurality of application components, the edges representing logical dependencies between the plurality of application components, the graphical user interface comprising display of the performance metric value computed for the application component;

wherein the application component is a first application component;

wherein the performance metric value is a first performance metric value;

wherein the first performance metric value is for a first performance metric;

wherein the method further comprises the step of the presentation system providing, in the graphical user interface, user interface controls for selecting a second performance metric from among a plurality of performance metrics that comprises the first performance metric and the second performance metric;

wherein the method further comprises the step of the presentation system updating display of the graphical user interface to no longer display the first performance metric value and to display a value for the second performance metric computed for the first application component reflecting computing performance of the first application component over the period of time, in response to receiving a selection of the second performance metric.

12. The method of claim 10:

wherein the method further comprises the step of the presentation system updating display of the graphical user interface to visually highlight any nodes of the plurality of nodes corresponding to any application components of the plurality of application components that satisfy a search expression, in response to receiving the search expression.

13. A method for application topology mapping of an application deployed on a plurality of hosts in a hosted computing environment, the method comprising:

a plurality of agents, installed on the plurality of hosts, capturing system events from operating systems on the hosts, the system events resulting from a plurality of application components of the application executing on the plurality of hosts;

one or more computers, having at least a processor and memory and including a collection and analysis engine, obtaining system events captured by the plurality of agents, identifying captured system events that pertain to an application component of the plurality of application components, and computing, from the identified captured system events that pertain to the application component, a performance metric value reflecting computing performance of the application component over a period of time;

one or more computers, having at least a processor and memory and including a presentation system, presenting an application topology map in a graphical user interface, the application topology map comprising a plurality of nodes and edges there between, the plurality of nodes representing the plurality of application components, the edges representing logical dependencies between the plurality of application components, the graphical user interface comprising display of the performance metric value computed for the application component;

wherein the application component is a first application component;

wherein the graphical user interface comprises a first host-sub node of the first application component node, the first host sub-node representing a first host of the plurality of hosts;

wherein the method further comprises the step of the presentation system updating display of the graphical user interface to display a list of a plurality of selectable items, in response to a selection of the first host sub-node;

wherein each selectable item of the plurality of selectable items corresponds to an action of a plurality of actions to perform involving the first host;

wherein the method further comprises the step of the presentation system updating display of the graphical user interface to display a terminal window for the first host, in a response to a selection of a particular selectable item of the plurality of selectable items.

14. A method for application topology mapping of an application deployed on a plurality of hosts in a hosted computing environment, the method comprising:

a plurality of agents, installed on the plurality of hosts, capturing system events from operating systems on the hosts, the system events resulting from a plurality of application components of the application executing on the plurality of hosts;

one or more computers, having at least a processor and memory and including a collection and analysis engine, obtaining system events captured by the plurality of agents, identifying captured system events that pertain to an application component of the plurality of application components, and computing, from the identified captured system events that pertain to the application component, a performance metric value reflecting computing performance of the application component over a period of time;

one or more computers, having at least a processor and memory and including a presentation system, presenting an application topology map in a graphical user interface, the application topology map comprising a plurality of nodes and edges there between, the plurality of nodes representing the plurality of application components, the edges representing logical dependencies between the plurality of application components, the graphical user interface comprising display of the performance metric value computed for the application component;

wherein the application component is a first application component;

wherein the graphical user interface comprises a first host sub-node and a second host sub-node of the first application component node, the first host sub-node representing a first host of the plurality of hosts, the second host sub-node represented a second host of the plurality of hosts;

wherein the method further comprises the step of the presentation system updating display of the graphical user interface to display a list of a plurality of selectable items, in response to a selection of the first host sub-node and the second host sub-node;

wherein each selectable item of the plurality of selectable items corresponds to an action of a plurality of actions to perform pertaining to the first host and the second host;

wherein the method further comprises the step of the presentation system updating display of the graphical user interface to display a chart of computing performance of the first host and the second host over the period of time, in a response to a selection of a particular selectable item of the plurality of selectable items.

15. The method of claim 10:

wherein the graphical user interface comprises first user interface controls for specifying a first period of time;

wherein the graphical user interface comprises second user interface controls for specifying a second period of time;

wherein the method further comprises the step of the presentation system updating display of the application topology map to visually indicate relative computing performance of the plurality of application components between the first period of time and the second period of time.

16. The method of claim 10, wherein the graphical user interface is displayed in a web page in a web browser.

* * * * *